(12) United States Patent
Kondo

(10) Patent No.: US 7,945,102 B2
(45) Date of Patent: May 17, 2011

(54) DATA ENCODING APPARATUS, DATA ENCODING METHOD, DATA OUTPUT APPARATUS, DATA OUTPUT METHOD, SIGNAL PROCESSING SYSTEM, SIGNAL PROCESSING APPARATUS, SIGNAL PROCESSING METHOD, DATA DECODING APPARATUS, AND DATA DECODING METHOD

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1631 days.

(21) Appl. No.: 10/550,731

(22) PCT Filed: Mar. 23, 2004

(86) PCT No.: PCT/JP2004/003990
§ 371 (c)(1),
(2), (4) Date: Sep. 26, 2005

(87) PCT Pub. No.: WO2004/086758
PCT Pub. Date: Jul. 10, 2004

(65) Prior Publication Data
US 2006/0188012 A1    Aug. 24, 2006

(30) Foreign Application Priority Data

Mar. 24, 2003 (JP) ................... 2003-081469
Mar. 24, 2003 (JP) ................... 2003-081471
Mar. 31, 2003 (JP) ................... 2003-095948
May 7, 2003 (JP) ................... 2003-129340

(51) Int. Cl.
*G06K 9/36* (2006.01)
*H04N 7/12* (2006.01)

(52) U.S. Cl. ..................... 382/232; 375/240.2
(58) Field of Classification Search .......... 382/232; 375/240.2
See application file for complete search history.

(56) References Cited

U.S. PATENT DOCUMENTS 4,651,232 A * 3/1987 Lemoine et al. ............. 386/13
(Continued)

FOREIGN PATENT DOCUMENTS

CN        1231100 A        10/1999
(Continued)

*Primary Examiner* — Wenpeng Chen
(74) *Attorney, Agent, or Firm* — Oblon, Spivak, McClelland, Maier & Neustadt, L.L.P.

(57) ABSTRACT

An apparatus for encoding data includes a receiving section, a signal-deteriorating factor generation section, and a data-encoding section. The signal-deteriorating generating section generates a signal-deteriorating factor and includes a phase-shifting section to shift a phase of data received at the receiving section. The data-encoding section obtains encoded data by performing encoding processing on the data in which the signal-deteriorating factor is generated and includes an encoding section to perform encoding by use of sub-sampling on the data whose phase is shifted by the phase-shifting section.

109 Claims, 38 Drawing Sheets

U.S. PATENT DOCUMENTS

| | | | | |
|---|---|---|---|---|
| 4,849,817 | A | * | 7/1989 | Short .................... 375/240.01 |
| 5,034,981 | A | * | 7/1991 | Leonard et al. ............... 380/204 |
| 5,134,496 | A | * | 7/1992 | Schwab et al. ................. 386/94 |
| RE34,810 | E | * | 12/1994 | Lemaine et al. .............. 348/472 |
| 5,523,791 | A | * | 6/1996 | Berman ...................... 348/584 |
| 5,600,379 | A | * | 2/1997 | Wagner ....................... 348/497 |
| 5,757,910 | A | * | 5/1998 | Rim ............................. 380/203 |
| 6,041,158 | A | * | 3/2000 | Sato ................................ 386/1 |
| 6,061,451 | A | * | 5/2000 | Muratani et al. ............. 380/201 |
| 6,108,423 | A | | 8/2000 | Sako et al. |
| 6,345,099 | B1 | * | 2/2002 | Alvarez ....................... 380/203 |
| 6,359,905 | B1 | * | 3/2002 | Ogino et al. ................. 370/479 |
| 6,480,630 | B1 | | 11/2002 | Kondo |
| 6,636,640 | B2 | | 10/2003 | Kondo |
| 6,690,724 | B1 | | 2/2004 | Kadono |
| 6,768,191 | B2 | * | 7/2004 | Wennemuth et al. ......... 257/686 |
| 6,990,244 | B2 | | 1/2006 | Kondo |
| 7,072,491 | B2 | | 7/2006 | Kondo |

FOREIGN PATENT DOCUMENTS

| | | |
|---|---|---|
| CN | 1243635 A | 2/2000 |
| JP | 6-311043 | 11/1994 |
| JP | 10-191247 | 7/1998 |
| JP | 10-289522 | 10/1998 |
| JP | 2001-223981 | 8/2001 |
| JP | 2002-158985 | 5/2002 |
| JP | 2002-163866 | 6/2002 |
| JP | 2003-339016 | 11/2003 |

* cited by examiner

FIG. 11A ($V_{dg0}$)
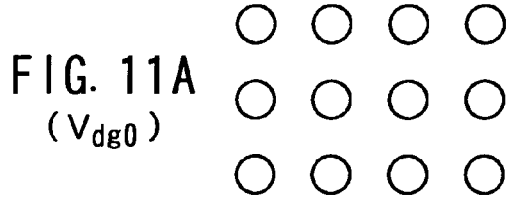
FIG. 11B ($V_{cd0}$)
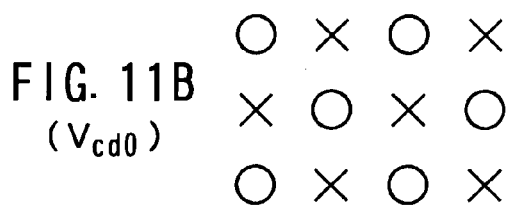
FIG. 11C ($V_{dg0}'$)
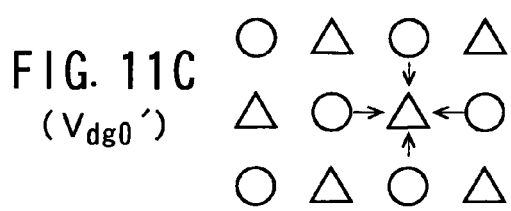
HORIZONTAL DIRECTION
FIG. 11D ($V_{dg1}$)
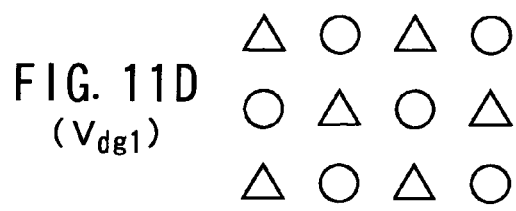
FIG. 11E ($V_{cd}$)
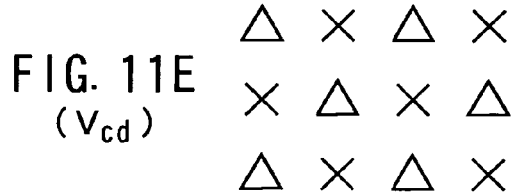
FIG. 11F ($V_{dg2}$)
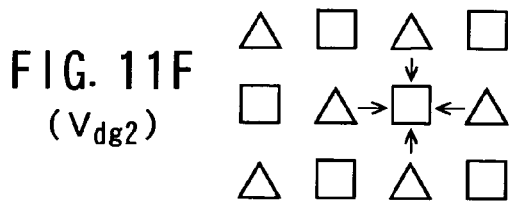
HORIZONTAL DIRECTION ($V_{dg1}$)

($V_{cd}'$)

HORIZONTAL DIRECTION

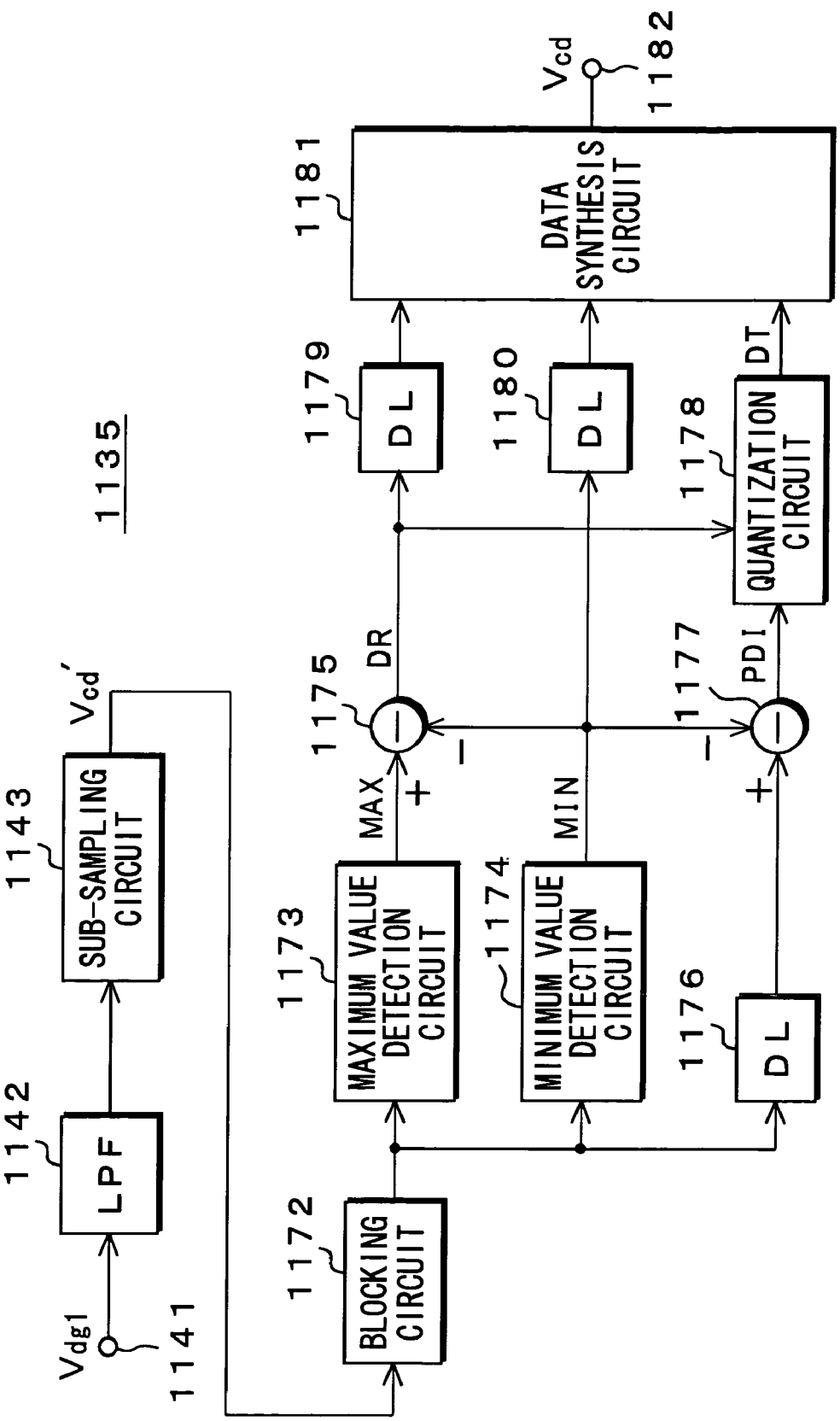

($V_{dg1}$)

($V_{cd}'$)

HORIZONTAL DIRECTION

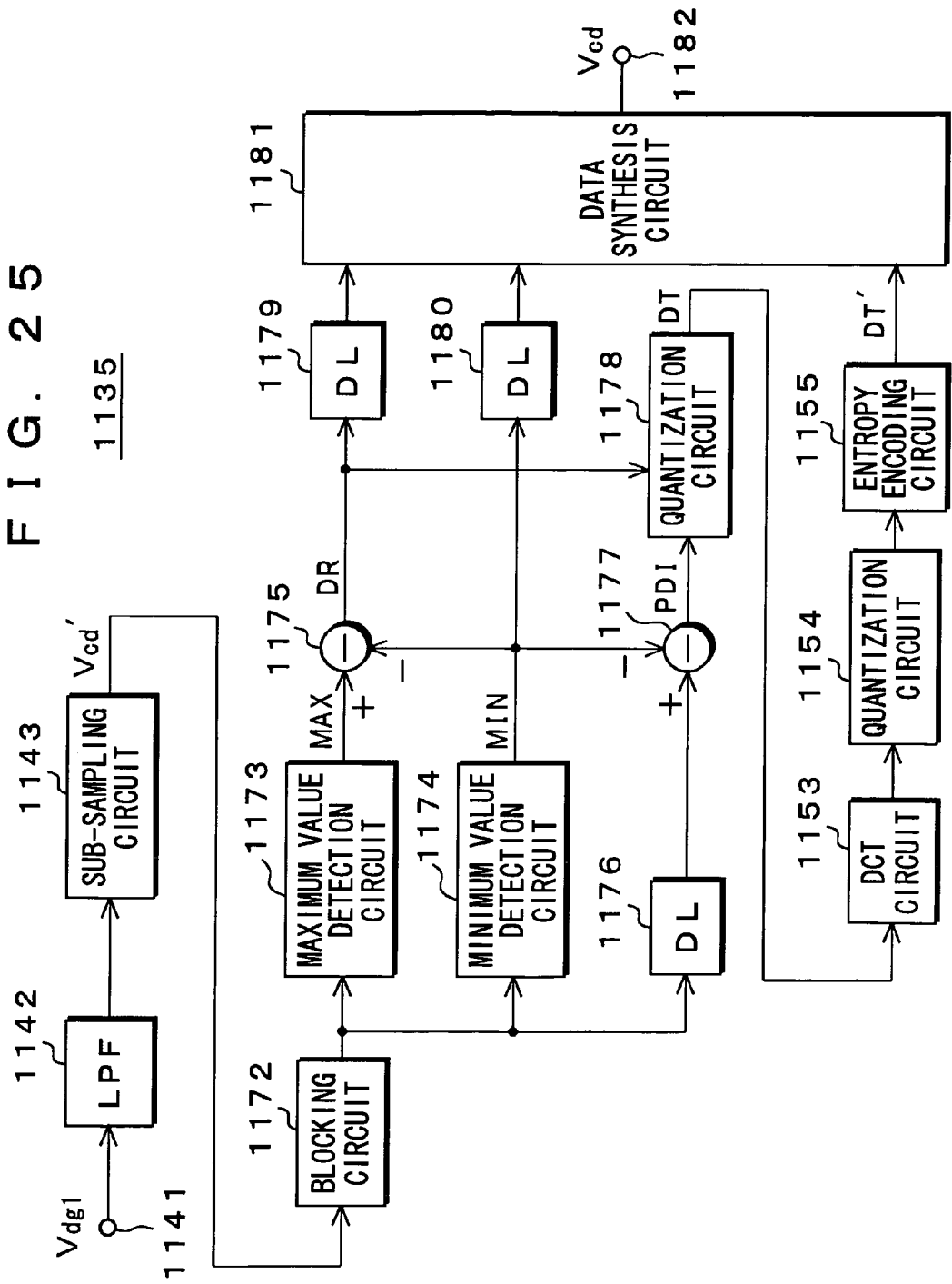

(BEFOR RESHUFFLING)

BL (AFTER RESHUFFLING)

BL

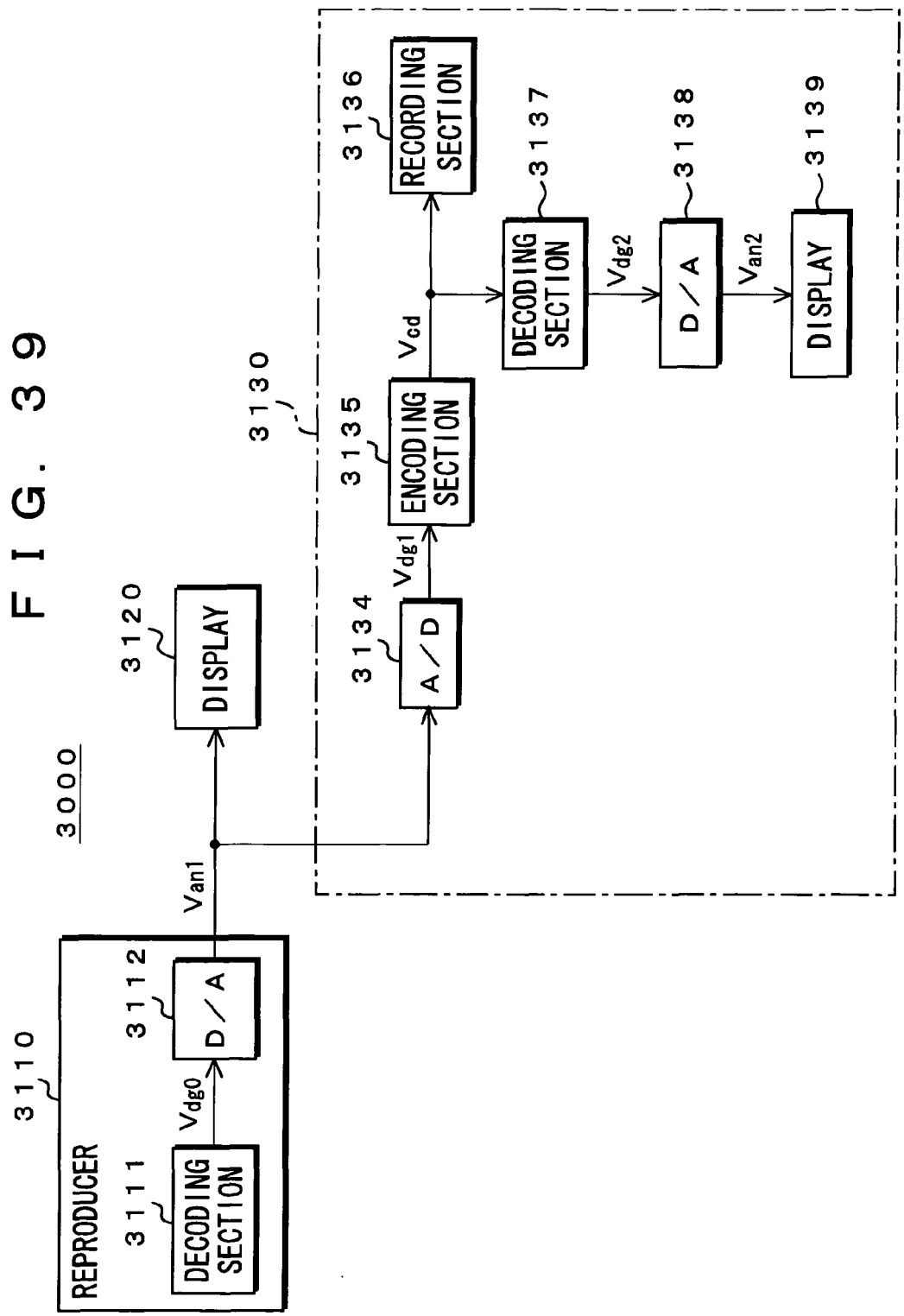

DATA ENCODING APPARATUS, DATA ENCODING METHOD, DATA OUTPUT APPARATUS, DATA OUTPUT METHOD, SIGNAL PROCESSING SYSTEM, SIGNAL PROCESSING APPARATUS, SIGNAL PROCESSING METHOD, DATA DECODING APPARATUS, AND DATA DECODING METHOD

TECHNICAL FIELD

The present invention relates to an apparatus and a method for encoding data, an apparatus and a method for outputting data, a system, an apparatus, and a method for processing signal, and an apparatus and a method for decoding data.

More specifically, the present invention relates to a data-encoding apparatus etc. for generating a signal-deteriorating factor in received data in accordance with this data or receiving data in which a signal-deteriorating factor is generated to obtain encoded data by encoding the data in which the signal-deteriorating factor is generated so that signal deterioration may be promoted in accordance with the signal-deteriorating factor, thereby disabling data to be copied in a condition where its good quality is maintained without deteriorating an output quality owing to the data before being copied.

The present invention also relates to a data output apparatus etc. for decoding encoded digital data to obtain decoded data and, based on this decoded data, generating a signal-deteriorating factor in this decoded data, thereby disabling data to be copied in a condition where its good quality is maintained without deteriorating an output quality owing to the data before being copied.

The present invention relates further to a signal-processing apparatus etc. for decoding encoded received data to obtain decoded data, generating a signal-deteriorating factor in this decoded data based on this decoded data, and obtaining the encoded data by encoding the decoded data in which the signal-deteriorating factor is generated so that signal deteriorating may be promoted in accordance with the signal-deteriorating factor, thereby remarkably deteriorating a decoded digital signal in the second or later encoding and decoding so that illegal copy can be well prevented which utilizes an analog signal obtained by decoding an encoded digital signal and performing digital-to-analog conversion on it.

The present invention relates additionally to a data-decoding apparatus etc. for receiving encoded data in which a signal-deteriorating factor is generated and decoding this encoded data so that signal deterioration may be promoted in accordance with the signal-deteriorating factor, to obtain decoded data so that the decoded data may be deteriorated remarkably.

The present invention relates additionally to a data-decoding apparatus etc. for receiving encoded data, generating a signal-deteriorating factor based on data obtained by decoding this encoded data, and decoding the encoded data in which this signal-deteriorating factor is generated so that signal deterioration may be promoted in accordance with the signal-deteriorating factor, to obtain decoded data so that the decoded data may be deteriorated remarkably.

BACKGROUND ART

FIG. 1 shows a configuration of a conventionally well-known image display system 200. This image display system 200 comprises a reproducer 210 for outputting analog image data Van and a display 220 for displaying an image due to the image data Van output from this reproducer 210.

In the reproducer 210, a decoding section 211 decodes encoded image data reproduced from a recording medium, not shown, such as an optical disc and a digital-to-analog (D/A) converter 212 converts digital image data obtained by this decoding to analog data, thereby obtaining analog image data Van. It is to be noted that the display 220 may be, for example, a cathode ray tube (CRT), a liquid crystal display (LCD), etc.

However, there is a danger that illegal copy may be performed by utilizing the analog image data Van output from the reproducer 210 in such an image display system 200.

That is, the analog image data Van is converted by an analog-to-digital (A/D) converter 231 into digital image data Vdg, which is supplied to an encoding section 232. In the encoding section 232, the digital image data Vdg is encoded to obtain encoded image data Vcd. Then, this encoded image data Vcd is supplied to a recording section 233 and recorded on a recording medium such as an optical disc.

Conventionally, to prevent illegal copy by use of such analog image data Van, it has been proposed in, for example, Japanese Patent Application Publication No. 2001-245270 etc. that the analog image data Van, if its copyright is protected, is scrambled and then output or forbidden from being output.

Although illegal copy can be prevented by outputting the analog image data Van in a condition where it is scrambled or by forbidding it from being output, there may occur a problem that a normal image is not displayed on the display 220.

It has been also proposed conventionally in Japanese Patent Application Publication No. Hei 10-289522 etc. that by providing a noise information generation section to either one or both of a compression decoding section on the reproduction side and a compression decoding section on the recording side and embedding noise information into digital video data to such an extent that single processing is not enough to identify the information in reproduction of an image, the image may be significantly deteriorated when copy is repeated a plurality of number of times although copy itself is possible, thereby substantially limiting the number of times of performing copy.

It is also known conventionally in, for example, Japanese Patent Application Publication No. Hei 07-123271 etc. that encoding is performed by using orthogonal transformation such as discrete cosine transform (DCT). FIG. 2 shows a configuration of an encoding apparatus 300 that uses DCT as orthogonal transformation.

A digital image signal Va received at a receiving terminal 301 is supplied to a blocking circuit 302. This blocking circuit 302 divides the image signal Va on an effective screen into blocks, each of which has a size of, for example, (4×4) pixels.

Data of each of the blocks obtained by the blocking circuit 302 is supplied to a DCT circuit 303. This DCT circuit 303 performs DCT on pixel data of each of the blocks for each block, to obtain coefficient data as a conversion coefficient. This coefficient data is supplied to a quantization circuit 304.

The quantization circuit 304 quantizes coefficient data of each of the blocks by using a quantization table, not shown, to obtain quantization coefficient data of the blocks sequentially. This quantization coefficient data of the blocks is supplied to an entropy encoding circuit 305. This encoding circuit 305 performs, for example, Huffman encoding on quantization coefficient data of the blocks. A Huffman-encoded signal of each of the blocks output from this encoding circuit 305 is output to an output terminal 306 as an encoded digital image signal Vb.

FIG. 3 shows a configuration of a decoding apparatus 320, which corresponds to the above-described encoding apparatus 300.

The encoded digital image signal Vb received at a receiving terminal 321 is supplied to an entropy decoding circuit 322. This image signal Vb is an entropy encoded signal, for example, a Huffman-encoded signal. The decoding circuit 322 decodes the image signal Vb, to obtain quantization coefficient data of each of the blocks.

This quantization coefficient data of each of the blocks is supplied to an inverse quantization circuit 323. The inverse quantization circuit 323 performs inverse quantization on the quantization coefficient data of each of the blocks, to obtain coefficient data of each of the blocks. This coefficient data of each of the blocks is supplied to an inverse DCT circuit 324. The inverse DCT circuit 324 performs inverse DCT on the coefficient data of the blocks for each of them, to obtain pixel data of each of the blocks.

The pixel data of the blocks thus obtained by the inverse DCT circuit 324 is supplied to a deblocking circuit 325. This deblocking circuit 325 brings back its data order to a raster scan order. Thus, from the deblocking circuit 325, a decoded digital image signal Va' is obtained and output to an output terminal 326.

If noise information is to be embedded by a compression decoding section on the reproduction side or by a compression encoding section on the recording side, a noise information generation section and a circuit to embed the noise information are required, thus bringing about a problem of an increase in circuit scale.

If encoding and decoding that involve orthogonal transformation is to be performed, on the other hand, quantization and inverse quantization are required, thus deteriorating image data. However, in this case, the second or later encoding and decoding is accompanied by no remarkable deterioration in a decoded digital image signal, so that it is impossible to prevent the above-described illegal copy by use of the analog image signal Van.

As one of the encoding approaches, adaptive dynamic range coding (ADRC) has been known in Japanese Patent Application Publication No. Sho 61-144989 etc. By ADRC, only redundancy in a direction of a level of image data is removed by utilizing a space-time correlation, to leave redundancy of the space-time so that concealing may be possible.

FIG. 4 shows a configuration of an encoding apparatus 400 for ADRC encoding.

Digital image data Vc received at a receiving terminal 401 is supplied to a blocking circuit 402. This blocking circuit 402 divides the image data Vc on the effective screen into blocks, each of which has a size of, for example, 4×4 pixels.

Data of images divided into blocks by the blocking circuit 402 is supplied to a maximum value detection circuit 403 and a minimum value detection circuit 404. The maximum value detection circuit 403 detects a maximum value MAX of the image data for each of the blocks. The minimum value detection circuit 404 detects a minimum value MIN of the image data for each of the blocks. The maximum value MAX and the minimum value MIN detected by the detection circuits 403 and 404 respectively are supplied to a subtracter 405. This subtracter 405 performs an operation of dynamic range DR=MAX−MIN.

Further, each block's image data output from the blocking circuit 402 is time-adjusted by a delay circuit 406 and then supplied to a subtracter 407. This subtracter 407 is supplied with a minimum value MIN detected by the minimum value detection circuit 404. This subtracter 407 subtracts, for each block, its minimum value MIN from its image data of the block to obtain minimum value-removed data PDI.

The minimum value-removed data PDI of each block obtained by the subtracter 407 is supplied to a quantization circuit 408. This quantization circuit 408 is supplied with a dynamic range DR obtained by the subtracter 405. This quantization circuit 408 quantizes the minimum value-removed data PDI by using a quantization step determined in accordance with the dynamic range DR. That is, if the number of quantization bits is n, the quantization circuit 408 sets level ranges obtained by equally dividing a dynamic range DR between a maximum value MAX and a minimum value MIN by $2^n$ so that an n-bit code signal may be assigned in accordance with which one of the level ranges the minimum value-removed data PDI belongs to.

FIG. 5 shows a case where the number of quantization bits is 3, in which a dynamic range DR between a maximum value MAX and a minimum value MIN is divided into eight equal level ranges and three-bit code signals (000) through (111) are assigned in accordance with which one of the level ranges the minimum value-removed data PDI belongs to. In FIG. 5, th1 through th7 are each a threshold value that indicates a boundary between the level ranges.

Referring back to FIG. 4, a code signal DT obtained by the quantization circuit 408 is supplied to a data synthesis circuit 411. This data synthesis circuit 411 is supplied with a dynamic range DR obtained by the subtracter 405 after it is time-adjusted by the delay circuit 409 and also with a minimum value MIN detected by the minimum value detection circuit 404 after it is time-adjusted by the delay circuit 410. This data synthesis circuit 411, for each block, synthesizes a minimum value MIN, a dynamic range DR, and a code signal DT having a length as much as the number of pixels in the block, to generate block data. The block data of each block generated by this data synthesis circuit 411 is sequentially output to an output terminal 412 as encoded image data Vd.

FIG. 6 shows a configuration of a decoding apparatus 420, which corresponds to the above-described encoding apparatus 400.

The encoded image data Vd received at a receiving terminal 421 is supplied to a data disassembly circuit 422, where it is disassembled into a minimum value MIN, a dynamic range DR, and a code signal DT of each block.

The code signal DT of each block output from the data disassembly circuit 422 is supplied to an inverse quantization circuit 423. This inverse quantization circuit 423 is supplied also with the dynamic range DR output from the data disassembly circuit 422. In the inverse quantization circuit 423, the code signal DT of each block is inverse-quantized in accordance with the dynamic range DR of the corresponding block, to obtain a minimum value-removed data PDI'.

In this case, as shown in FIG. 5, the dynamic range DR is equally divided by the number of quantization bits, so that mid-values L1 to L8 of the ranges are utilized as decoded values (minimum value-removed data PDI') of the code signals DT.

The minimum value-removed data PDI' of each block obtained by the inverse quantization circuit 423 is supplied to an adder 424. This adder 424 is also supplied with the minimum value MIN output from the data disassembly circuit 422. The adder 424 adds the minimum value MIN to the minimum value-removed data PDI', to obtain image data.

The image data of each block obtained by this adder 424 is supplied to a deblocking circuit 425. The deblocking circuit 425 brings back the data order to its raster scan order. Thus, decoded image data Vc' is obtained from the deblocking circuit 425. This image data Vc' is output to an output terminal 426.

In the case of encoding by use of the above-described conventional ADRC method, as shown in FIG. 5, a dynamic range DR' after inverse quantization is smaller than a dynamic range DR before quantization, so that the image data is deteriorated. However, this deterioration is not so significant.

DISCLOSURE OF THE INVENTION

It is an object of the present invention to disable data to be copied in a condition where its good quality is maintained without deteriorating an output quality owing to the data before being copied.

It is another object of the present invention to remarkably deteriorate image data in the second or later encoding and decoding thereof without bringing about any trouble such as non-display of an image or an expansion of a circuit scale, thereby preventing illegal copy by use of an analog signal.

An apparatus for encoding data relative to this invention comprises a receiving section that receiving the data, a signal-deteriorating factor generation section for generating a signal-deteriorating factor in the received data based on the received data, and a data-encoding section for obtaining encoded data by performing encoding processing on the data in which the signal-deteriorating factor is generated so that signal deterioration may be promoted in accordance with the signal-deteriorating factor.

An apparatus for encoding data relative to this invention comprises receiving means for receiving the data, signal-deteriorating factor generation means for generating a signal-deteriorating factor in the received data based on the received data, and data-encoding means for obtaining encoded data by performing encoding processing on the data in which the signal-deteriorating factor is generated so that signal deterioration may be promoted in accordance with the signal-deteriorating factor.

A method for encoding data relative to this invention comprises a data-receiving step of receiving the data, a signal-deteriorating factor generation step of generating a signal-deteriorating factor in the received data based on the received data, and a data-encoding step of obtaining encoded data by performing encoding processing on the data in which the signal-deteriorating factor is generated so that signal deterioration may be promoted in accordance with the signal-deteriorating factor.

For example, in the apparatus for encoding the data, the analog data is received at the receiving section, the signal-deteriorating factor generation section includes an analog-to-digital conversion section for converting the analog data received at the receiving section into digital data and a phase-shifting section for shifting a phase of digital data output from the analog-to-digital conversion section, and the data encoding section has an encoding section for encoding digital data whose phase is shifted by the phase-shifting section.

Also, for example, in the apparatus for encoding the data, digital data is received at the receiving section, the signal-deteriorating factor generation section includes a phase-shifting section for shifting a phase of the digital data which is received at the receiving section, and the data encoding section includes an encoding section for encoding the digital data whose phase is shifted by the phase-shifting section.

Further, for example, in the method for encoding the data, analog data is received in the receiving step, the method further comprises an analog-to-digital conversion step of converting the received analog data into digital data, the signal-deteriorating factor generation step includes a phase-shifting step of shifting a phase of the converted digital data, and the data-encoding step includes an encoding step of encoding the digital data whose phase is shifted.

Additionally, for example, in the method for encoding the data, digital data is received in the receiving step, the signal-deteriorating factor generation step includes a phase-shifting step of shifting a phase of the received digital data, and the data-encoding step includes an encoding step of encoding the digital data whose phase is shifted.

Received analog data is converted into digital data. This digital data is shifted in phase and then encoded. In this case, a shift width in phase of the digital data is supposed to be either fixed or random. A random shift width is set on the basis of, for example, an output of a random number generator upon power application.

For example, in a case where analog data is received, a phase of the digital data is shifted when analog data is converted into the digital data. In this case, for example, by shifting a phase of a sampling clock, the phase of the digital data can be shifted. Further, for example, by shifting a phase of the analog data, the phase of the digital data can be shifted.

For example, encoding may be performed by sub-sampling. In this encoding, by shifting a phase of digital data, the data obtained by sub-sampling has a phase different from that of encoded digital data used to acquire the above-described received analog data (received digital data). Therefore, a good quality cannot be maintained when the encoded digital data is recorded on the recording medium.

Further, for example, encoding may be conversion encoding by use of orthogonal transformation such as discrete cosine transform (DCT). In this encoding, by shifting a phase of digital data, a position of a block (DCT block) at the time of orthogonal transformation is shifted from a position of the block at the time of obtaining encoded digital data used to obtain the above-described received analog data (received digital data). Therefore, a good quality cannot be maintained when the encoded digital data is recorded on the recording medium.

Further, for example, encoding may be done by using the adaptive dynamic range coding (ADRC). In this encoding of ADRC, digital data is extracted from a predetermined range of phase-shifted digital data, to detect a maximum value, a minimum value, and a dynamic range of this extracted digital data. The extracted digital data is subtracted by the minimum value to generate minimum value-removed data, which is quantized by using a quantization step determined in accordance with the dynamic range.

In this encoding of ADRC, by shifting a phase of digital data, a position of a predetermined range (ADRC block) for the purpose of extraction of the digital data is shifted from a position of the predetermined range at the time of obtaining encoded digital data used to acquire the above-described received analog data (received digital data). Therefore, a good quality cannot be maintained when the encoded digital data is recorded on a recording medium.

By thus providing a configuration to encode the phase-shifted digital data, this disables the data to be copied in a condition where its good quality is maintained without deteriorating an output quality owing to the data before being copied.

For example, in the apparatus for encoding the data, digital data is received at the receiving section, the data-encoding section includes the signal-deteriorating factor generation section, the data-encoding section includes a first encoding section for encoding the digital data which is received at the receiving section, a second encoding section for further encoding the digital data encoded by the first encoding section, and a third encoding section for further encoding the digital data encoded by the second encoding section, and output data of the first encoding section, the second encoding section, and the third encoding section is deteriorated because the digital data which is received at the receiving section is shifted in phase. For example, the first encoding section performs encoding by use of sub-sampling on the digital data, and the second encoding section performs encoding by use of ADRC. In this case, the third encoding section performs conversion encoding on it.

Also, for example, in the apparatus for encoding the data, digital data is received at the receiving section, the signal-deteriorating factor generation section includes a first encoding section for performing encoding by use of sub-sampling on the digital data which is received at the receiving section, and the data-encoding section includes a second encoding section for performing conversion encoding on the digital data encoded by the first encoding section.

Further, for example, in the apparatus for encoding the data, digital data is received at the receiving section, the signal-deteriorating factor generation section includes a first encoding section for performing encoding by use of sub-sampling on the digital data which is received at the receiving section, and the data-encoding section includes a second encoding section for performing ADRC encoding on the digital data encoded by the first encoding section.

In a case where digital data is image data, the first encoding section performs the line offset sub-sampling and alternately arranging, for each two consecutive lines, pixel data constituting digital data that corresponds to these two lines to create new digital data. In this case, the second encoding section performs conversion encoding or ADRC encoding on this new digital data.

Due to deterioration at each of the encoding sections, a good quality cannot be maintained in a case where encoded digital data is recorded on a recording medium. In this case, the effect that good quality cannot be maintained is larger than the case of using a single encoding section.

For example, in the apparatus for encoding the data, digital signal is received at the receiving section, the signal-deteriorating factor generation section includes a blocking section for performing blocking on the received digital signal accompanied by shuffling in such a predetermined pattern as to reduce a correlation between adjacent items of data, and the data-encoding section includes a block-encoding section for obtaining an encoded digital signal by performing block encoding on data of each of the blocks obtained by the blocking section.

Also, in the method for encoding the data, digital data is received in the receiving step, the signal-deteriorating factor generation step includes a blocking step of performing blocking on the received digital signal accompanied by shuffling in such a predetermined pattern as to reduce a correlation between adjacent items of data, and the data-encoding step includes a block-encoding step of obtaining an encoded digital signal by performing block-encoding on data of each of the blocks obtained by the blocking step.

The received digital signal is blocked, so that block encoding is performed on data of each of the blocks. This blocking is supposed to involve an operation of shuffling with a predetermined pattern in such a manner as to decrease a correlation between items of data of the adjacent positions contained in each of the blocks. In this case, as for the second or later encoding and decoding, information to be lost in encoding processing, for example, a high-frequency component can be increased, to increase a degree of deterioration in the encoded digital signal, hence, the decoded digital signal. This disables the data to be copied in a condition where its good quality is maintained without deteriorating an output quality owing to the data before being copied.

For example, in the apparatus for encoding the data, the apparatus further comprises an extraction section for extracting data from a predetermined range of the data received at the receiving section, the data-encoding section includes a maximum value/minimum value detection section for detecting a maximum value and a minimum value of the data extracted by the extraction section, a dynamic range detection section for detecting a dynamic range of the data extracted by the extraction section, according to the maximum value and the minimum value detected by the maximum value/minimum value detection section, a generation section for generating minimum value-removed data by subtracting the minimum value detected by the maximum value/minimum value detection section from the data extracted by the extraction section, and an encoding section for obtaining encoded data by quantizing the minimum value-removed data generated by the generation section, by using a quantization step determined in accordance with the dynamic range detected by the dynamic range detection section, and the encoding section includes the signal-deteriorating factor generation section for performing quantization in a condition where a quantization step in at least one of a region on the side of the maximum value and a region on the side of the minimum value is made larger than quantization steps in other regions.

Also, in the method for encoding the data, the method further comprises an extraction step of extracting data from a predetermined range of the received data, the data-encoding step includes a first detection step of detecting a maximum value and a minimum value of the extracted data, a second detection step of detecting a dynamic range of the extracted data based on the detected maximum value and minimum value, a generation step of generating minimum value-removed data by subtracting the detected minimum value from the extracted data, and an encoding step of obtaining encoded data by quantizing the generated minimum value-removed data in a quantization step determined in accordance with the detected dynamic range, and the encoding step includes the signal-deteriorating factor generation step of performing quantization in a condition where a quantization step in at least one of regions on the maximum value side and the minimum value side is made larger than quantization steps in other regions.

For example, data is extracted from a predetermined range of 4×4 pixels in the received data. A maximum value MAX and a minimum value MIN of this extracted data are detected, and further, based on these maximum value MAX and minimum value MIN, a dynamic range DR is detected. The minimum value MIN is subtracted from the extracted data to create minimum value-removed data PDI. This minimum value-removed data PDI is quantized by using quantization step determined in accordance with the dynamic range DR, to obtain encoded data. In this case, the number of quantization bits is configured to change in accordance with, for example, the dynamic range DR. Thus, efficient encoding is made possible.

In this case, quantization is performed in a condition where a quantization step in at least one of the regions of the maximum value side and the minimum value side is made larger than those of other regions. Therefore, the dynamic range is greatly decreased as it undergoes encoding and decoding processes. This disables the data to be copied in a condition where its good quality is maintained without deteriorating an output quality owing to the data before being copied.

For example, a predetermined range on the maximum value side, for example, the number of times in the maximum value side, which is the number of data contained in a 10%-range thereof, and a predetermined range on the minimum value side, for example, the number of times in the minimum value D side, which is the number of data contained in a 10%-range thereof are detected on the basis of the extracted data. If, as a result, the number of times of the minimum value side is smaller than that of maximum value side, the quantization step in the region of the minimum value side is made larger than those of other regions; if the number of times of the maximum value side is smaller than that of the minimum value side, on the other hand, the quantization step in the region of the maximum value side is made larger than those of other regions.

In this case, the dynamic range greatly decreases as it undergoes encoding and decoding; specifically, although the dynamic range is greatly decreased after it undergoes the first encoding and decoding, only a small number of items of data changes greatly in value, resulting in slight deterioration as a whole, whereas when it undergoes the second or later encoding and decoding, a larger number of items of data change in value as the dynamic range is deteriorated, resulting in heavy deterioration.

For example, in the apparatus for encoding the data, image data is received at the receiving section, the apparatus further includes an orthogonal transformation section for obtaining a conversion coefficient by performing orthogonal transformation on image data of each of the blocks obtained by dividing the image data received at the receiving section into two-dimensional blocks and a quantization section for quantizing the conversion coefficient of each of the blocks supplied from the orthogonal transformation section, the signal-deteriorating factor generation section includes a block information generation section for generating block information indicative of a block whose conversion coefficient of a high-range frequency domain is to be removed, and a range information generation section for generating range information indicative of a range of the high-range frequency domain, and the data-encoding section includes a conversion coefficient removal section for removing a conversion coefficient of a high-range frequency domain indicated by the range information generated by the range information generation section, in a block indicated by the block information generated by the block information generation section, on the side of an input or an output of the quantization section.

Also, for example, in the method for encoding the data, image data is received in the receiving step, the method further comprises an orthogonal transformation step of obtaining a conversion coefficient by performing orthogonal transformation on the image data of each of the blocks obtained by dividing the received image data into two-dimensional blocks, and a quantization step of quantizing the conversion coefficient of each of the blocks obtained by the orthogonal transformation step, the signal-deteriorating factor generation step includes a block information generation step of generating block information indicative of a block whose conversion coefficient of a high-range frequency domain is to be removed, and a range information generation step of generating range information indicative of a range of the high-range frequency domain, and the data-encoding step includes a conversion coefficient removal step of removing a conversion coefficient of a high-range frequency domain indicated by the range information generated by the range information generation step, in a block indicated by the block information generated by the block information generation step, before or after the quantization is performed in the quantization step.

In encoding, a conversion coefficient is obtained by performing orthogonal transformation on image data of each of the bocks obtained by dividing the image data into two-dimensional blocks. This orthogonal transformation is, for example, discrete cosine transform (DCT). The conversion coefficients of these blocks are quantized to obtain encoded data.

In this case, the conversion coefficient of a high-range frequency domain in a predetermined block is removed either before or after quantization. A block that the conversion coefficient of the high-range frequency domain is to be removed is indicated by block information and a range of the high-range frequency domain is indicated by range information. For example, the blocks from which the conversion coefficient of the high-range frequency domain is to be removed are selected alternately at least one of horizontal and vertical directions.

In this case, in decoding, inverse quantization is performed on the encoded data. Inverse orthogonal transformation is then performed on the conversion coefficients in each of the blocks to obtain image data. In this case, the conversion coefficient of the high-range frequency domain in the above-described predetermined block is interpolated either before or after inverse quantization. This interpolation is performed using conversion coefficients of a block that is located in the vicinity of this block and whose conversion coefficients of the high-range frequency domain are not removed in encoding.

It is to be noted that if the encoded data is obtained by further performing variable-length encoding on the quantized data, variable-length decoding is performed on the encoded data before inverse quantization in decoding.

As described above, in encoding, of conversion coefficients of the blocks obtained by performing orthogonal transformation, those conversion coefficients of a high-frequency domain in the predetermined block are removed; in decoding, the conversion coefficient of the high-range frequency domain in the above-described predetermined block is interpolated using the conversion coefficient of the high-range frequency domain in a block located in the vicinity of this predetermined block.

In this case, since the encoded data is decoded using a conversion coefficient in a deterioration-free high-range frequency domain of the block present in the vicinity of the predetermined block, an image quality is improved as compared with a case where the encoded data with no conversion coefficient of the high-range frequency domain is decoded as it is using any other ordinary decoding apparatus, because edge portions are improved in the first encoding and decoding.

In the second or later encoding and decoding also, as in the case of the first encoding and decoding, a conversion coefficient of a high-range frequency domain in a predetermined block is interpolated using conversion coefficients of a high-range frequency domain in a block located in the vicinity thereof. In this case, however, owing to fluctuations in sampling phase that occur in analog data-to-digital data conversion, a block position is shifted from that in the first encoding and decoding. Therefore, the conversion coefficient of the high-range frequency domain in the block located in the vicinity of the predetermined block is deteriorated in the first encoding and decoding, so that if the conversion coefficient of the high-range frequency domain in the predetermined block is interpolated using conversion coefficients of the high-range frequency domain in the block located in the vicinity thereof, image data encounters significant deterioration. This disables the data to be copied in a condition where its good quality is maintained without deteriorating a quality of an output owing to the data before being copied.

It is to be noted that a range of a high-range frequency domain to be removed from a conversion coefficient of a predetermined block in encoding could be made variable. In this case, encoded data of this predetermined block is transmitted in a condition where it is added range information that indicates a range of the high-range frequency domain to be removed. In decoding, on the other hand, based on the range information, the conversion coefficient of the high-range frequency domain is interpolated from the block located in the vicinity of the predetermined block. It is thus possible to make variable a range of a high-range frequency domain to be removed from a conversion coefficient of a predetermined block, thereby setting to a desired value an intensity of deterioration in image data owing to subjection to encoding and decoding.

An apparatus for encoding data relative to this invention comprises an receiving section that receives data into which a signal-deteriorating factor for deteriorating a signal is generated, the factor being generated by a signal-deteriorating factor generation section for generating the factor, and a data-encoding section that obtains encoded data by performing encoding processing on the data into which the signal-deteriorating factor is generated so that signal deterioration may be promoted in accordance with the signal-deteriorating factor.

A apparatus for encoding data relative to this invention comprises receiving means for receiving data into which a signal-deteriorating factor for deteriorating a signal is generated, the factor being generated by a signal-deteriorating factor generation section for generating the factor, and data-encoding means for obtaining encoded data by performing encoding processing on the data into which the signal-deteriorating factor is generated so that signal deterioration may be promoted in accordance with the signal-deteriorating factor.

A method for encoding data relative to this invention comprises a receiving step of receiving data into which a signal-deteriorating factor for deteriorating a signal is generated, the factor being generated by a signal-deteriorating factor generation section for generating the factor, and a data-encoding step of obtaining encoded data by performing encoding processing on the data into which the signal-deteriorating factor is generated so that signal deterioration may be promoted in accordance with the signal-deteriorating factor.

For example, in the apparatus for encoding the data, the receiving section receives a second digital signal that is obtained by sequentially performing encoding processing, decoding processing, digital-to-analog conversion processing that generates analog distortion, and analog-to-digital conversion processing on a first digital signal, the data-encoding section includes an encoding section for obtaining an encoded digital signal by performing encoding processing on the second digital signal which the receiving section receives, and a decoded digital signal obtained by decoding an encoded digital signal obtained by the encoding section has a larger degree of deterioration than a decoded digital signal obtained by performing encoding processing and decoding processing on the first digital signal.

Also, for example, in the method for encoding the data, in the receiving step, a second digital signal is received which is obtained by sequentially performing encoding processing, decoding processing, digital-to-analog conversion processing that generates analog distortion and analog-to-digital conversion processing on a first digital signal, the data encoding step includes an encoding step of obtaining an encoded digital signal by performing encoding processing on the second digital signal which is received in the input step, and a decoded digital signal obtained by decoding an encoded digital signal obtained by the encoding step has a larger degree of deterioration than a decoded digital signal obtained by performing encoding processing and decoding processing on the first digital signal.

An analog signal accompanied by analog distortion is converted into a digital signal, which is in turn encoded to obtain an encoded digital signal. For example, this analog distortion may occur when a high-frequency component is removed in the digital-to-analog conversion, when a signal phase is shifted in the digital-to-analog conversion, etc. This encoding processing promotes deterioration of the encoded digital signal owing to an influence of the analog distortion on the digital signal.

In this case, as for the second or later encoding and decoding, the above-described encoding processing is surely performed on a digital signal that corresponds to an analog signal accompanied by analog distortion, thereby promoting deterioration of the encoded digital signal. This disables data to be copied in a condition where its good quality is maintained without deteriorating a quality of an output owing to the data before being copied, thereby preventing illegal copy by use of an analog signal.

For example, block encoding is employed for encoding. In this case, a digital signal that corresponds to the analog signal is blocked, so that block encoding is performed on data of each of the blocks. In this case, for example, this blocking is supposed to accompany shuffling of a predetermined pattern in such a manner as to reduce a correlation between items of data of mutually adjacent positions contained in each of the blocks. Accordingly, as for the second or later encoding and decoding, information to be lost in encoding processing, for example, a high-frequency component can be increased, to increase a degree of deterioration of the encoded digital signal, hence, the decoded digital signal.

An apparatus for outputting data relative to this invention comprises a data output section that outputs encoded digital data, a data decoding section that obtains decoded data by decoding the output digital data, a synchronization signal generation section that generates a synchronization signal corresponding to the decoded data, a signal-deteriorating factor generation section that generates a signal-deteriorating factor promoting signal deterioration into the decoded data according to the decoded data, and a synthesis section that synthesizes data output from the signal-deteriorating factor generation section and the synchronization signal generated by the synchronization signal generation section.

An apparatus for outputting data relative to this invention comprises data output means for outputting encoded digital data, data decoding means for obtaining decoded data by decoding the output digital data, synchronization signal generation means for generating a synchronization signal corresponding to the decoded data, signal-deteriorating factor generation means for generating a signal-deteriorating factor that promotes signal deterioration into the decoded data according to the decoded data, and synthesis means for synthesizing data output from the signal-deteriorating factor generation means and the synchronization signal generated by the synchronization signal generation means.

A method for outputting data relative to this invention comprises a data output step of outputting encoded digital data, a data decoding step of obtaining decoded data by decoding the output digital data, a synchronization signal generation step of generating a synchronization signal corresponding to the decoded data, a signal-deteriorating factor generation step of generating a signal-deteriorating factor that promotes signal deterioration into the decoded data according to the decoded data, and a synthesis step of synthesizing data in which the signal-deteriorating factor is generated and the synchronization signal.

For example, in the apparatus for outputting data, the signal-deteriorating factor generation section includes a phase-shifting section for shifting a phase of the synchronization signal generated by the synchronization signal generation section and a phase of the digital data output from the decoding section with respect to each other, and the synthesis section synthesizes the synchronization signal whose phase is shifted respectively by the phase shifting section and the digital data.

Also, for example, in the apparatus for outputting data, the signal-deteriorating factor generation step includes a phase-shifting step of shifting a phase of the generated synchronization signal and a phase of the digital data obtained by decoding with respect to each other, and the synthesis step synthesizes the synchronization signal and the digital data whose phases are shifted respectively.

The encoded digital data is reproduced from, for example, a recording medium and output. Further, for example, this encoded digital data is processed as a broadcast signal and output. In this case, this encoded digital data is decoded. The encoded digital data is obtained by performing, for example, encoding by use of sub-sampling, conversion encoding, or ADRC encoding, etc.

Based on synchronization information that corresponds to the digital data obtained by decoding, a synchronization signal is generated. After this synchronization signal and the digital data obtained by decoding are shifted in phase with respect to each other, these synchronization signal and digital data are synthesized. The digital data thus obtained by synthesis is converted into, for example, analog data. A shift in phase can be given by shifting the phase of, for example, either the synchronization signal or the digital data. It is to be noted that a phase shift width is supposed to be either fixed or random.

In such a manner, the synchronization signal and the digital data obtained through decoding are shifted in phase with respect to each other. Therefore, significant deterioration occurs if digital data is processed in accordance with the synchronization signal and then encoded again. It is to be noted that even if the synchronization signal and the digital data are thus shifted in phase with respect to each other, a quality of an output owing to this digital data is not deteriorated.

For example, if the encoding is performed by use of sub-sampling, when the synchronization signal and the digital data are shifted in phase with respect to each other, data obtained by the sub-sampling has a phase different from that of the above-described encoded digital data before being decoded. Therefore, in a case where the digital data after being encoded is recorded on a recording medium, its good quality cannot be maintained.

Further, for example, if the encoding is conversion encoding by use of orthogonal transformation such as DCT, when the synchronization signal and the digital data are shifted in phase with respect to each other, a position of a block (DCT block) at the time of orthogonal transformation is shifted from a position of the block at the time of obtaining the above-described encoded digital data before being decoded. Therefore, in a case where the digital data after being encoded is recorded on a recording medium, its good quality cannot be maintained.

Further, for example, the encoding is of ADRC, when the synchronization signal and the digital data are shifted in phase with respect to each other, a position of a predetermined range (ADRC block) for the purpose of extraction of digital data is shifted from a position of the predetermined range at the time of obtaining the above-described encoded digital data before being decoded. Therefore, in a case where the digital data after being encoded is recorded on a recording medium, its good quality cannot be maintained.

Thus, providing such a configuration that digital data to be output and a synchronization signal may be shifted in phase with respect to each other disables data to be copied in a condition where its good quality is maintained without deteriorating a quality of an output owing to the data before being copied.

A system for processing a signal relative to this invention comprises a receiving section that receives encoded data, a data-decoding section that obtains decoded data by performing decoding processing on the received encoded data, a signal-deteriorating factor generation section that generates a signal-deteriorating factor in the decoded data in accordance with the decoded data, and a data-encoding section that obtains encoded data by performing encoding processing on the data in which the signal-deteriorating factor is generated so that signal deterioration may be promoted in accordance with the signal-deteriorating factor.

A system for processing a signal relative to this invention comprises receiving means for receiving encoded data, data-decoding means for obtaining decoded data by performing decoding processing on the received encoded data, signal-deteriorating factor generation means for generating a signal-deteriorating factor in the decoded data in accordance with the decoded data, and data-encoding means for obtaining encoded data by performing encoding processing on the data in which the signal-deteriorating factor is generated so that signal deterioration may be promoted in accordance with the signal-deteriorating factor.

For example, in the system for processing the signal, the encoded data received at the receiving section is an encoded digital signal and the data-decoding section obtains a decoded digital signal by performing decoding processing on the encoded digital signal, the signal-deteriorating factor generation section includes a digital-to-analog conversion section for obtaining an analog signal containing analog distortion by performing digital-to-analog conversion processing on the decoded digital signal obtained by the data-decoding section, and an analog-to-digital conversion section for obtaining a digital signal by performing analog-to-digital conversion processing on the analog signal obtained by the digital-to-analog conversion section, the data-encoding section includes an encoding section for obtaining an encoded digital signal by performing encoding processing on the digital signal obtained by the analog-to-digital conversion section, and the encoding processing performed by the encoding section promotes deterioration in the encoded digital signal owing to an influence of the analog distortion on the digital signal.

An apparatus for processing a signal relative to this invention comprises a receiving section that receives encoded data, a data-decoding section that obtains decoded data by performing decoding processing on the received encoded data, a signal-deteriorating factor generation section that generates a signal-deteriorating factor in the decoded data in accordance with the decoded data, and a data encoding section that obtains encoded data by performing encoding processing on the data in which the signal-deteriorating factor is generated so that signal deterioration may be promoted in accordance with the signal-deteriorating factor.

Further, an apparatus for processing a signal relative to this invention comprises receiving means for receiving encoded data, data-decoding means for obtaining decoded data by performing decoding processing on the received encoded data, signal-deteriorating factor generation means for generating a signal-deteriorating factor in the decoded data in accordance with the decoded data, and data-encoding means for obtaining encoded data by performing encoding processing on data in which the signal-deteriorating factor is generated so that signal deterioration may be promoted in accordance with the signal-deteriorating factor.

A method for processing a signal relative to this invention comprises a receiving step of receiving encoded data, a data-decoding step of obtaining decoded data by performing decoding processing on the received encoded data, a signal-deteriorating factor generation step of generating a signal-deteriorating factor in the decoded data in accordance with the decoded data, and a data-encoding step of obtaining encoded data by performing encoding processing on the data in which the signal-deteriorating factor is generated so that signal deterioration may be promoted in accordance with the signal-deteriorating factor.

For example, in the apparatus for processing the signal, the encoded data that is received at the receiving section is an encoded digital signal and the data-decoding section obtains a decoded digital signal by performing decoding processing on the encoded digital signal, the signal-deteriorating factor generation section includes a digital-to-analog conversion section for obtaining an analog signal containing analog distortion by performing digital-to-analog conversion processing on the decoded digital signal obtained by the data-decoding section, and an analog-to-digital conversion section for obtaining a digital signal by performing analog-to-digital conversion processing on the analog signal obtained by the digital-to-analog conversion section, the data-encoding section includes an encoding section for obtaining an encoded digital signal by performing encoding processing on the digital signal obtained by the analog-to-digital conversion section, and the encoding processing performed by the encoding section promotes deterioration in the encoded digital signal owing to an influence of the analog distortion on the digital signal.

Also, for example, in the method for processing the signal, the encoded data that is received in the receiving step is encoded digital data and the data-decoding step is provided to obtain a decoded digital signal by performing decoding processing on the encoded digital signal, the signal-deteriorating factor generation step includes a digital-to-analog conversion step of obtaining an analog signal containing analog distortion by performing digital-to-analog conversion processing on the decoded digital signal obtained by the data-decoding step, and an analog-to-digital conversion step of obtaining a digital signal by performing analog-to-digital conversion processing on the analog signal obtained by the digital-to-analog conversion step, the data-encoding step includes an encoding step of obtaining an encoded digital signal by performing encoding processing on the digital signal obtained by the analog-to-digital conversion step, and the encoding processing performed by the encoding step promotes deterioration in the encoded digital signal owing to an influence of the analog distortion on the digital signal.

An analog signal accompanied by analog distortion is converted into a digital signal, which is in turn encoded to obtain an encoded digital signal. For example, the analog distortion may occur when a high-frequency component is removed in the digital-to-analog conversion, when a signal phase is shifted in the digital-to-analog conversion, etc. This encoding processing promotes deterioration of the encoded digital signal owing to an influence of the analog distortion on the digital signal.

In this case, as for the second or later encoding and decoding, the above-described encoding processing is surely performed on a digital signal that corresponds to an analog signal accompanied by analog distortion, thereby promoting deterioration of the encoded digital signal. This disables data to be copied in a condition where its good quality is maintained without deteriorating a quality of an output owing to the data before being copied, thereby preventing illegal copy by use of an analog signal.

For example, block encoding is employed for encoding. In this case, a digital signal that corresponds to the analog signal is blocked, so that block encoding is performed on data of each of the blocks. In this case, for example, this blocking is supposed to accompany shuffling of a predetermined pattern in such a manner as to reduce a correlation between items of data of mutually adjacent positions contained in each of the blocks. Accordingly, as for the second or later encoding and decoding, information to be lost in encoding processing, for example, a high-frequency component can be increased, to increase a degree of deterioration of the encoded digital signal, hence, the decoded digital signal.

An apparatus for decoding data encoded by an encoding apparatus including a signal-deteriorating factor generation section that generates a factor for deteriorating a signal, relative to this invention comprises a receiving section that receives encoded data, and a data-decoding section that obtains decoded data by performing decoding processing on the received encoded data in accordance with the generated signal-deteriorating factor so as to promote signal deterioration.

An apparatus for decoding data encoded by an encoding apparatus including a signal-deteriorating factor generation section that generates a factor for deteriorating a signal, relative to this invention, comprises receiving means for receiving the encoded data, and data-decoding means for obtaining decoded data by performing decoding processing on the received encoded data in accordance with the generated signal-deteriorating factor so as to promote signal deterioration.

A method for decoding data encoded by an encoding method comprising a signal-deteriorating factor generation step that generates a factor for deteriorating a signal, relative to this invention, comprises a receiving step of receiving the encoded data, and a data-decoding step of obtaining decoded data by performing decoding processing on the received encoded data in accordance with the generated signal-deteriorating factor so as to promote signal deterioration.

For example, in the apparatus for decoding data, the apparatus decodes an encoded digital signal in which a signal-deteriorating factor is generated and which is obtained by performing block encoding on data of each of the blocks obtained by performing blocking on a digital signal, the blocking being accompanied by shuffling in such a predetermined pattern as to reduce a correlation between adjacent items of data, the data-decoding section includes a block-decoding section for performing block-decoding processing on the encoded digital signal, and an inverse blocking section for performing de-shuffling and inverse blocking on the data of each of the blocks obtained by the block-decoding section.

Also, for example, in the method for decoding the data, the method decodes an encoded digital signal in which a signal-deteriorating factor is generated and which is obtained by performing block encoding on data of each of the blocks obtained by performing blocking on a digital signal, the blocking being accompanied by shuffling in such a predetermined pattern as to reduce a correlation between adjacent items of data, the data-decoding step includes a block-decoding step of performing block-decoding processing on the encoded digital signal, and an inverse blocking step of performing de-shuffling and inverse blocking on the data of each of the blocks obtained by the block-decoding step.

Block decoding processing is performed on an encoded digital signal in which a signal-deteriorating factor is generated. This encoded digital signal is obtained by performing block encoding on data of blocks obtained by performing blocking accompanied by shuffling in a predetermined pattern so that a correlation between mutually adjacent items of data may be decreased. In this case, as for the second or later encoding and decoding, information to be lost in encoding processing, for example, a high-frequency component can be increased, to increase a degree of deterioration of the encoded digital signal, hence, the decoded digital signal.

For example, in the apparatus for decoding data, the apparatus decodes encoded data in which a signal-deteriorating factor is generated and which is obtained by performing orthogonal transformation on image data of each of the blocks obtained by dividing the image data into two-dimensional blocks, performing quantization on a conversion coefficient of each of the blocks obtained by this orthogonal transformation, and removing the conversion coefficient of a high-range frequency domain in a predetermined block before or after this quantization, the data-decoding section includes an inverse quantization section for performing inverse quantization on the encoded data, an inverse orthogonal transformation section for obtaining the image data by performing inverse orthogonal transformation on the conversion coefficient of each of the blocks from the inverse quantization section, and a conversion coefficient interpolation section for interpolating the conversion coefficient of the high-range frequency domain in the predetermined block by using the conversion coefficients of the high-range frequency domain of a block located in the vicinity of the predetermined block on the side of an input or an output of the inverse quantization section.

Also, for example, in the method for decoding the data, the method decodes encoded data in which a signal-deteriorating factor is generated and which is obtained by performing orthogonal transformation on image data of each of the blocks obtained by dividing the image data into two-dimensional blocks, performing quantization on a conversion coefficient of each of the blocks obtained by this orthogonal transformation, and removing the conversion coefficient of a high-range frequency domain in a predetermined block before or after this quantization, the data-decoding step includes an inverse quantization step of performing inverse quantization on the encoded data, an inverse orthogonal transformation step of obtaining the image data by performing inverse orthogonal transformation on the conversion coefficient of each of the blocks obtained by performing the inverse quantization in the inverse quantization step, and a conversion coefficient interpolation step of interpolating the conversion coefficient of the high-range frequency domain in the predetermined block by using the conversion coefficients of the high-range frequency domain of a block located in the vicinity of the predetermined block before or after performing inverse quantization in the inverse quantization step.

In encoding, a conversion coefficient is obtained by performing orthogonal transformation on image data of each of the bocks obtained by dividing the image data into two-dimensional blocks. This orthogonal transformation is, for example, discrete cosine transform (DCT). The conversion coefficients of these blocks are quantized to obtain encoded data.

In this case, the conversion coefficient of a high-range frequency domain in a predetermined block is removed either before or after quantization. A block that the conversion coefficient of the high-range frequency domain is to be removed is indicated by block information and a range of the high-range frequency domain is indicated by range information. For example, the blocks from which the conversion coefficient of the high-range frequency domain is to be removed are selected alternately at least one of horizontal and vertical directions.

In decoding, inverse quantization is performed on the encoded data. Inverse orthogonal transformation is then performed on the conversion coefficients in each of the blocks to obtain image data. In this case, the conversion coefficient of the high-range frequency domain in the above-described predetermined block is interpolated either before or after inverse quantization. This interpolation is performed using conversion coefficients of a block that is located in the vicinity of this block and whose conversion coefficients of the high-range frequency domain are not removed in encoding.

It is to be noted that if the encoded data is obtained by further performing variable-length encoding on the quantized data, variable-length decoding is performed on the encoded data before inverse quantization in decoding.

As described above, in encoding, of conversion coefficients of the blocks obtained by performing orthogonal transformation, those conversion coefficients of a high-frequency domain in the predetermined block are removed; in decoding, the conversion coefficient of the high-range frequency domain in the above-described predetermined block is interpolated using the conversion coefficient of the high-range frequency domain in a block located in the vicinity of this predetermined block.

In this case, since the encoded data is decoded using a conversion coefficient in a deterioration-free high-range frequency domain of the block present in the vicinity of the predetermined block, an image quality is improved as compared with a case where the encoded data with no conversion coefficient of the high-range frequency domain is decoded as it is using any other ordinary decoding apparatus, because edge portions are improved in the first encoding and decoding.

In the second or later encoding and decoding also, as in the case of the first encoding and decoding, a conversion coefficient of a high-range frequency domain in a predetermined block is interpolated using conversion coefficients of a high-range frequency domain in a block located in the vicinity thereof. In this case, however, owing to fluctuations in sampling phase that occur in analog data-to-digital data conversion, a block position is shifted from that in the first encoding and decoding. Therefore, the conversion coefficient of the high-range frequency domain in the block located in the vicinity of the predetermined block is deteriorated in the first encoding and decoding, so that if coefficient of the high-range frequency domain in the predetermined block is interpolated using conversion coefficients of the high-range frequency domain in the block located in the vicinity thereof, image data encounters significant deterioration.

In this case, the conversion coefficient of a high-range frequency domain in a predetermined block is removed either before or after quantization. A block that the conversion coefficient of the high-range frequency domain is to be removed is indicated by block information and a range of the high-range frequency domain is indicated by range information. For example, the blocks from which the conversion coefficient of the high-range frequency domain is to be removed are selected alternately at least one of horizontal and vertical directions.

In this case, in decoding, inverse quantization is performed on the encoded data. Inverse orthogonal transformation is then performed on the conversion coefficients in each of the blocks to obtain image data. In this case, the conversion coefficient of the high-range frequency domain in the above-described predetermined block is interpolated either before or after inverse quantization. This interpolation is performed using conversion coefficients of a block that is located in the vicinity of this block and whose conversion coefficients of the high-range frequency domain are not removed in encoding.

It is to be noted that if the encoded data is obtained by further performing variable-length encoding on the quantized data, variable-length decoding is performed on the encoded data before inverse quantization in decoding.

As described above, in encoding, of conversion coefficients of the blocks obtained by performing orthogonal transformation, those conversion coefficients of a high-frequency domain in the predetermined block are removed; in decoding, the conversion coefficient of the high-range frequency domain in the above-described predetermined block is interpolated using the conversion coefficient of the high-range frequency domain in a block located in the vicinity of this predetermined block.

In this case, since the encoded data is decoded using a conversion coefficient in a deterioration-free high-range frequency domain of the block present in the vicinity of the predetermined block, an image quality is improved as compared with a case where the encoded data with no conversion coefficient of the high-range frequency domain is decoded as it is using any other ordinary decoding apparatus, because edge portions are improved in the first encoding and decoding.

In the second or later encoding and decoding also, as in the case of the first encoding and decoding, a conversion coefficient of a high-range frequency domain in a predetermined block is interpolated using conversion coefficients of a high-range frequency domain in a block located in the vicinity thereof. In this case, however, owing to fluctuations in sampling phase that occur in analog data-to-digital data conversion, a block position is shifted from that in the first encoding and decoding. Therefore, the conversion coefficient of the high-range frequency domain in the block located in the vicinity of the predetermined block is deteriorated in the first encoding and decoding, so that if the conversion coefficient of the high-range frequency domain in the predetermined block is interpolated using conversion coefficients of the high-range frequency domain in the block located in the vicinity thereof, image data encounters significant deterioration.

An apparatus for decoding encoded data relative to this invention comprises a receiving section that receives the encoded data, a signal-deteriorating factor generation section that generates a signal-deteriorating factor in the received encoded data in accordance with this encoded data, and a data-decoding section that obtains decoded data by performing decoding processing on the data in which the signal-deteriorating factor is generated so as to promote signal deterioration in accordance with the signal-deteriorating factor.

An apparatus for decoding encoded data relative to this invention comprises receiving means for receiving the encoded data, signal-deteriorating factor generation means for generating a signal-deteriorating factor in the input encoded data in accordance with the data obtained by decoding processing, and data-decoding means for obtaining decoded data by performing decoding processing on the data in which the signal-deteriorating factor is generated so as to promote signal deterioration in accordance with the signal-deteriorating factor.

A method for decoding encoded data relative to the invention comprises a receiving step of receiving the encoded data, a signal-deteriorating factor generation step of generating a signal-deteriorating factor in the input encoded data in accordance with this encoded data, and a data-decoding step of obtaining decoded data by performing decoding processing on the data in which the signal-deteriorating factor is generated so as to promote signal deterioration in accordance with the signal-deteriorating factor.

Although in the above-described apparatus and method for decoding data, encoded data in which a signal-deteriorating factor has generated beforehand has been received, in these apparatus and method for decoding the data, a signal-deteriorating factor is generated in this encoded data after encoded data has been received.

For example, in the apparatus for decoding the data, the apparatus decodes an encoded digital signal obtained by performing block-encoding on data of each of the blocks obtained by performing blocking on a digital signal, the blocking being accompanied by shuffling in such a predetermined pattern as to reduce a correlation between adjacent items of data, the signal-deteriorating factor generation section includes a block-decoding section for performing block-decoding processing on the encoded digital signal, and a de-shuffling section for de-shuffling data of each of the blocks obtained by the block-decoding section, and the data-decoding section includes an inverse blocking section for performing inverse blocking in accordance with the de-shuffled data.

Also, for example, in the method for decoding the data, the method decodes an encoded digital signal obtained by performing block encoding on data of each of the blocks obtained by performing blocking on a digital signal, the blocking being accompanied by shuffling in such a predetermined pattern as to reduce a correlation between adjacent items of data, the signal-deteriorating factor generation step includes a block-decoding step of performing block-decoding processing on the encoded digital signal, and a de-shuffling step of de-shuffling data of each of the blocks obtained by the block-decoding step, and the data-decoding step includes an inverse blocking step of performing inverse blocking in accordance with the de-shuffled data.

Block decoding processing is performed on an encoded digital signal in which a signal-deteriorating factor is generated. This encoded digital signal is obtained by performing block-encoding on data of the blocks obtained by performing blocking accompanied by shuffling in a predetermined pattern so that a correlation between mutually adjacent items of data may be decreased. In this case, as for the second or later encoding and decoding, information to be lost in encoding processing, for example, a high-frequency component can be increased, to increase a degree of deterioration of the encoded digital signal, hence, the decoded digital signal.

For example, in the apparatus for decoding the data, the apparatus decodes encoded data obtained by performing orthogonal transformation on image data of each of the blocks obtained by dividing the image data into two-dimensional blocks and quantizing a conversion coefficient of each of the blocks obtained by this orthogonal transformation, the signal-deteriorating factor generation section includes an inverse quantization section for performing inverse quantization on the encoded data, an inverse orthogonal transformation section for obtaining the image data by performing inverse orthogonal transformation on the conversion coefficient of each of the blocks from the inverse quantization section, and a conversion coefficient acquisition section for acquiring the conversion coefficient of a high-range frequency domain in the predetermined block in accordance with the conversion coefficients of the high-range frequency domain of a block located in the vicinity of the predetermined block on the side of an input or an output of the inverse quantization section, and the data-decoding section uses the conversion coefficient of the high-range frequency domain in the block located in the vicinity of the predetermined block as the conversion coefficient of the high-range frequency domain in the predetermined block.

Also, for example, in the method for decoding the data, the method decodes encoded data obtained by performing orthogonal transformation on image data of each of the blocks obtained by dividing the image data into two-dimensional blocks and quantizing a conversion coefficient of each of the blocks obtained by this orthogonal transformation, the signal-deteriorating factor generation step includes an inverse quantization step of performing inverse quantization on the encoded data, an inverse orthogonal transformation step of obtaining the image data by performing inverse orthogonal transformation on the conversion coefficient of each of the blocks from the inverse quantization step, and a conversion coefficient acquisition step of acquiring the conversion coefficient of a high-range frequency domain in the predetermined block in accordance with the conversion coefficients of the high-range frequency domain of a block located in the vicinity of the predetermined block on the side of an input or an output of the inverse quantization step, and the data-decoding step uses the acquired conversion coefficient of the high-range frequency domain in the block located in the vicinity of the predetermined block as the conversion coefficient of the high-range frequency domain in the predetermined block.

In encoding, a conversion coefficient is obtained by performing orthogonal transformation on image data of each of the bocks obtained by dividing original image data into two-dimensional blocks. This orthogonal transformation is, for example, discrete cosine transform (DCT). The conversion coefficients of these blocks are quantized to obtain encoded data.

In decoding, inverse quantization is performed on encoded data. Inverse orthogonal transformation is then performed on conversion coefficients of the blocks, to obtain image data. In this case, before or after inverse quantization, a conversion coefficient of a high-range frequency domain in the above-described predetermined block is acquired in accordance with a conversion coefficient of a block located in the vicinity of this predetermined block. The conversion coefficient thus acquired of the high-range frequency domain in the predetermined block is used as a conversion coefficient of a high-range frequency domain in this predetermined block.

As described above, in decoding, as a conversion coefficient of a high-range frequency domain in the above-described predetermined block, a value acquired on the basis of a conversion coefficient of a high-range frequency domain in a block located in the vicinity of the predetermined block is used.

In this case, encoded data of the predetermined block is decoded using a conversion coefficient of a deterioration-free high-range frequency domain in a block located in the vicinity of the predetermined block, so that an image quality is deteriorated less in the first encoding and decoding.

In the second or later encoding and decoding also, as in the case of the first encoding and decoding, as a conversion coefficient of a high-range frequency domain in a predetermined block, a conversion coefficient of a high-range frequency domain in a block located in the vicinity of the predetermined block is used. In this case, however, owing to fluctuations in sampling phase that occur in analog data-to-digital data conversion, a block position is shifted from that in the first encoding and decoding. Therefore, the conversion coefficient of the high-range frequency domain in the block located in the vicinity of the predetermined block is deteriorated as compared with that in the first encoding and decoding, so that if a conversion coefficient of a high-range frequency domain in a block located in the vicinity of the predetermined block is used as the conversion coefficient of the high-range frequency domain in the predetermined block, image data encounters significant deterioration.

BRIEF DESCRIPTION OF THE DRAWINGS

FIGS. 11A to 11F are explanatory illustrations of deterioration in encoding (sub-sampling);

FIG. 22 is a block diagram for showing a configuration of an encoding (sub-sampling+ADRC) section;

FIG. 25 is a block diagram for showing a configuration of an encoding (sub-sampling+ADRC+DCT) section;

FIG. 39 is a block diagram for showing a configuration of an image display system according to a fourth embodiment of the present invention;

BEST MODE FOR CARRYING OUT THE INVENTION

Figure 7:
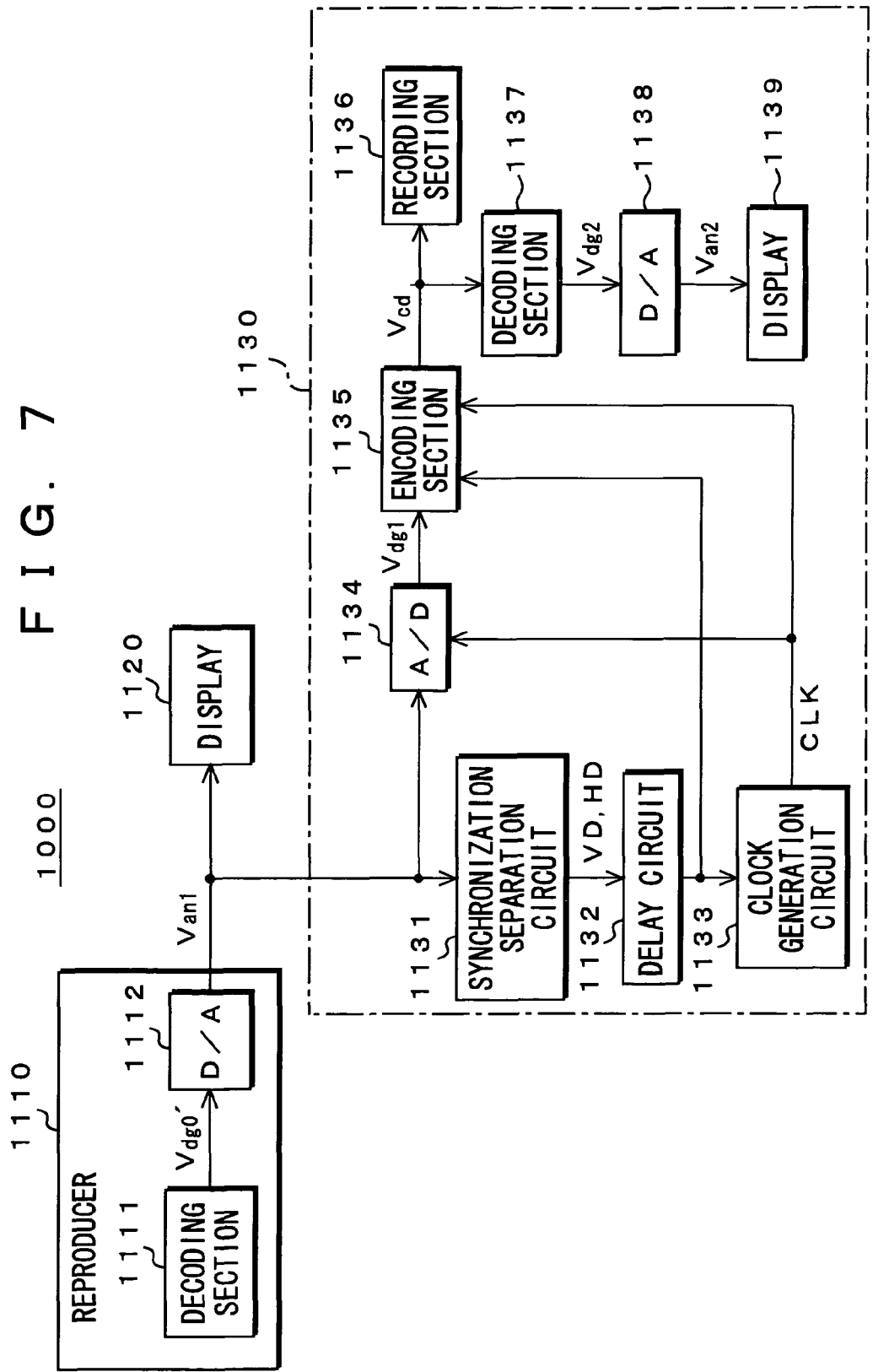
FIG. 7 is a block diagram for showing a configuration of an image display system according to a first embodiment of the present invention.

The following will describe a first embodiment of the present invention. FIG. 7 shows a configuration of an image display system 1000 according to an embodiment thereof.

This image display system 1000 has a reproducer 1110 for outputting analog image data Van1 and a display 1120 for displaying an image due to the image data Van1 output from this reproducer 1110.

The reproducer 1110 decodes, at a decoding section 1111, encoded image data that is reproduced from a recording medium such as an optical disc, not shown, and converts the digital image data thus further decoded and obtained into analog data at a D/A converter 1112, thereby obtaining the analog image data Van1. It is to be noted that the display 1120 may be, for example, a CRT display or an LCD.

This image display system 1000 further has an encoding apparatus 1130 for performing encoding processing again by utilizing the analog image data Van1 and record the encoded image data on a recording medium such as an optical disc.

This encoding apparatus 1130 has a synchronization separation circuit 1131 for separating a vertical synchronization signal VD and a horizontal synchronization signal HD from the analog image data Van1 output from the reproducer 1110, a delay circuit 1132 for delaying the synchronization signals VD and HD separated by this synchronization separation circuit 1131, and a clock generation circuit 1133 for generating a sampling clock CLK in a range of an effective screen based on the synchronization signals VD and HD delayed by this delay circuit 1132.

It is to be noted that the delay circuit 1132 delays each of the synchronization signals VD and HD by a fixed lapse of time or a random lapse of time. The random lapse of time can be determined by, for example, an equipped random number generator based on a random number that is generated when its power is turned ON or obtained by sequentially selecting predetermined kinds of lapses of time stored in a memory each time its power is turned ON.

The encoding apparatus 1130 further has an A/D converter 1134 for converting analog image data Van1 output from the reproducer 1110 into digital data. This A/D converter 1134 is supplied with the sampling clock CLK generated by the above-described clock generation circuit 1133.

As described above, the synchronization signals VD and HD separated by the synchronization separation circuit 1131 are supplied via the delay circuit 1132 to the clock generation circuit 1133, so that a phase of this sampling clock CLK is shifted vertically and horizontally from that in a case where the synchronization signals VD and HD are directly supplied to the clock generation circuit 1133.

Because the phase of the sampling clock CLK is thus shifted, a phase of digital image data Vdg1 output from the A/D converter 1134 is also shifted vertically and horizontally. In this case, the A/D converter 1134 includes phase-shifting means.

Figure 8:
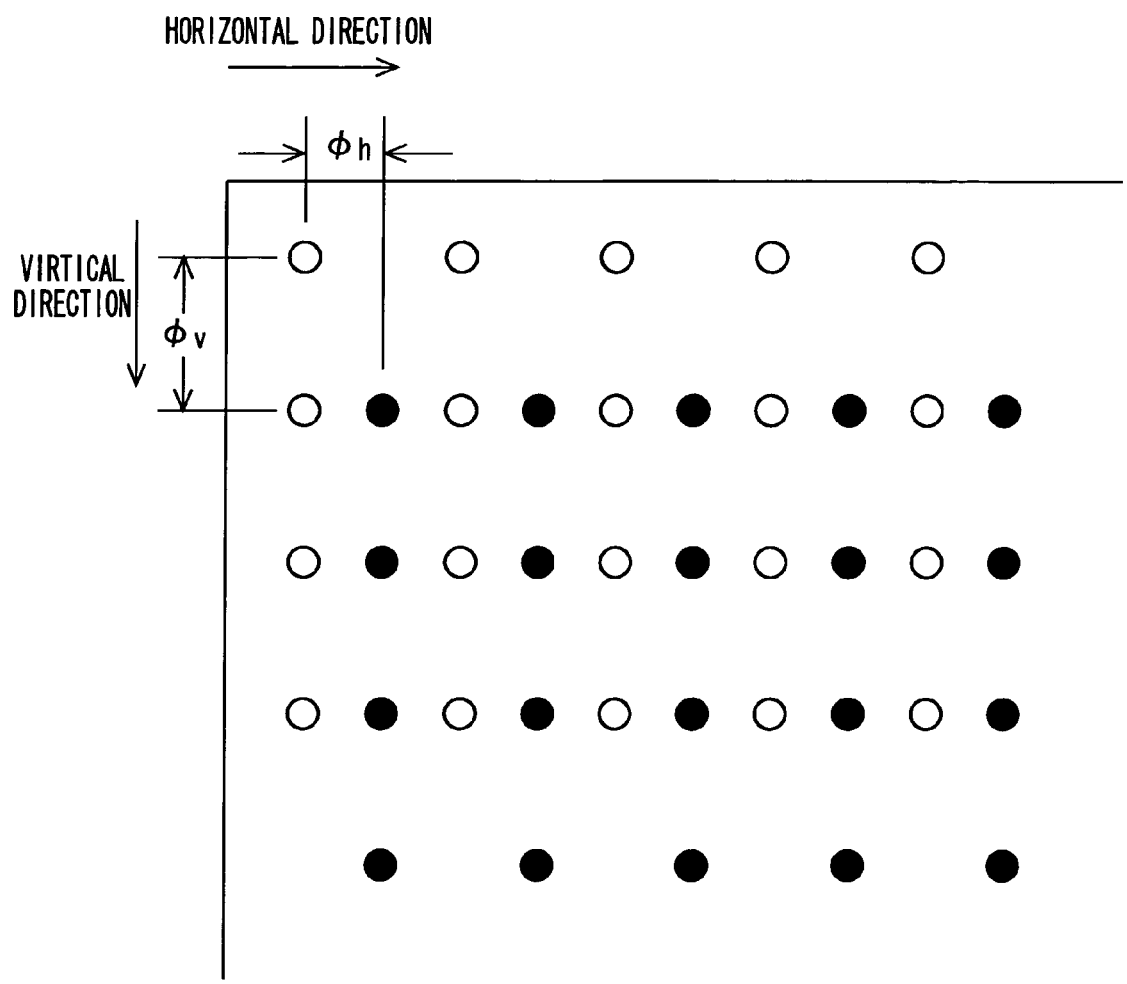
FIG. 8 is an explanatory illustration of phase shifting.

A position indicated by "•" in FIG. 8 represents one example of a pixel position of each of the items of pixel data that constitute the digital image data Vdg1 output from the A/D converter 1134. A position indicated by "o" represents a pixel position in a case where the phase is not shifted. In the present case, the phase is shifted horizontally by as much as φh and vertically by as much as φv. Here, φh represents a horizontal shift width and φv, a vertical shift width.

Although an example shown in FIG. 8 has shifted the phase both horizontally and vertically, it may be shifted either horizontally or vertically. Further, as may be clear from the example shown in FIG. 8, the horizontal phase shift width can be set in a unit smaller than an inter-pixel interval, whereas the vertical phase shift width can be set only in an integral multiple of the inter-pixel interval. If, as described above, a delay lapse of time for the synchronization signals VD and HD is set to a random lapse of time, the shift widths φh and φv change with the delay lapse of time.

Referring back to FIG. 7, the encoding apparatus 1130 further has an encoding section 1135 for encoding the image data Vdg1 output from the A/D converter 1134. This encoding section 1135 performs almost the same encoding as that for encoded image data obtained as reproduced by the above-described reproducer 1110 from a recording medium such as an optical disc. Further, this encoding gives rise to significant deterioration because the image data Vdg1 is shifted in phase as described above. A specific configuration of the encoding section 1135 will be described later.

The encoding apparatus 1130 further has a recording section 1136 for recording encoded image data Vcd output from the encoding section 1135 on the recording medium such as an optical disc. In this case, the recording section 1136 copies the image data Vcd in accordance with the analog image data Van1.

The encoding apparatus 1130 further has a decoding section 1137 for decoding the encoded image data Vcd output from the encoding section 1135, a D/A converter 1138 for converting digital image data Vdg2 obtained and decoded by this decoding section 1137 to analog data, and a display 1139 for displaying an image due to analog image data Van2 output from this D/A converter 1138. The display 1139 may be, for example, a CRT display or an LCD.

The following will describe operations of the encoding apparatus 1130.

The analog image data Van1 output from the reproducer 1110 is supplied to the synchronization separation circuit 1131. This synchronization separation circuit 1131 separates a vertical synchronization signal VD and a horizontal synchronization signal HD from the image data Van1. The synchronization signals VD and HD thus separated are delayed by the delay circuit 1132 and then supplied to the clock generation circuit 1133.

The clock generation circuit 1133 generates a sampling clock CLK in a range of the effective screen, according to the delayed synchronization signals VD and HD. This sampling clock CLK is shifted in phase vertically and horizontally as compared with that in a case where it is generated directly in accordance with the synchronization signals VD and HD separated by the synchronization separation circuit 1131.

Further, the analog image data Van1 output from the reproducer 1110 is supplied to the A/D converter 1134. This A/D converter 1134 is supplied with the sampling clock CLK generated by the above-described clock generation circuit 1133. This A/D converter 1134 samples the analog image data Van1 by using the sampling clock CLK and converts it into digital data.

In this case, since the phase of the sampling clock CLK is shifted vertically and horizontally as described above, the digital image data Vdg1 output from the A/D converter 1134 is also shifted in phase vertically and horizontally (see FIG. 8).

The digital image data Vdg1 output from this A/D converter 1134 is supplied to the encoding section 1135. This encoding section 1135 encodes the image data Vdg1, to obtain encoded image data Vcd. In this case, as described above, since the image data Vdg1 is shifted in phase, encoding performed by this encoding section 1135 gives rise to significant deterioration.

The encoded image data Vcd output from this encoding section 1135 is supplied to the recording section 1136. The recording section 1136 records this image data Vcd on the recording medium such as an optical disc, to copy it in accordance with the analog image data Van1. Since the image data Vcd thus recorded on the recording medium is deteriorated, an image quality of an image obtained by reproducing the image data Vcd recorded on this recoding medium is greatly deteriorated as compared with that due to the analog image signal Van output from the reproducer 1110. Therefore, this encoding apparatus 1130 disables image data to be copied in a condition where its good image quality is maintained.

Further, the encoded image data Vcd output from the encoding section 1135 is supplied to the decoding section 1137, to be decoded. The digital image data Vdg2 obtained and decoded by this decoding section 1137 is converted into the analog image data Van2 by the D/A converter 1138. The analog image data Van2 output from the D/A converter 1138 is supplied to the display 1139. On the display 1139, an image due to the image data Van2 is displayed.

In this case, the display 1139 is used by a user to monitor the image due to the encoded image data Vcd. As described above, since the image data Vcd is provided as deteriorated, an image quality of an image displayed on the display 1139 is greatly deteriorated as compared with an image (which is displayed on the display 1120) due to the analog image signal Van1 output from the reproducer 1110.

Even in the above-described encoding apparatus 1130, encoding performed by the encoding section 1135 does not give rise to such deterioration as to be generated because the image data Vdg1 is shifted in phase as described above if analog image data that has not undergone encoding performed by the encoding section 1135 nor decoding corresponding thereto is supplied in place of the analog image data Van1 output from the reproducer 1110.

Further, in the case of the image display system 1000 shown in FIG. 7, the analog image data Van1 output from the reproducer 1110 is not processed at all in order to disable this image data to be copied in the encoding apparatus 1130 in a condition where its good image quality is maintained, so that an image quality of an image due to this analog image data Van1 is not deteriorated.

The following will describe the specific configuration of the encoding section 1135 below.

Figure 9:
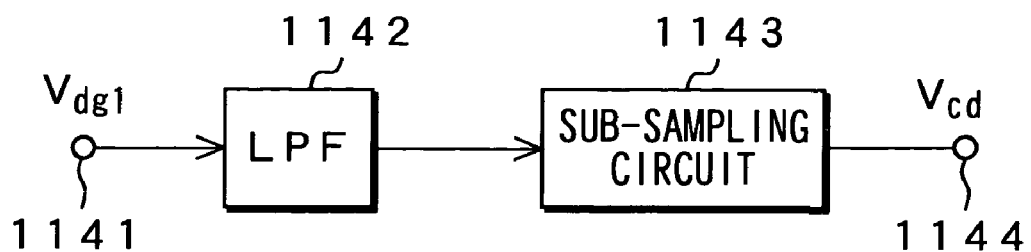
FIG. 9 is a block diagram for showing a configuration of an encoding (sub-sampling) section.

FIG. 9 shows the specific configuration of the encoding section 1135. In this case, the encoding section 1135 performs encoding by use of sub-sampling (data compression encoding).

This encoding section 1135 has a receiving terminal 1141 for receiving digital image data Vdg1 and a low-pass filter (LPF) 1142 for limiting a band of the image data Vdg1 received at this receiving terminal 1141. The low-pass filter 1142 is provided to prevent aliasing from occurring due to sub-sampling performed at a stage on the downstream side.

The encoding section 1135 further has a sub-sampling circuit 1143 for performing encoding by use of sub-sampling on the image data Vdg1 whose band is limited by the low-pass filter 1142 and an output terminal 1144 for outputting encoded image data Vcd output from this sub-sampling circuit 1143. The sub-sampling circuit 1143 performs, for example, line offset sub-sampling by which pixel data that are sub-sampled along consecutive two lines are alternately positioned.

In the encoding section 1135 shown in FIG. 9, the digital image data Vdg1 received at the receiving terminal 1141 is band-limited by the low-pass filter 1142 and then supplied to the sub-sampling circuit 1143. The sub-sampling circuit 1143 performs, for example, line offset sub-sampling on the image data Vdg1, to obtain encoded image data Vcd. In this case, the data is compressed into half an original size thereof. The encoded image data output from the sub-sampling circuit 1143 is output to the output terminal 1144.

Figure 10:
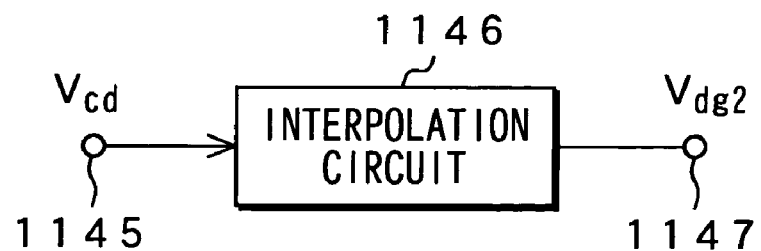
FIG. 10 is a block diagram for showing a configuration of a decoding (sub-sampling) section.

FIG. 10 shows a configuration of the decoding section 1137 in a case where the encoding section 1135 is configured as shown in FIG. 9. It is to be noted that the decoding section 1111 in the reproducer 1110 also has the same configuration.

This decoding section 1137 has a receiving terminal 1145 for receiving encoded image data Vcd, an interpolation circuit 1146 for performing interpolation processing on the image data Vcd received at this receiving terminal 1145, and an output terminal 1147 for outputting decoded image data Vdg2 output from this interpolation circuit 1146. The interpolation circuit 1146 interpolates a pixel data that has dropped out due to sub-sampling, by using surrounding pixel data.

In the decoding section 1137 shown in FIG. 10, the encoded image data Vcd received at the receiving terminal 1145 is supplied to the interpolation circuit 1146. This interpolation circuit 1146 interpolates pixel data that has dropped due to sub-sampling, by using surrounding pixel data. For example, as described above, if line offset sub-sampling is performed, pixel data that has dropped out by this sub-sampling is interpolated by using four items of pixel data located upward, downward, rightward, and leftward. The decoded image data Vdg2 output from the interpolation circuit 1146 is provided to the output terminal 1147.

The following will describe deterioration encountered in encoding when this encoding is thus performed by use of sub-sampling at the encoding section 1135, with reference to FIGS. 11A to 11F.

First, encoded image data Vcd0 will be explained which is recorded on a recording medium such as an optical disc and reproduced by the reproducer 1110. This image data Vcd0 is obtained by performing sub-sampling on the pre-encoding digital image data Vdg0 shown in FIG. 11A. "o" in FIG. 11A indicates part of pixel data that constitutes the image data Vdg0. FIG. 11B shows the image data Vdg0, in which "o" indicates sub-sampled pixel data and "X" indicates a position of pixel data that has been dropped out through sub-sampling.

Figure 1:
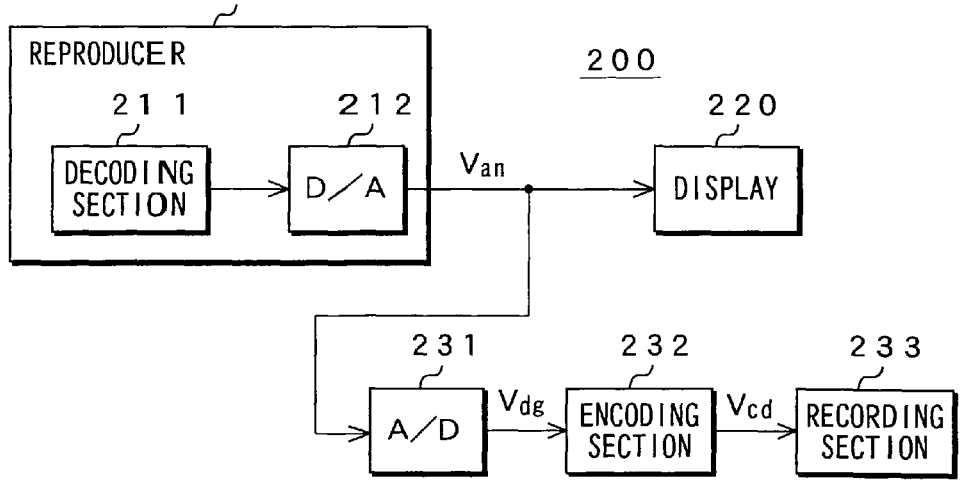
FIG. 1 is a block diagram for showing a configuration of a conventional image display system.
Figure 2:
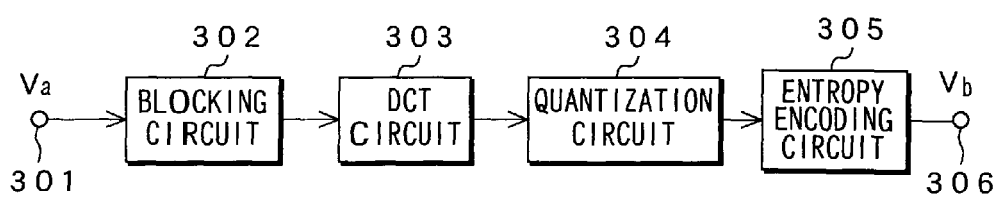
FIG. 2 is a block diagram for showing a configuration of a conventional encoding apparatus.
Figure 3:
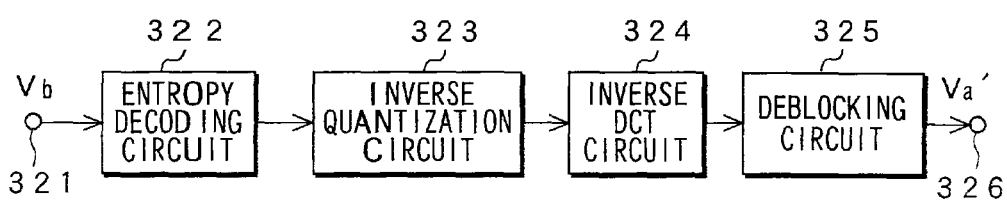
FIG. 3 shows a block diagram for showing a configuration of conventional decoding apparatus.
Figure 4:
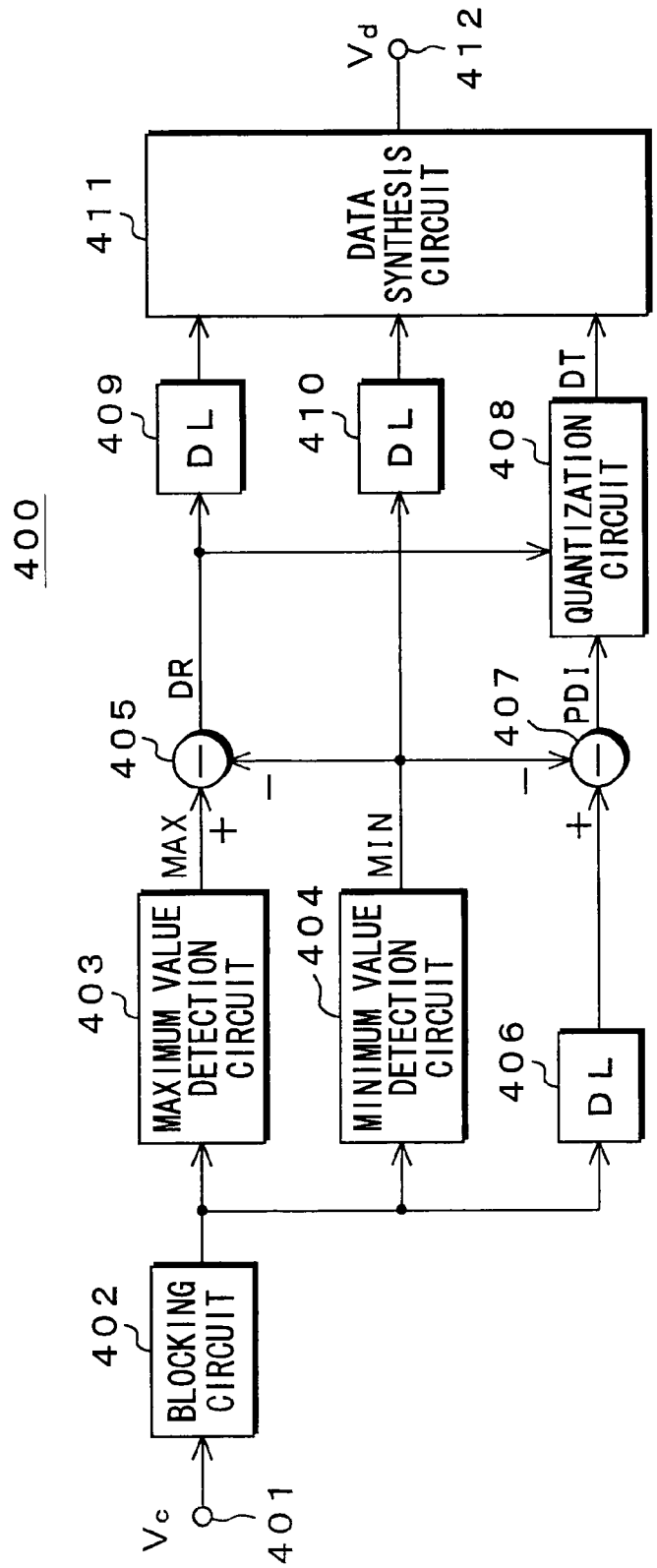
FIG. 4 is a block diagram for showing a configuration of a conventional encoding (ADRC) apparatus.
Figure 5:
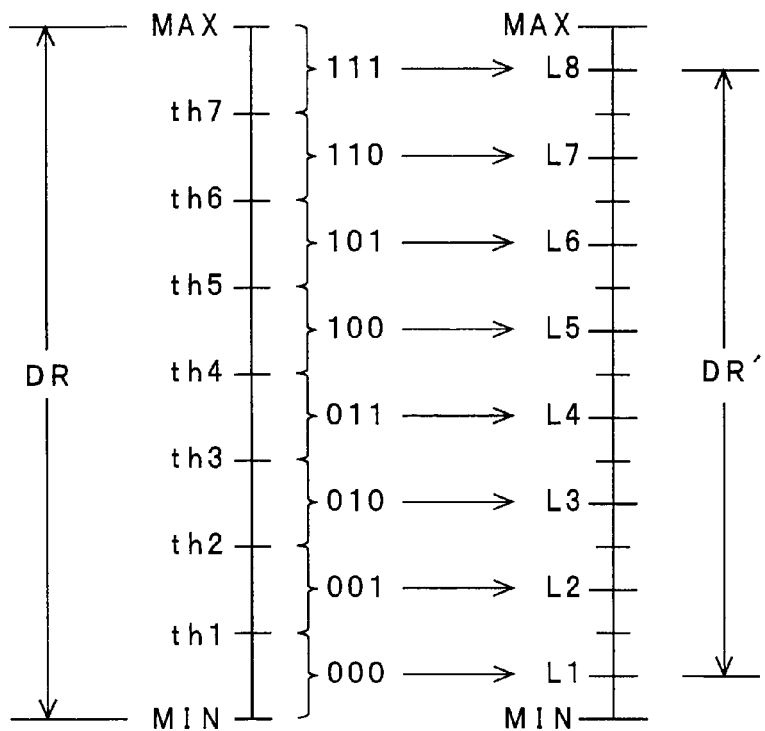
FIG. 5 is an explanatory illustration of ADRC quantization and inverse quantization.
Figure 6:
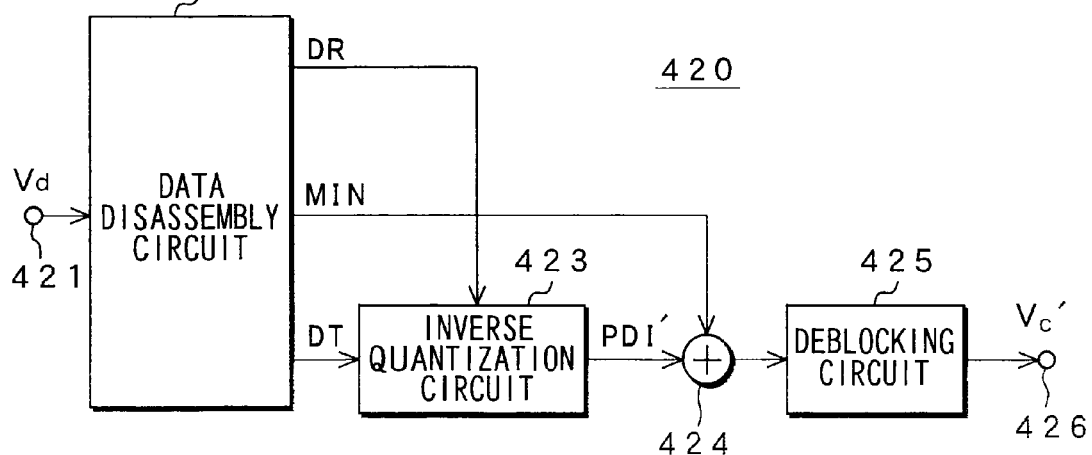
FIG. 6 is a block diagram for showing a conventional decoding (ADRC) apparatus.

The encoded image data Vcd0 shown in FIG. 11B is decoded by the decoding section 1111, from which section 1111 digital image data Vdg0' shown in FIG. 11C is obtained. In FIG. 1C, "o" indicates pixel data that has been sub-sampled and "Δ" indicates pixel data that has been dropped out through sub-sampling and is interpolated by using surrounding pixel data at the decoding section 1111.

From the reproducer 1110, the analog image data Van1 is output which is obtained by converting the decoded digital image data Vdg0' shown in FIG. 11C into analog data by the D/A converter 1112. An image due to this image data Van1 is somewhat deteriorated in image quality than an image due to the image data Vdg0 shown in FIG. 11A because its band is limited by sub-sampling and that its pixel data that has been dropped out through sub-sampling is interpolated by using the surrounding pixel data.

This analog image data Van1 is converted into digital data by the A/D converter 1134 in the encoding apparatus 1130, to obtain digital image data Vdg1. FIG. 11D shows the image data Vdg1 in a case where the sampling clock CLK is horizontally shifted in phase by as much as one inter-pixel interval. Here "o" and "Δ" correspond to those of the image data Vdg0' shown in FIG. 11C, respectively.

The image data Vdg1 shown in FIG. 11D is encoded by use of sub-sampling by the encoding section 1135, to obtain image data Vcd. FIG. 11E shows the image data Vcd, in which "Δ" indicates sub-sampled pixel data and "X" indicates a position of pixel data that has been dropped out through sub-sampling.

In such a manner, the image data Vcd loses all items of the pixel data (which are indicated by "o") that constitute the image data Vdg0 shown in FIG. 11A. That is, such the encoding gives rise to significant deterioration. FIG. 11F shows image data Vdg2 obtained by decoding this image data Vcd, in which "Δ" indicates pixel data that has been sub-sampled and "□" indicates pixel data that has dropped out through sub-sampling and is interpolated by using surrounding pixel data.

Although FIGS. 11A to 11F have explained the case where the phase of the sampling clock CLK is shifted horizontally by as much as one inter-pixel interval, even in a case where the phase shift width is any other than one inter-pixel interval (but not an integral multiple of two inter-pixel intervals), none of the pixel data that constitute the image data Vdg0 exists in the image data Vcd, so that significant deterioration occurs through encoding.

Figure 12:
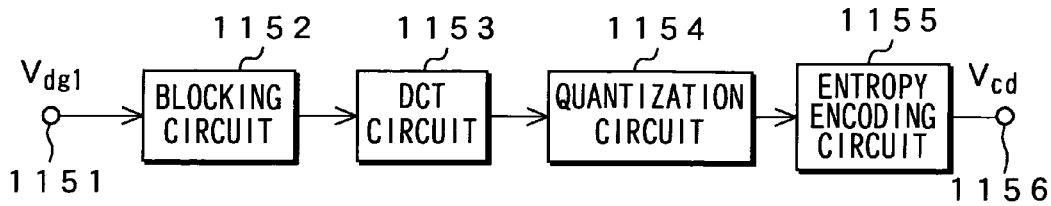
FIG. 12 is a block diagram for showing a configuration of an encoding (DCT) section.

FIG. 12 shows another configuration example of the encoding section 1135. In this case, the encoding section 1135 performs conversion encoding. Conversion encoding refers to encoding for converting image data into a spatial frequency domain by using orthogonal transformation such as discrete cosine transform (DCT). In this case, data is compressed by slanting a conversion coefficient into a low-frequency domain by utilizing its correlation with an adjacent pixel. The encoding section 1135 shown in this FIG. 12 uses DCT as orthogonal transformation.

This encoding section 1135 has a receiving terminal 1151 for receiving digital image data Vdg1 and a blocking circuit 1152 for dividing the image data Vdg1 received at this receiving terminal 1151 into blocks (DCT blocks). The blocking circuit 1152 divides the image data Vdg1 on the effective screen into blocks each of which has a size of, for example, 8×8 pixels.

The encoding section 1135 further has a DCT circuit for calculating coefficient data by performing, for each block, DCT as orthogonal transformation on image data that is blocked by the blocking circuit 1152 and a quantization circuit 1154 for quantizing, by using a quantization table, a coefficient data of each block supplied from this DCT circuit 1153.

The encoding section 1135 further has an entropy encoding circuit 1155 for obtaining encoded image data Vcd by performing entropy encoding, for example, Huffman encoding on coefficient data of each block that is quantized by the quantization circuit 1154 and an output terminal 1156 for outputting the image data Vcd that is output from this entropy encoding circuit 1155.

The following will describe operations of the encoding section 1135 shown in FIG. 12. The receiving terminal 1151 receives digital image data Vdg1. This image data Vdg1 is supplied to the blocking circuit 1152. This blocking circuit 1152 divides the image data Vdg1 on the effective screen into blocks each of which has a size if, for example, 8×8 pixels.

The image data blocked by the blocking circuit 1152 is supplied to the DCT circuit 1153. This DCT circuit 1153 calculates a coefficient data by performing, for each block, DCT on the blocked image data. This coefficient data is supplied to the quantization circuit 1154.

The quantization circuit 1154 quantizes the coefficient data of the blocks by using the quantization table to sequentially obtain quantized coefficient data of the blocks. This quantized coefficient data of the blocks are supplied to the entropy encoding circuit 1155. This encoding circuit 1155 performs, for example, Huffman encoding on the quantized coefficient data of the blocks. Thus, the encoded image data Vcd is obtained from the encoding circuit 1155 and output from the output terminal 1156.

Figure 13:
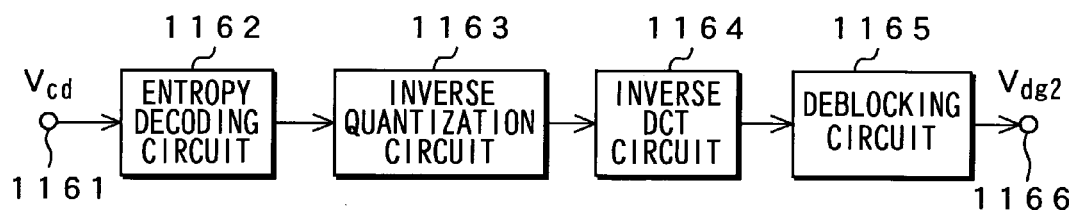
FIG. 13 is a block diagram for showing a configuration of a decoding (DCT) section.

FIG. 13 shows a configuration of the decoding section 1137 in a case where the encoding section 1135 is configured as shown in FIG. 12. It is to be noted that the decoding section 1111 in the reproducer 1110 has almost the same configuration.

This decoding section 1137 has a receiving terminal 1161 for receiving encoded image data Vcd and an entropy decoding circuit 1162 for decoding the image data Vcd (entropy-encoded data, for example, Huffman encoded data) received at this receiving terminal 1161.

The decoding section 1137 further has an inverse quantization circuit 1163 for obtaining coefficient data by performing inverse quantization on quantized coefficient data of each block output from the decoding circuit 1162 and an inverse DCT circuit 1164 for obtaining image data by performing inverse DCT, for each block, on the coefficient data of each block obtained by this inverse quantization circuit 1163 through inverse quantization.

The decoding section 1137 further has a deblocking circuit 1165 for obtaining decoded image data Vdg2 by bringing back the image data of each block obtained by the inverse DCT circuit 1164 to its pre-blocking position and an output terminal 1166 for outputting the image data Vdg2 that is output from this deblocking circuit 1165. In the deblocking circuit 1165, the data order thereof is brought back to raster scan order.

The following will describe operations of the decoding section 1137 shown in FIG. 13. Encoded image data Vcd is received at the receiving terminal 1161. This image data Vcd is supplied to the entropy decoding circuit 1162. This image data Vcd is entropy-encoded data, for example, Huffman encoded data. The decoding circuit 1162 decodes the image data Vcd, to obtain quantized coefficient data of each block.

This quantized coefficient data of each block is supplied to the inverse quantization circuit 1163. The inverse quantization circuit 1163 performs inverse quantization on the quantized coefficient data of each block to obtain coefficient data of each block. This coefficient data of each block is supplied to the inverse DCT circuit 1164. The inverse DCT circuit 1164 performs, for each block, inverse DCT on the coefficient data of each block to obtain image data of each block.

In such a manner, the image data of each block obtained by the inverse DCT circuit 1164 is supplied to the deblocking circuit 1165. This deblocking circuit 1165 brings back the data order to raster scan order. Thus, the decoded image data Vdg2 is obtained from the deblocking circuit 1165 and output to the output terminal 1166.

The following will describe deterioration encountered in conversion encoding when this encoding is thus performed by the encoding section 1135.

Figure 14:
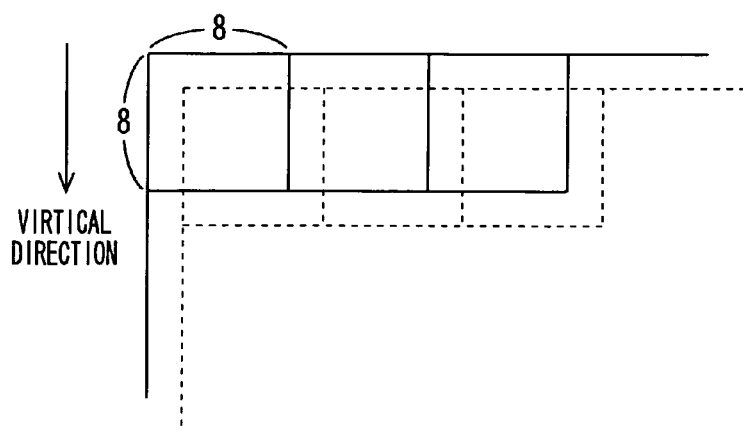
FIG. 14 is an explanatory illustration of blocking of a DCT block.

It is supposed that the encoded image data Vcd0, which is to be reproduced by the reproducer 1110, to be recorded on a recording medium such as an optical disc is the image data on the effective screen that has been blocked at a block position indicated by a solid line in FIG. 14 and been encoded.

In the reproducer 1110, this image data Vcd0 is decoded by the decoding section 1111 to obtain decoded digital image data Vdg0'. From the reproducer 1110, analog image data Van1 is output which is obtained by converting this image data Vdg0' into analog data by the D/A converter 1112. An image due to this image data Van1 has undergone quantization processing and inverse quantization processing and so has its image quality somewhat deteriorated as compared with an image due to the pre-encoding image data.

This analog image data Van1 is converted into digital data by the A/D converter 1134 in the encoding apparatus 1130, to obtain digital image data Vdg1. This image data Vdg1 is supplied to the encoding section 1135 and encoded, to obtain encoded image data Vcd.

In this case, if the digital image data Vdg1 output from the A/D converter 1134 is not shifted in phase, image data on the effective screen is blocked at the block position indicated by the solid line in FIG. 14 and encoded by the encoding section 1135 as described above. Therefore, in this case, information is lost in small quantity owing to encoding by the encoding section 1135 and, therefore, less deterioration through encoding by the encoding section 1135 occurs.

However, in the present embodiment, as described above, since the phase of the digital image data Vdg1 output from the A/D converter 1134 is shifted, the image data on the effective screen is blocked at, for example, a block position indicated by a broken line in FIG. 14 and encoded by the encoding section 1135. Therefore, in this case, information is lost in large quantity through encoding by the encoding section 1135 and, therefore, significant deterioration occurs by the encoding.

Figure 15:
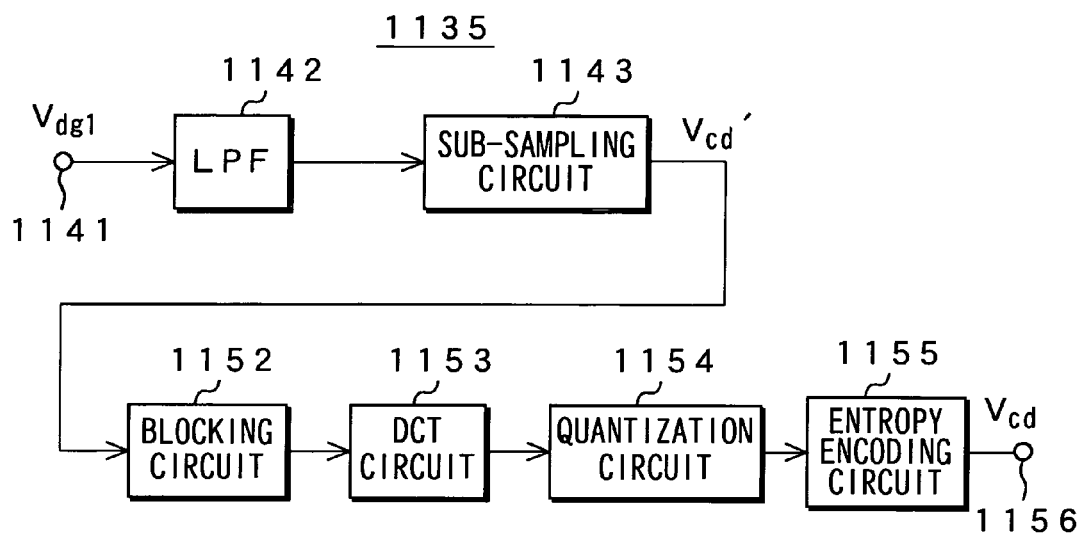
FIG. 15 is a block diagram for showing a configuration of an encoding (sub-sampling+DCT) section.

FIG. 15 shows a further configuration of the encoding section 1135. In this case, the encoding section 1135 performs encoding by use of sub-sampling and, further, conversion encoding by use of DCT as orthogonal transformation. In FIG. 15, components that correspond to those in FIGS. 9 and 12 are indicated by the same symbols and their detailed explanation will be omitted.

As in the case of the encoding section 1135 shown in FIG. 9, in this encoding section 1135, the low-pass filter 1142 and the sub-sampling circuit 1143 perform encoding by use of sub-sampling on digital image data Vdg1 output from the A/D converter 1134.

Furthermore, as in the case of the encoding section 1135 shown in FIG. 12, encoded image data Vcd' output from the sub-sampling circuit 1143 undergoes conversion encoding through the blocking circuit 1152, the DCT circuit 1153, the quantization circuit 1154, and the entropy encoding circuit 1155, to provide encoded image data Vcd.

Figure 16A:
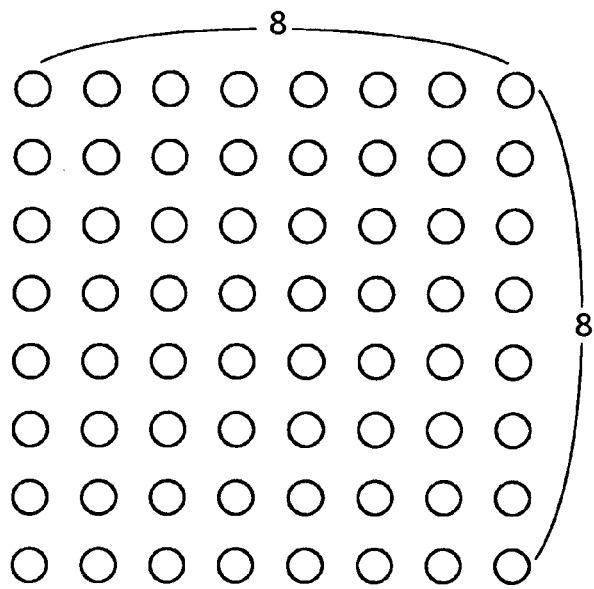
FIGS. 16A to 16C are illustrations each showing a relationship between sub-sampling and a DCT block.
Figure 16B:
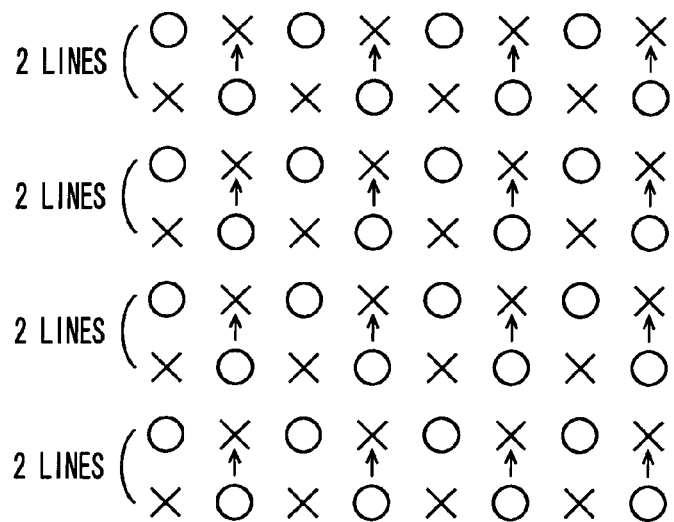
Figure 16C:
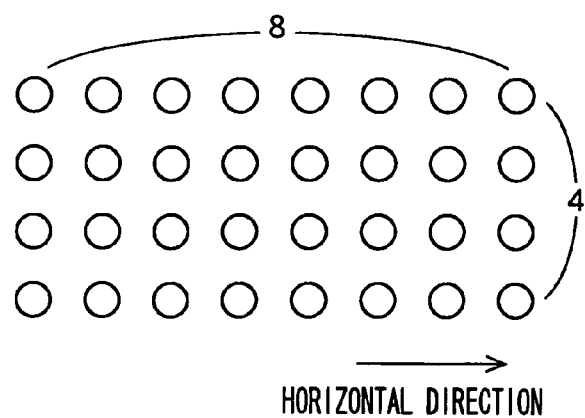

FIGS. 16A to 16C show a relationship between sub-sampling and a DCT block. FIG. 16A shows some (8×8=64 pixels) of pixel data that constitutes the image data Vdg1. "o" indicates the pixel data. FIG. 16B shows image data after sub-sampling, in which "o" indicates sub-sampled pixel data and "X" indicates a position of a pixel data that has been dropped out through sub-sampling. For each pair of consecutive two lines, the sub-sampling circuit 1143 creates new image data with the sub-sampled pixel data that constitutes image data corresponding to these consecutive two lines being alternately arranged.

FIG. 16C shows image data Vcd' that is output from the sub-sampling circuit 1143. This image data Vcd' has half the number of lines for the image data Vdg1. The blocking circuit 1152 divides the image data Vcd' into blocks each of which has a size of, for example, 8×4 pixels because its number of lines is halved as described above.

Figure 17:
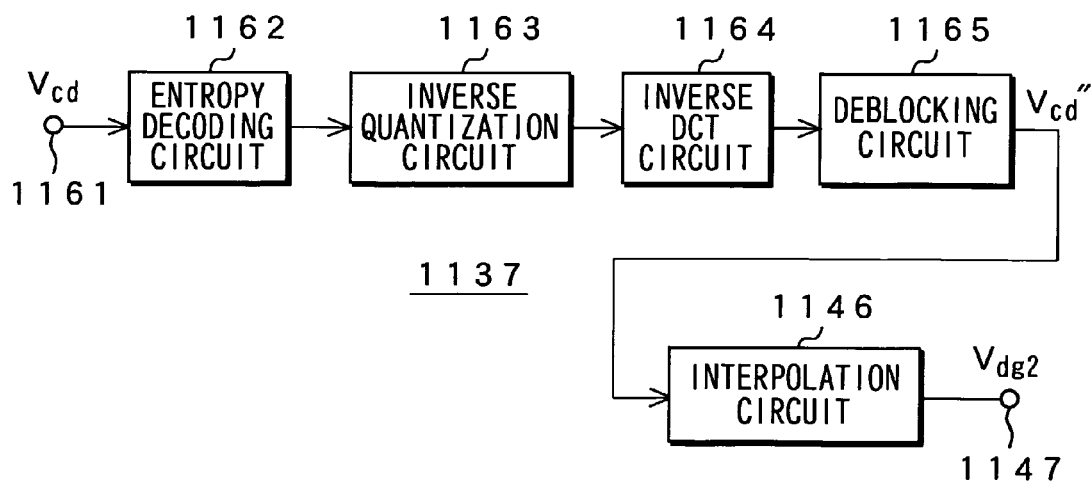
FIG. 17 is a block diagram for showing a configuration of a decoding (sub-sampling+DCT) section.

FIG. 17 shows a configuration of the decoding section 1137 in a case where the encoding section 1135 is configured as shown in FIG. 15. It is to be noted that the decoding section 1111 in the reproducer 1110 has also almost the same configuration. In this FIG. 17, components that correspond to FIGS. 13 and 10 are indicated by the same symbols and their detailed explanation will be omitted.

As in the case of the decoding section 1137 shown in FIG. 13, in this decoding section 1137, decoding that corresponds to conversion encoding is performed on the encoded image data Vcd through the entropy decoding circuit 1162, the inverse quantization circuit 1163, the inverse DCT circuit 1164, and the deblocking circuit 1165.

Furthermore, as in the case of the decoding circuit 1137 shown in FIG. 10, the interpolation circuit 1146 performs decoding that corresponds to encoding by use of sub-sampling on image data Vcd" output from the deblocking circuit 1165, to obtain decoded image data Vdg2.

If encoding by use of sub-sampling and conversion encoding are performed in series by the encoding section 1135, the encoding section 1135 gives rise to more significant deterioration than that by the encoding sections 1135 shown in FIGS. 9 and 13 owing to the synergy effect of deterioration due to both types of encoding.

Figure 18:
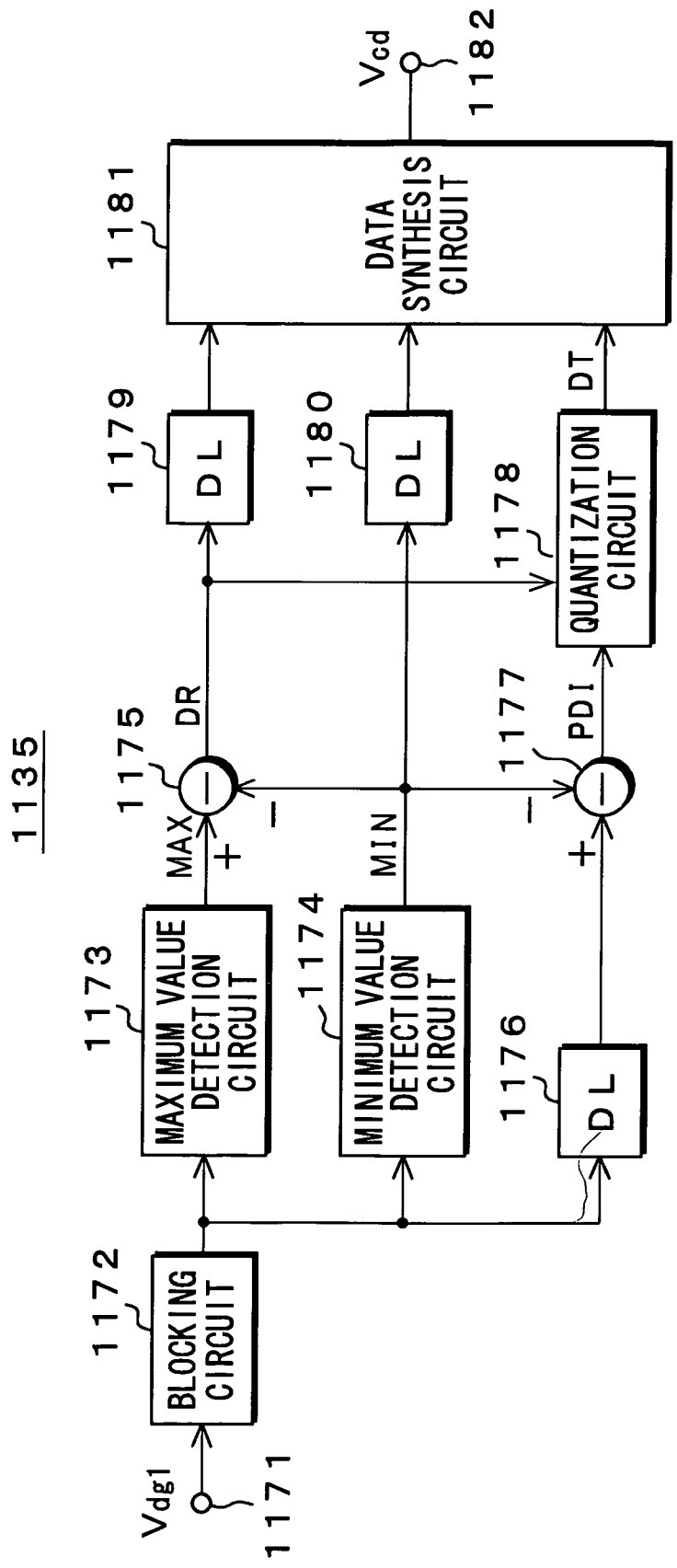
FIG. 18 is a block diagram for showing a configuration of an encoding (ADRC) section.

FIG. 18 shows a still further configuration of the encoding section 1135. In this case, the encoding section 1135 performs adaptive dynamic range coding (ADRC). This scheme of ADRC removes only redundancy in a direction of a level of image data by utilizing a space-time correlation, to leave redundancy of the space-time so that concealing may be possible.

This encoding section 1135 has a receiving terminal 1171 for receiving digital image data Vdg1 and a blocking circuit 1172 for dividing the image data Vdg1 received at this receiving terminal 1171 into blocks (ADRC blocks). The blocking circuit 1172 divides the image data Vdg1 on the effective screen into blocks each of which has a size of, for example, 4×4 pixels. This blocking circuit 1172 constitutes extraction means for extracting image data from a predetermined range of the digital image data Vdg1.

The encoding section 1135 further has a maximum value detection circuit 1173 for detecting a maximum value MAX of image data (which is comprised of 4×4 items of pixel data) of each block output from the blocking circuit 1172 and a minimum value detection circuit 1174 for detecting a minimum value MIN from the image data of each block.

The encoding section 1135 further has a subtracter 1175 for subtracting a minimum value MIN detected by the minimum value detection circuit 1174 from a maximum value MAX detected by the maximum value detection circuit 1173 to obtain a dynamic range DR and another subtracter 1177 for subtracting a minimum value MIN of the corresponding block detected by the minimum value detection circuit 1174 from image data of each block output from the blocking circuit 1172 to obtain minimum value-removed data PDI. It is to be noted that the image data of each block is supplied to the subtracter 1177 via a delay circuit 1176 for time adjustment.

The encoding section 1135 further has a quantization circuit 1178 for quantizing minimum value-removed data PDI obtained by the subtracter 1177 by using a quantization step determined in accordance with a dynamic range DR. In this case, the number of quantization bits is either fixed or changed in accordance with the dynamic range DR. In a case where the number of quantization bits is changed in accordance with the dynamic range DR, that number is set larger as the dynamic range DR increases.

For example, when image data can take on a value of 0 to 255 and if $0 \leq DR \leq 4$, the number of quantization bits is set to 0; if $5 \leq DR \leq 13$, the number of quantization bits is set to 1; if $14 \leq DR \leq 35$, the number of quantization bits is set to 2; if $36 \leq DR \leq 103$, the number of quantization bits is set to 3; and $104 \leq DR \leq 255$, the number of quantization bits is set to 4.

Figure 19:
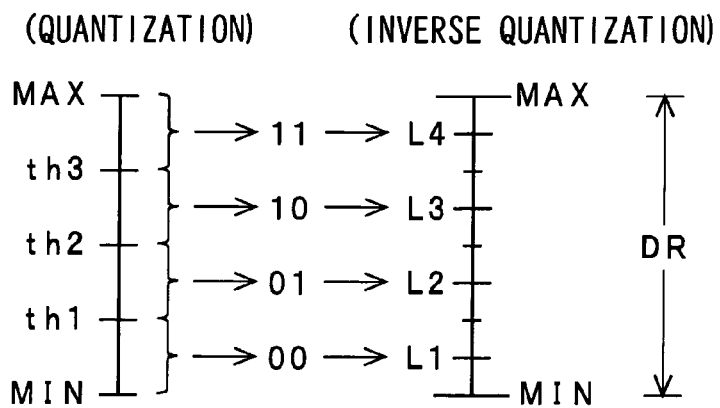
FIG. 19 is an explanatory illustration of ADRC quantization and inverse quantization.

If the number of quantization bits is set to n, the quantization circuit 1178 sets level ranges obtained by equally dividing a dynamic range DR between a maximum value MAX and a minimum value MIN by $2^n$ so that an n-bit code signal may be assigned in accordance with which one of the level ranges the minimum value-removed data PDI belongs to. FIG. 19 shows a case where the number of quantization bits is 2, in which level ranges are set by equally dividing a dynamic range DR between a maximum value MAX and a minimum value MIN by 4 so that any one of 2-bit code signals (00) through (11) may be assigned in accordance with which one of the level ranges the minimum value-removed data PDI belongs to. In FIG. 19, th1 through th3 represent threshold values that indicate a boundary between the level ranges.

The encoding section 1135 further has a data synthesis circuit 1181 for generating, for each block, block data by synthesizing a code signal DT obtained by the quantization circuit 1178, a dynamic range DR obtained by the subtracter 1175, and a minimum value MIN detected by the minimum value detection circuit 1174 and an output terminal 1182 for sequentially outputting, as encoded image data Vcd, block data of each of blocks generated by this data synthesis circuit 1181. It is to be noted that the dynamic range DR and the minimum value MIN are supplied to the data synthesis circuit 1181 via time-adjustment delay circuits 1179 and 1180, respectively.

The following will describe operations of the encoding section 1135 shown in FIG. 18. At the receiving terminal 1171, digital image data Vdg1 is received. This image data Vdg1 is supplied to the blocking circuit 1172. The blocking circuit 1172 divides the image data Vdg1 on the effective screen into blocks each of which has a size of, for example, 4×4 pixels.

The image data blocked by the blocking circuit 1172 is supplied to the maximum value detection circuit 1173 and the minimum value detection circuit 1174. The maximum value detection circuit 1173 detects a maximum value MAX of the image data for each block. The minimum value detection circuit 1174 detects a minimum value MIN of the image data for each block.

The maximum value MAX detected by the maximum value detection circuit 1173 and the minimum value MIN detected by the minimum value detection circuit 1174 are supplied to the subtracter 1175. This subtracter 1175 computes a dynamic range DR=MAX-MIN.

Further, image data of each of the blocks output from the blocking circuit 1172 is time-adjusted by the delay circuit 1176 and then supplied to the subtracter 1177. This subtracter 1177 is supplied with also the minimum value MIN detected by the minimum value detection circuit 1174. This subtracter 1177 subtracters from image data of each block the minimum value MIN of this block to provide minimum value-removed data PDI.

The minimum value-removed data PDI of each block obtained by the subtracter 1177 is supplied to the quantization circuit 1178. This quantization circuit 1178 is supplied with the dynamic range DR obtained by the subtracter 1175. The quantization circuit 1178 quantizes the minimum value-removed data PDI by using a quantization step determined in accordance with the dynamic range DR.

A code signal DT obtained by the quantization circuit 1178 is supplied to the data synthesis circuit 1181. This data synthesis circuit 1181 is supplied with the dynamic range DR obtained by the subtracter 1175 after being time-adjusted by the delay circuit 1179 as well as the minimum value MIN detected by the minimum value detection circuit 1174 after being time-adjusted by the delay circuit 1180. For each of the blocks, the data synthesis circuit 1181 synthesizes the minimum value MIN, the dynamic range DR, and the code signal DT as much as the number of pixels in the block, to generate block data. The block data of each block generated by this data synthesis circuit 1181 is sequentially output to the output terminal 1182 as encoded image data Vcd.

Figure 20:
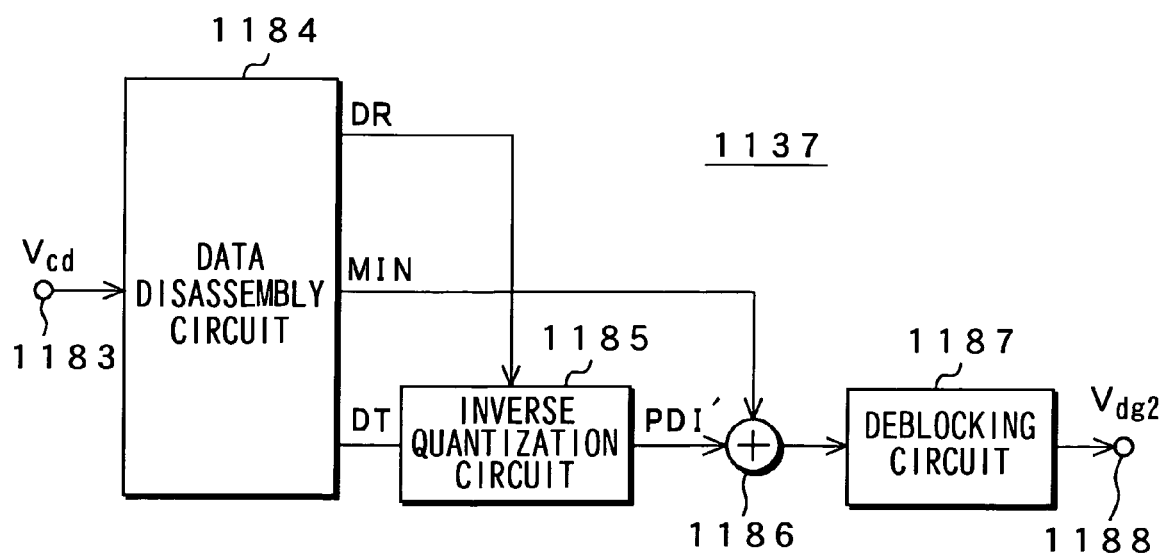
FIG. 20 is a block diagram for showing a configuration of a decoding (ADRC) section.

FIG. 20 shows a configuration of the decoding section 1137 in a case where the encoding section 1135 is configured as shown in FIG. 18. It is to be noted that in this case, the decoding section 1111 in the reproducer 1110 is configured in almost the same manner.

This decoding section 1137 has a receiving terminal 1183 for receiving encoded image data Vcd and a data disassembly circuit 1184 for disassembling, for each block, the image data Vcd (block data) received at this receiving terminal 1183 into a minimum value MIN, a dynamic range DR, and a code signal DT.

The decoding section 1137 further has an inverse quantization circuit 1185 for obtaining minimum value-removed data PDI' by performing inverse quantization on the code signal DT output from the data disassembly circuit 1184 based on the dynamic range DR. As shown in FIG. 19, this inverse quantization circuit 1185 equally divides the dynamic range DR by the number of quantization bits, so that mid-values L0, L1, L2, and L3 of thus divided sub-ranges are utilized as decoded values (minimum value-removed data PDI') of the code signals DT.

The decoding section 1137 further has an adder 1186 for obtaining image data by adding a minimum value MIN to the minimum value-removed data PDI' of each block obtained by the inverse quantization circuit 1185, a deblocking circuit 1187 for obtaining decoded image data Vdg2 by bringing back the image data of each block obtained by this adder 1186 to its pre-blocking position, and an output terminal 1188 for outputting the image data Vdg2 output from this deblocking circuit 1187. The deblocking circuit 1187 brings back the data order thereof to raster scan order.

The following will describe operations of the decoding section 1137 shown in FIG. 20. Encoded image data Vcd is received at the receiving terminal 1183. This image data Vcd is supplied to the data disassembly circuit 1184 where it is disassembled into the minimum value MIN, the dynamic range DR, and the code signal DT for each block.

The code signal DT of each block output from the data disassembly circuit 1184 is supplied to the inverse quantization circuit 1185. This inverse quantization circuit 1185 is supplied with also the dynamic range DR output from the data disassembly circuit 1184. The inverse quantization circuit 1185 performs inverse quantization on the code signal DT of each block based on the dynamic range DR of the corresponding block, to obtain minimum value-removed data PDI'.

The minimum value-removed data PDI' of each block obtained by the inverse quantization circuit 1185 is supplied to the adder 1186. This adder 1186 is supplied with also the minimum value MIN output from the data disassembly circuit 1184. The adder 1186 adds the minimum value MIN to the minimum value-removed data PDI' to obtain image data.

The image data of each block obtained by this adder 1186 is supplied to the deblocking circuit 1187. This deblocking circuit 1187 brings back the data order thereof to raster scan order. Thus, decoded image data Vdg2 is obtained from the deblocking circuit 1187 and output to the output terminal 1188.

The following will describe deterioration due to ADRC encoding in a case where this ADRC is thus performed by the encoding section 1135.

Figure 21:
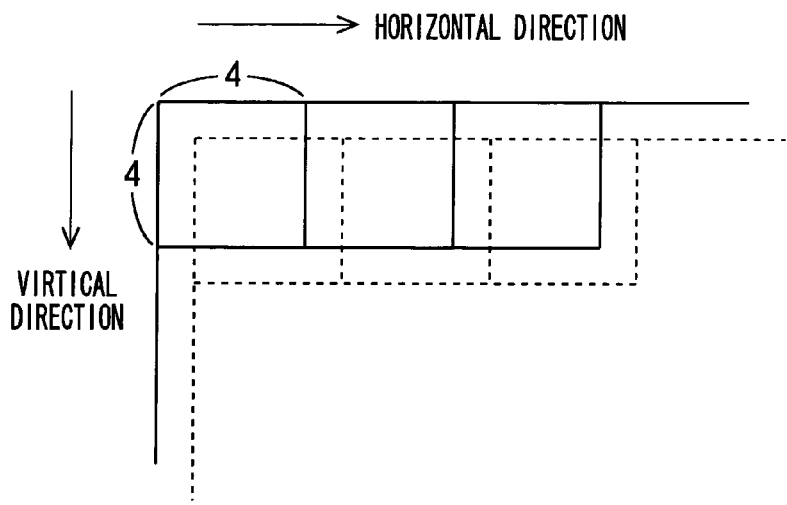
FIG. 21 is an explanatory illustration of blocking of an ADRC block.

It is supposed that the encoded image data Vcd0, which is to be reproduced by the reproducer 1110, to be recorded on recording medium such as an optical disc is the image data on the effective screen that has been blocked at a block position indicated by a solid line in FIG. 21 and been encoded.

In the reproducer 1110, this image data Vcd0 is decoded by the decoding section 1111 to obtain the decoded digital image data Vdg0'. From the reproducer 1110, analog image data Van1 is output which is obtained by converting this image data Vdg0' into analog data by the D/A converter 1112. An image due to this image data Van1 has undergone quantization processing and inverse quantization processing and so has its image quality somewhat deteriorated as compared with an image due to the pre-encoding image data.

This analog image data Van1 is converted into digital data by the A/D converter 1134 in the encoding apparatus 1130, to obtain digital image data Vdg1. This image data Vdg1 is supplied to the encoding section 1135 and encoded, to obtain encoded image data Vcd.

In this case, if the digital image data Vdg1 output from the A/D converter 1134 is not shifted in phase, image data on the effective screen is blocked at the block position indicated by the solid line in FIG. 21 and encoded by the encoding section 1135 as described above. Therefore, in this case, information is lost in small quantity owing to encoding by the encoding section 1135 and, therefore, less deterioration through encoding by the encoding section 1135 occurs.

However, in the present embodiment, as described above, since the phase of the digital image data Vdg1 output from the A/D converter 1134 is shifted, the image data on the effective screen is blocked at, for example, a block position indicated by a broken line in FIG. 21 and encoded by the encoding section 1135. Therefore, in this case, information is lost in large quantity through encoding by the encoding section 1135 and, therefore, significant deterioration by the encoding occurs.

FIG. 22 shows an additional configuration of the encoding section 1135. In this case, the encoding section 1135 performs encoding by use of sub-sampling and, further, ADRC. In this FIG. 22, components that corresponds to those in FIGS. 9 and 18 are indicated by the same symbols and their detailed explanation will be omitted.

As in the case of the encoding section 1135 shown in FIG. 9, in this encoding section 1135, the low-pass filter 1142 and the sub-sampling circuit 1143 perform encoding by use of sub-sampling on digital image data Vdg1 output from the A/D converter 1134.

Furthermore, as in the case of the encoding section 1135 shown in FIG. 18, encoded image data Vcd' output from the sub-sampling circuit 1143 undergoes ADRC through the blocking circuit 1172, the maximum value detection circuit 1173, the minimum value detection circuit 1174, the subtracters 1175, 1177, the quantization circuit 1178, the data synthesis circuit 1181, etc. to provide encoded image data Vcd.

Figure 23A:
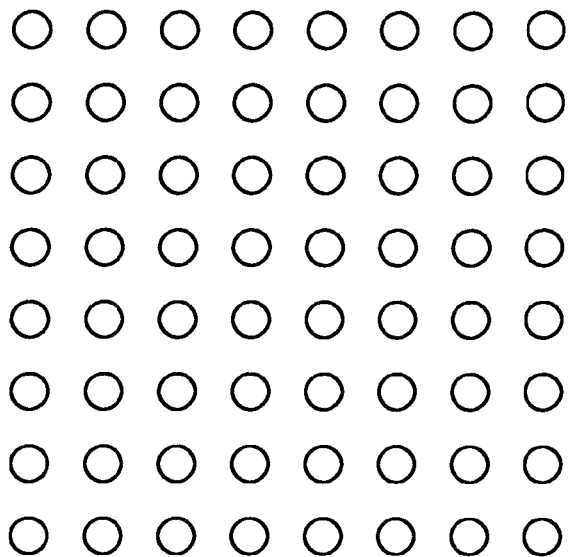
FIGS. 23A to 23C are illustrations each showing a relationship between sub-sampling and an ADRC block.
Figure 23B:
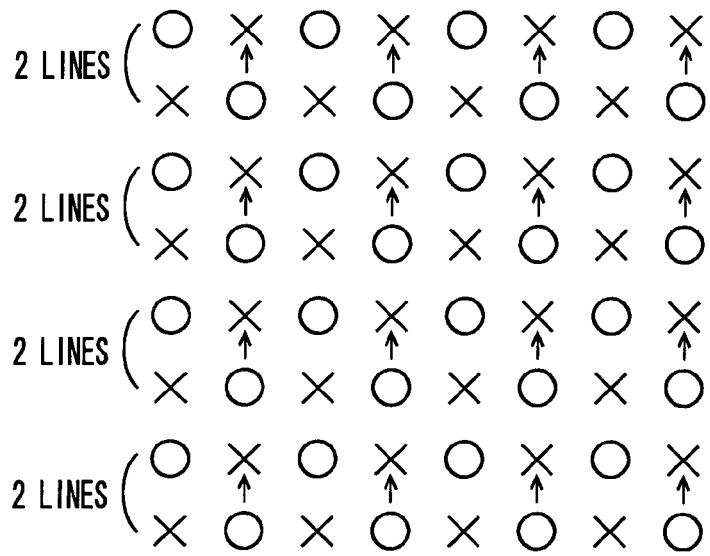
Figure 23C:
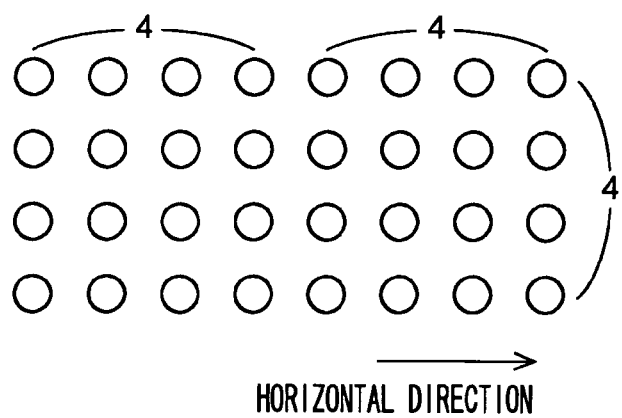

FIGS. 23A to 23C show a relationship between sub-sampling and an ADRC block. FIG. 23A shows some (8×8=64 pixels) of pixel data that constitutes the image data Vdg1. "o" indicates the pixel data. FIG. 23B shows image data after sub-sampling, in which "o" indicates sub-sampled pixel data and "X" indicates a position of a pixel data that has been dropped out through sub-sampling. For each pair of consecutive two lines, the sub-sampling circuit 1143 creates new pixel data with the sub-sampled pixel data that constitutes the image data corresponding to these consecutive two lines being alternately arranged.

FIG. 23C shows image data Vcd' that is output from the sub-sampling circuit 1143. This image data Vcd' has half the number of lines for the image data Vdg1. The blocking circuit 1172 halves the number of lines of the image data Vcd' as described above and, therefore, provides two blocks each of which has a size of 4×4 pixels according to 8×8 items of pixel data of the image data Vdg1 shown in FIG. 23A.

Figure 24:
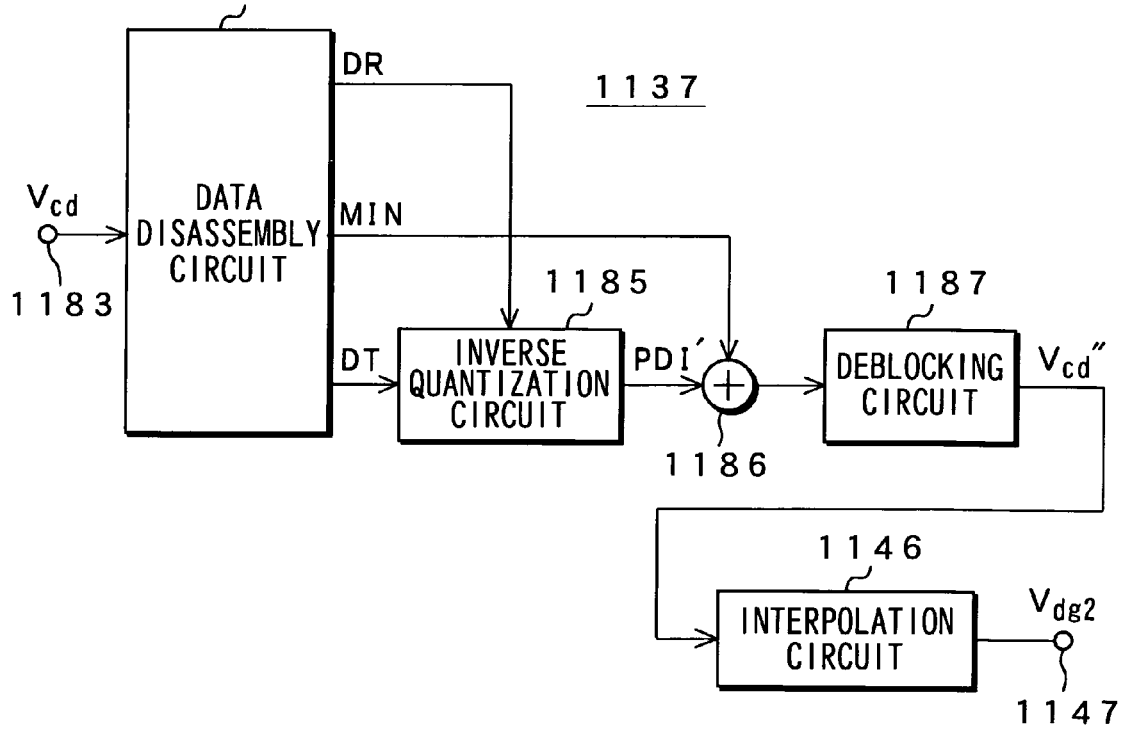
FIG. 24 is a block diagram for showing a configuration of a decoding (sub-sampling+ADRC) section.

FIG. 24 shows a configuration of the decoding section 1137 in a case where the encoding section 1135 is configured as shown in FIG. 22. It is to be noted that the decoding section 1111 in the reproducer 1110 has also almost the same configuration. In this figure, components that correspond to FIGS. 20 and 10 are indicated by the same symbols and their detailed explanation will be omitted.

As in the case of the decoding section 1137 shown in FIG. 20, this decoding section 1137 performs decoding that corresponds to ADRC on the encoded image data Vcd through the data disassembly circuit 1184, the inverse quantization circuit 1185, the adder 1186, and the deblocking circuit 1187.

Furthermore, as in the case of the decoding circuit 1137 shown in FIG. 10, the interpolation circuit 1146 performs decoding that corresponds to encoding by use of sub-sampling on image data Vcd" output from the deblocking circuit 1187, to obtain decoded image data Vdg2.

If encoding by use of sub-sampling and ADRC are performed in series by the encoding section 1135, the encoding section 1135 gives rise to more significant deterioration than that by the encoding sections 1135 shown in FIGS. 9 and 18 owing to the synergy effect of deterioration due to both types of encoding.

FIG. 25 shows an additional configuration of the encoding section 1135. In this case, the encoding section 1135 performs encoding by use of sub-sampling, ADRC, and conversion encoding. In this FIG. 25, components that correspond to those in FIGS. 9, 12, and 18 are indicated by the same symbols and their detailed description will be omitted.

As the encoding section 1135 shown in FIG. 9, this encoding section 1135 performs encoding by use of sub-sampling on digital image data Vdg1 output from the A/D converter 1134, through the low-pass filter 1142 and the sub-sampling circuit 1143.

Further, as in the case of the encoding section 1135 shown in FIG. 18, the blocking circuit 1172, the maximum value detection circuit 1173, the minimum value detection circuit 1174, the subtracters 1175 and 1177, the quantization circuit 1178, the data synthesis circuit 1181, etc. performs ADRC on the encoded image data Vcd' output from the sub-sampling circuit 1143, to obtain encoded image data Vcd.

In this case, however, as in the case of the encoding section 1135 shown in FIG. 12, a code signal DT of each block obtained by the quantization circuit 1178 undergoes conversion encoding through the DCT circuit 1153, the quantization circuit 1154, and the entropy encoding circuit 1155. Encoded data DT' output from this entropy encoding circuit 1155 is then supplied to the data synthesis circuit 1181 instead of the code signal DT.

Figure 26:
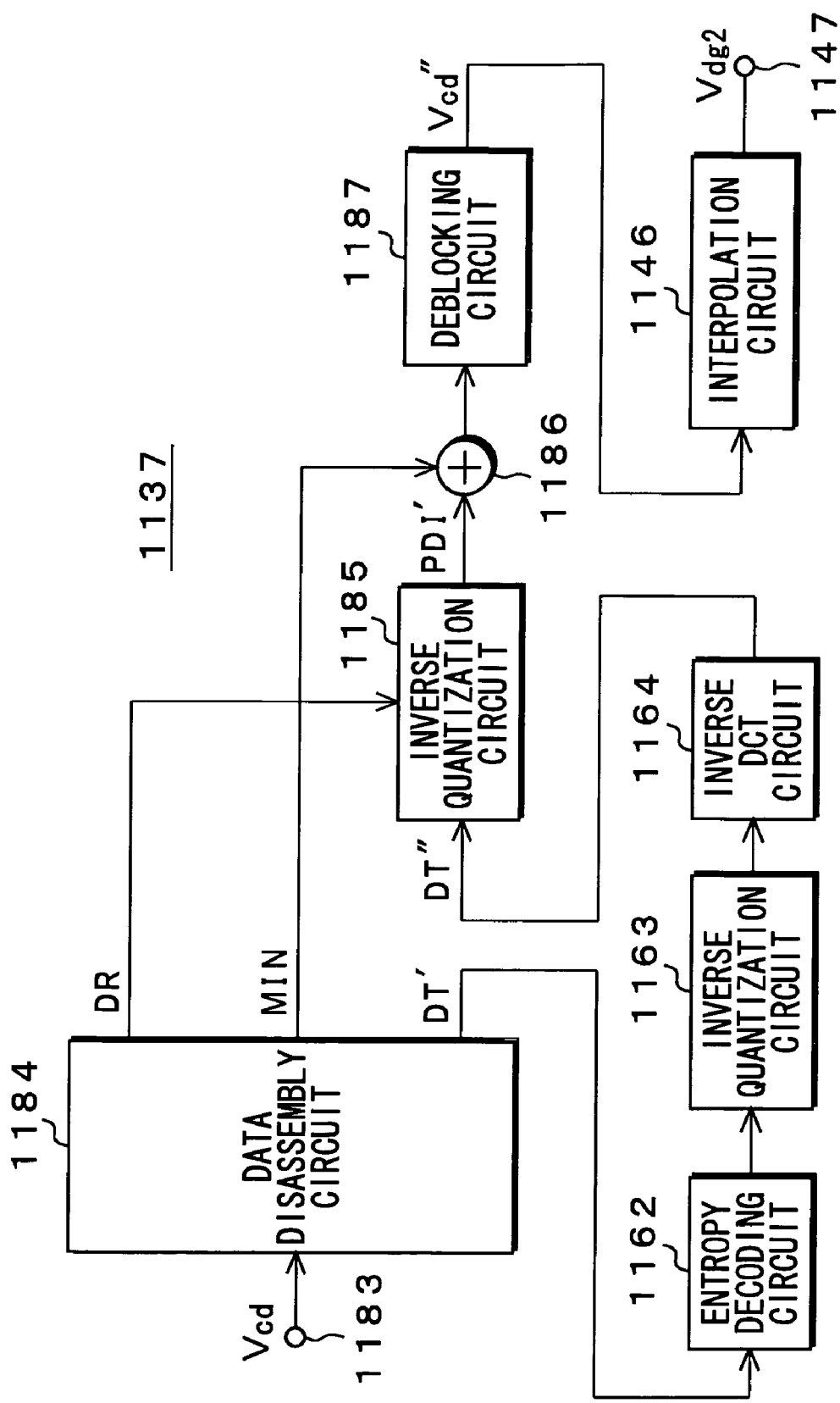
FIG. 26 is a block diagram for showing a configuration of a decoding (sub-sampling+ADRC+DCT) section.

FIG. 26 shows a configuration of the decoding section 1137 in a case where the encoding section 1135 is configured as shown in FIG. 25. It is to be noted that the decoding section 1111 in the reproducer 1110 also has the same configuration. In this figure, components that correspond to those of FIGS. 20, 13, and 10 are indicated by the same symbols and their detailed explanation will be omitted.

As in the case of the decoding section 1137 shown in FIG. 20, this decoding section 1137 performs decoding that corresponds to ADRC on the encoded image data Vcd by the data disassembly circuit 1184, the inverse quantization circuit 1185, the adder 1186, and the deblocking circuit 1187.

In this case, however, from the data disassembly circuit 1184, conversion-encoded data DT' is output instead of the code signal DT. Therefore, as in the case of the decoding section 1137 shown in FIG. 13, decoding that corresponds to conversion encoding is performed on this encoded data DT' by the entropy decoding circuit 1162, the inverse quantization circuit 1163, and the inverse DCT circuit 1164, to obtain a code signal DT". Based on this code signal DT", minimum value-removed data PDI' is obtained by the inverse quantization circuit 1185.

Furthermore, as in the case of the decoding section 1137 shown in FIG. 10, the interpolation circuit 1146 performs decoding that corresponds to encoding by use of sub-sampling on image data Vcd" output from the deblocking circuit 1187, to obtain decoded image data Vdg2.

In a case where encoding by use of sub-sampling, ADRC, and conversion encoding are thus performed in series in the encoding section 1135, the encoding section 1135 gives rise to more significant deterioration than those by the encoding section 1135 shown in FIGS. 9, 12, and 18 owing to the synergy effect of deterioration due to these encoding processes.

Although the encoding apparatus 1130 of the above embodiment has comprised of both the recording section 1136 and the display 1139, either one or both of these recording section 1136 and display 1139 may be provided externally to the encoding apparatus 1130.

Although the encoding apparatus 1130 of the above embodiment has been described such that the sampling clock CLK is shifted in phase to thereby shift a phase of the image data Vdg1 output from the A/D converter 1134, instead of shifting the phase of the sampling clock CLK, for example, the analog image data Van1 supplied to the A/D converter 1134 could be delayed by a delay circuit to shift the phase of the image data Vdg1 output from the A/D converter 1134. In short, it is necessary only to shift the image data and the sampling clock CLK in phase with respect to each other.

Although, in the encoding apparatus 1130 of the above embodiment, the analog image data Van1 has been received and converted into digital data by the A/D converter 1134, the digital image data may be supplied directly. In this case, such a configuration is given that in the encoding apparatus 1130 of FIG. 7, in place of the analog image data Van1, for example, the digital image data Vdg0' output from the decoding section 1111 in the reproducer may be supplied and the clock generation circuit 1133 and the A/D converter 1134 may be eliminated.

In this case also, the phase of the digital image data Vdg0' can be shifted substantially by performing encoding processing based on synchronization signals VD and HD that are separated from the digital image data Vdg0' by the encoding section 1135 and delayed by the delay circuit 1132. In this case, some components of the delay circuit 1132 and the encoding section 1135 constitute phase-shifting means.

In this case, a block position in, for example, conversion encoding or ADRC is shifted from a block position at the time of obtaining encoded digital data used to acquire the image data Vdg0', so that significant deterioration can be generated through encoding by the encoding section 1135.

Figure 27:
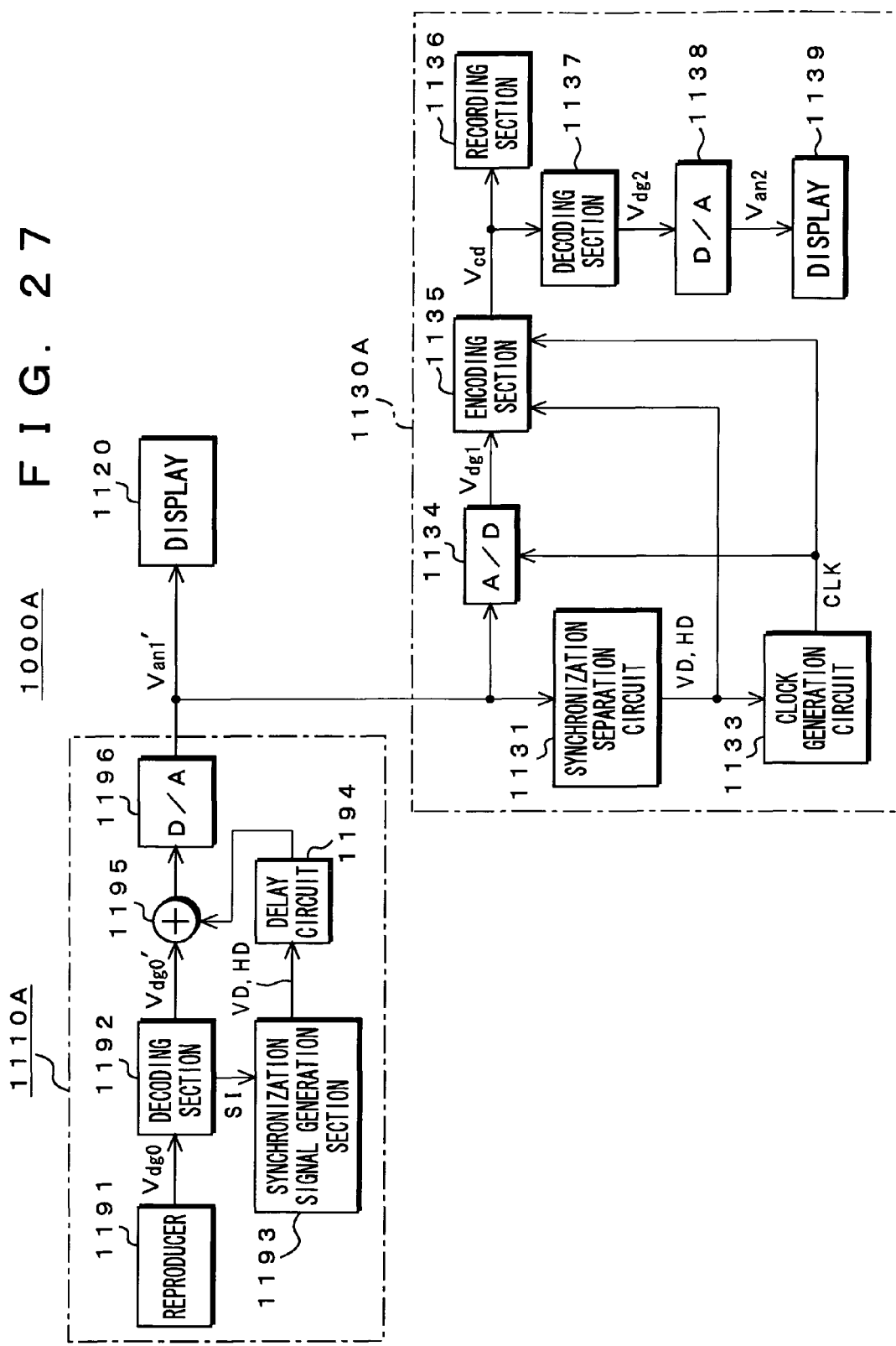
FIG. 27 is a block diagram for showing a configuration of an image display system according to a second embodiment of the present invention.

The following will describe a second embodiment of the present invention. FIG. 27 shows an image display system 1000A according to the second embodiment of the present invention. In this FIG. 27, components that correspond to those of FIG. 7 are indicated by the same symbols and their detailed description will be omitted.

This image display system 1000A has a reproducer 1110A for outputting analog image data Van1' and a display 1120 for displaying an image due to the image data Van1' output from this reproducer 1110A.

The reproducer 1110A will be described as follows. This reproducer 1110A has a reproduction section 1191 for reproducing a recording medium such as an optical disc to obtain encoded image data Vdg0 and a decoding section 1192 for decoding the image data Vdg0 output from this reproduction section 1191.

The reproducer 1110A further has a synchronization signal generation section 1193 for generating a vertical synchronization signal VD and a horizontal synchronization signal HD based on synchronization information SI, which is output from this decoding section 1192, that corresponds to digital data Vdg0' output from this decoding section 1192 and a delay circuit 1194 for delaying by a predetermined lapse of time the synchronization signals VD and HD generated by this synchronization signal generation section 1193.

This delay circuit 1194 is almost of the same configuration as the delay circuit 1132 in the encoding apparatus 1130 shown in FIG. 7. That is, in this delay circuit 1194, the synchronization signals VD and HD are each delayed by a predetermined lapse of time or a random lapse of time. The random lapse of time can be determined by, for example, an equipped random number generator based on a random number that is generated when its power is turned ON or obtained by sequentially selecting predetermined kinds of lapses of time stored in a memory each time its power is turned ON.

The reproducer 1110A further has a synthesizer 1195 for synthesizing the synchronization signals VD and HD delayed by the delay circuit 1194 into the image data Vdg0' output from the decoding section 1192 and a D/A converter 1196 for converting the image data output from this synthesizer 1195 into analog data to thereby obtain analog image data Van1'.

It is to be noted that the reproducer 1110 shown in FIG. 7, although not described above, is actually configured in almost the same manner as this reproducer 1110A. However, the delay circuit 1194 is not provided, so that the synchronization signals VD and HD generated by the synchronization signal generation section 1193 are directly supplied to the synthesizer 1195, to be synthesized to the image data Vdg0'.

The following will describe operations of this reproducer 1110A. The reproduction section 1191 provides encoded image data Vdg0 by reproducing the recording medium such as an optical disc. This encoded image data Vdg0 is decoded by the decoding section 1192 to provide digital image data Vdg0'.

Further, the decoding section 1192 provides synchronization information SI that corresponds to the image signal Vdg0', which synchronization information SI is supplied to the synchronization signal generation section 1193. The synchronization signal generation section 1193 generates the vertical synchronization signal VD and the horizontal synchronization signal HD based on the synchronization information SI.

The image data Vdg0' obtained by the decoding section 1192 is supplied to the synthesizer 1195. Further, this synthesizer 1195 is supplied with the synchronization signals VD and HD generated by the synchronization signal generation section 1193 via the delay circuit 1194. The synthesizer 1195 synthesizes the synchronization signals VD and HD into the image data Vdg0'.

Image data output from this synthesizer 1195 is supplied to a D/A converter 1196. This D/A converter 1196 converts this image data into analog data, to provide analog image data Van1'.

Since the synchronization signals VD and HD are delayed by the delay circuit 1194, the image data Vdg0' is shifted in phase with respect to these of the synchronization signals VD and HD. It is to be noted that instead of delaying the synchronization signals VD and HD, for example, the image data Vdg0' could be delayed to shift the phase of the image data Vdg0' with respect to those of the synchronization signals VD and HD. That is, in this reproducer 1110A, it is significant to shift the phase of the image data Vdg0' and those of the synchronization signals VD and HD with respect to each other, means for which is not limited in particular.

It is to be noted that encoded image data Vdg0 reproduced by the reproduction section 1191 is obtained through encoding by the encoding section 1135 shown in, for example, FIG. 9, 12, 15, 18, 22, or 25. In this case, the decoding section 1192 is configured as shown in FIG. 10, 13, 17, 20, 24, or 26, respectively.

The image display system 1001A further has an encoding apparatus 1130A for performing encoding processing again by utilizing the analog image data Van1' output from the reproducer 1110A and recording encoded image data on recording medium such as an optical disc. This encoding apparatus 1130A is obtained by removing the delay circuit 1132 from the encoding apparatus 1130 shown in FIG. 7. The other components thereof are the same as those of the encoding apparatus 1130. It is to be noted that the encoding section 1135 are configured in the same manner as the encoding section for obtaining encoded image data Vdg0 given in the reproducer 1110A. Further, the decoding section 1137 is configured in the same manner as the decoding section 1192 in the reproducer 1110A.

In the image display system 1000A shown in this FIG. 27, the image data Vdg0' and the synchronization signals VD and HD are synthesized in a condition where their phases are shifted with respect to each other, which is then converted into analog data to provide image data Van1' in the reproducer 1110A. This analog image data Van1' is supplied to the display 1120, on which an image due to this image data Vdg1' is displayed. In this case, an image quality of this image is not influenced although it may be expected that, for example, its display position is shifted to some extent because the phase of the image data Vdg0' and the phases of the synchronization signals VD and HD are shifted with respect to each other.

Further, the image signal Van1' is supplied to the encoding apparatus 1130A. This image signal Van1' is obtained by converting such data that, as described above, the phase of the image data Vdg0' and the phases of the synchronization signals VD and HD are shifted with respect to each other into analog data. Therefore, the sampling clock CLK output from the clock generation circuit 1133 is shifted in phase with respect to image data as in the case of the encoding apparatus 1130 shown in FIG. 7, so that the image data Vdg1 output from the A/D converter 1134 is also shifted in phase.

Therefore, as in the case of the encoding section 1135 in the encoding apparatus 1130 shown in FIG. 7, the encoding section 1135 in this encoding apparatus 1130A also generates significant deterioration due to encoding. This thus disables the image data to be copied in the encoding apparatus 1130A in a condition where its good image quality is maintained.

A configuration of the reproducer 1110A shown in FIG. 27 has such an effect as to disable the image data to be copied in a condition where its good image quality is maintained even with the ordinary encoding apparatus 1130A in which the synchronization signals VD and HD are not delayed.

Although, in the above first and second embodiments, the image data output means have been the reproducers 1110 and 1110A, the present invention can be applied to any other output means that outputs similar image data. For example, it may be a tuner etc. for processing a broadcast signal, to output image data.

Although the above embodiments have handled image data, the present invention can be applied similarly to an embodiment for handling audio data. In the case of handling the audio data, a display section that serves as display means correspond to a speaker that serves as audio output means.

Although the above first and second embodiments have given only one example of the configuration of the encoding section 1135, the present invention is not limited thereto. In short, it is necessary only to shift a phase of the digital image data Vdg1, thereby performing encoding accompanied by significant deterioration.

By the apparatus for encoding the data related to the present invention, phase-shifted digital data is encoded in configuration, so that it is impossible to copy data in a condition where its good quality is maintained without deteriorating a quality of an output owing to the data before being copied.

Further, by the apparatus for outputting the data related to the present invention, a phase of digital data to be output and that of a synchronization signal are shifted with respect to each other, so that it is impossible to copy the data in a condition where its good quality is maintained without deteriorating a quality of an output owing to the data before being copied.

Figure 28:
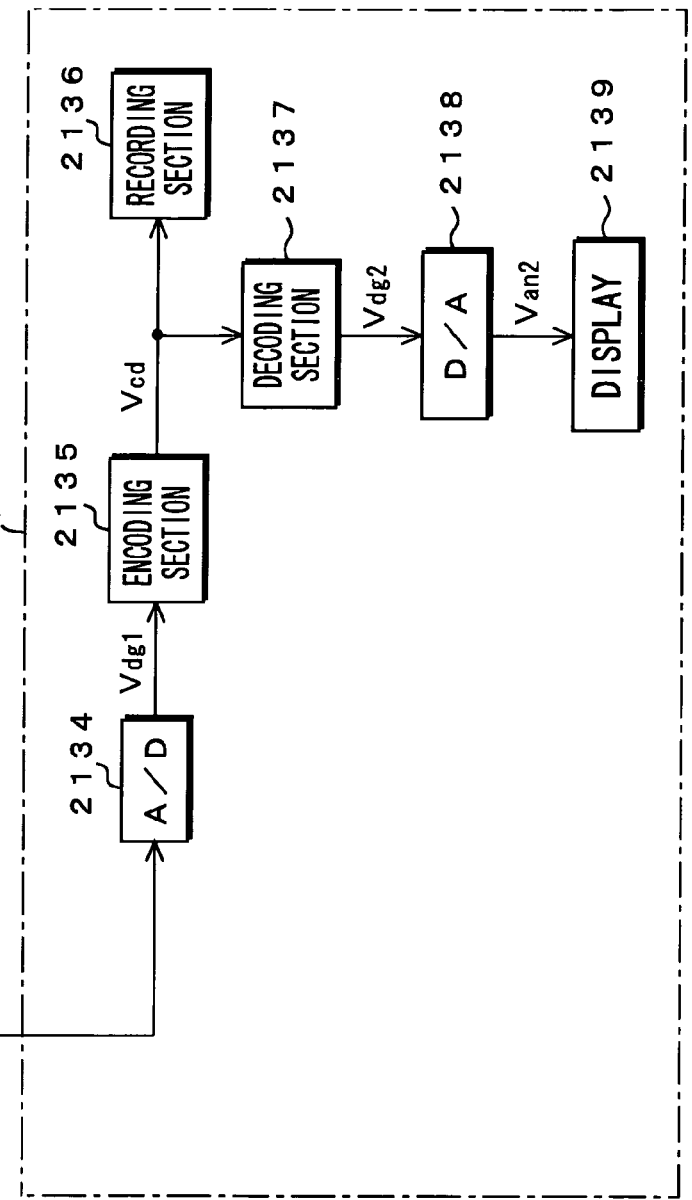
FIG. 28 is a block diagram for showing a configuration of an image display system according to a third embodiment of the present invention.

The following will describe a third embodiment of the present invention. FIG. 28 shows a configuration of an image display system 2000 according to the third embodiment of the present invention.

This image display system 2000 has a reproducer 2110 for outputting an analog image signal Van1 and a display 2120 for displaying an image due to the analog image signal Van1 output from this reproducer 2110.

The reproducer 2110 decodes an encoded digital image signal reproduced from a recording medium, such as an optical disc, not shown, by a decoding section 2111 and converts a decoded digital image signal Vdg0 obtained as a result of this decoding into analog signal by a D/A converter 2112, to provide an analog image signal Van1. It is to be noted that the display 2120 may be, for example, a CRT display or an LCD.

In this case, the analog image signal Van1 is accompanied by analog distortion. This analog distortion contains distortion generated when a high-frequency component is removed in conversion into the analog signal by the D/A converter 2112, distortion generated when the signal is shifted in phase through conversion into the analog signal by the D/A converter 2112, etc. It is to be noted that to evaluate deterioration in an image owing to this analog distortion, a signal-to-noise (S/N) evaluation method, a visual evaluation (visual deterioration evaluation) method, etc. are available. This analog distortion may be generated spontaneously or intentionally.

This image display system 2000 further has an encoding apparatus 2130 for performing encoding again by utilizing the analog image signal Van1 and recording an encoded digital image signal Vcd on the recording medium such as an optical disc.

This encoding apparatus 2130 has an A/D converter 2134 for converting an analog image signal Van1 output from the reproducer 2110 into a digital signal and an encoding section 2135 for encoding a digital signal Vdg1 output from this A/D converter 2134. This encoding section 2135 performs almost the same encoding as that for an encoded digital image signal obtained by being reproduced in the above-described reproducer 2110 from the recording medium such as an optical disc.

Figure 29:
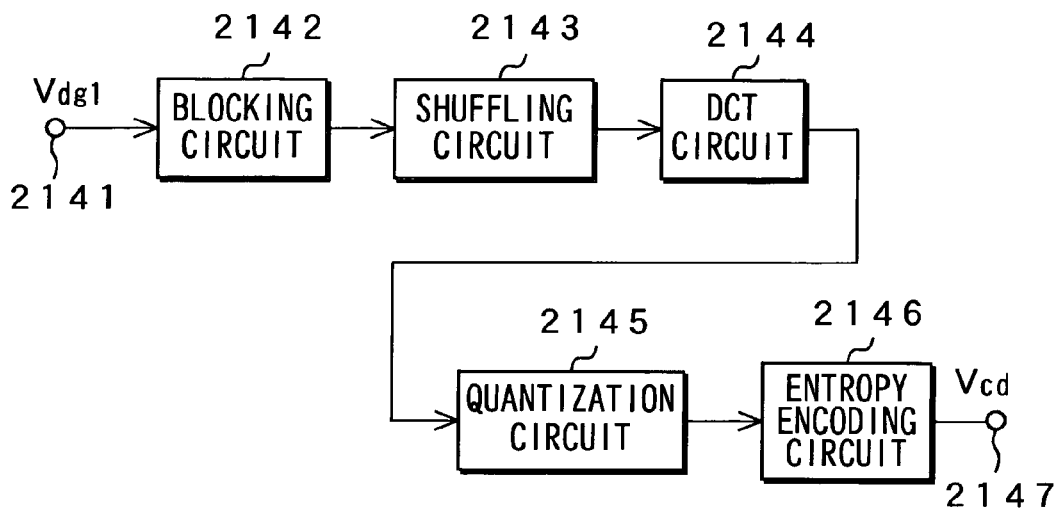
FIG. 29 is a block diagram for showing a configuration of an encoding section.

FIG. 29 shows a configuration of the encoding section 2135. This encoding section 2135 has a receiving terminal 2141 for receiving a digital image signal Vdg1, a blocking circuit 2142 for dividing the image data Vdg1 received at this receiving terminal 2141 into blocks (DCT blocks), and a shuffling circuit 2143 for shuffling pixel data of each of the blocks obtained by this blocking circuit 2142, to reconfigure the blocks.

In this case, the blocking circuit 2142 and the shuffling circuit 2143 constitute blocking means, and thus, this blocking means performs blocking accompanied by shuffling in such a predetermined pattern as to reduce a correlation between items of pixel data of adjacent positions contained in each of the blocks.

Figure 30:
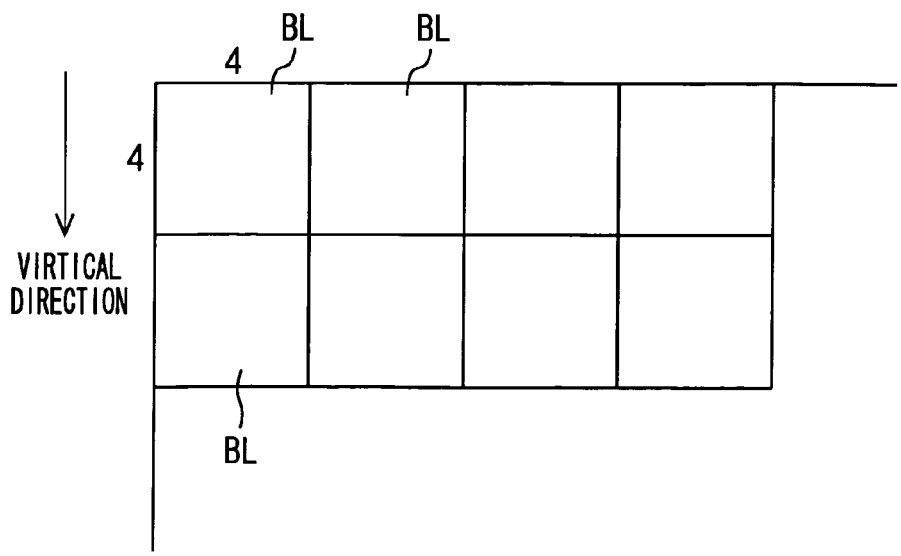
FIG. 30 is an explanatory illustration of blocking.
Figure 31:
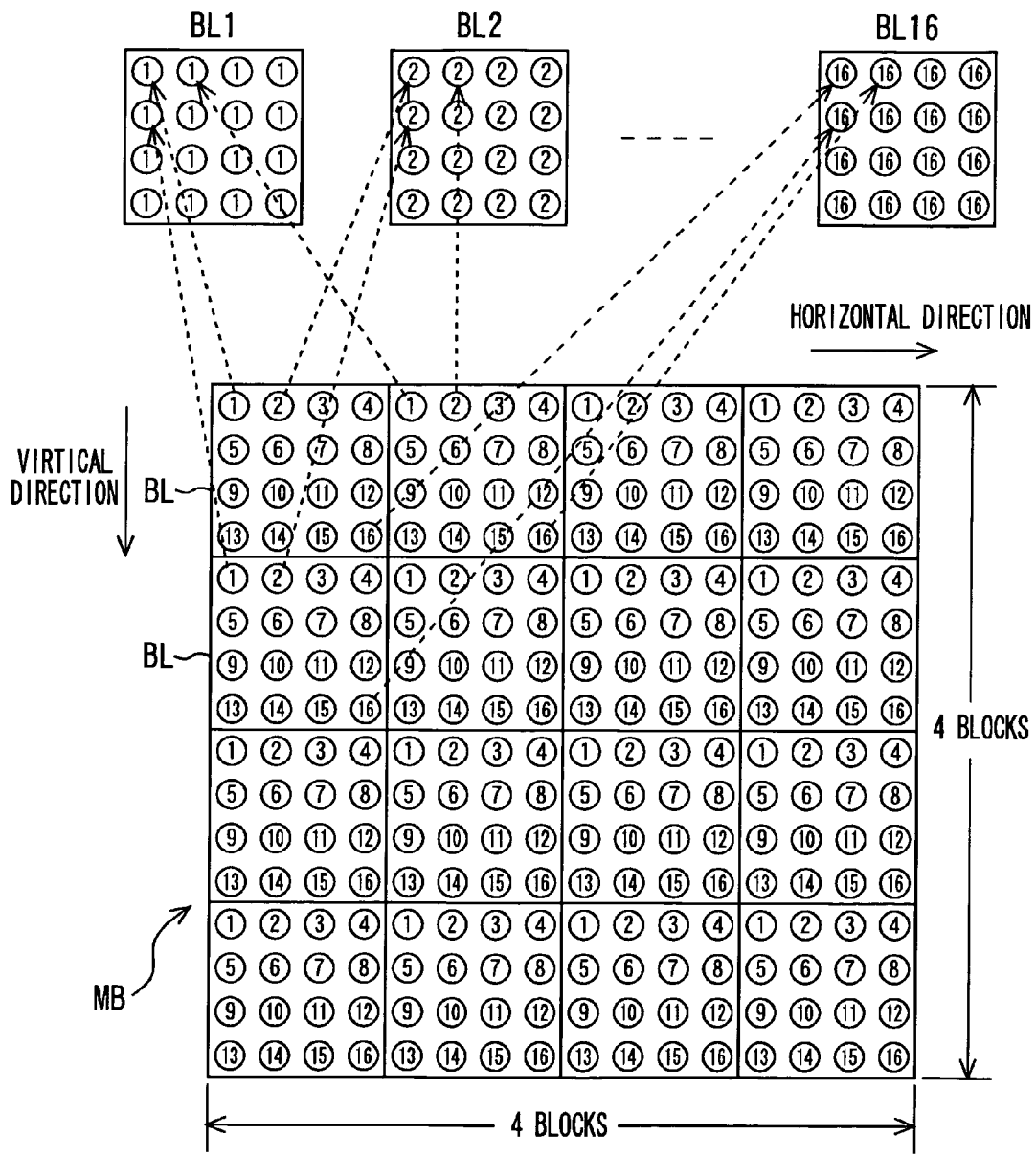
FIG. 31 is an explanatory illustration of one example of a shuffling pattern.

That is, the blocking circuit 2142 divides the image signal Vdg1 on an effective screen into blocks BL each of which has a size of, for example, 4×4 pixels as shown in FIG. 30. Further, in the shuffling circuit 2143, as shown in FIG. 31, 16 (=4×4) blocks BL is configures as a macro block MB and one block is reconfigured by taking out one item of pixel data from each of the 16 blocks constituting this macro block MB, thereby resultantly reconfiguring new 16 blocks BL1 to BL16 from the macro block MB. It is to be noted that "o" indicates pixel data that constitutes a block.

The encoding section 2135 further has a DCT circuit 2144 for performing, for each block, DCT as orthogonal transformation on pixel data of each of the blocks obtained by the shuffling circuit 2143 to calculate coefficient data as a conversion coefficient and a quantization circuit 2145 for quantizing the coefficient data of each block from this DCT circuit 2144 by using a quantization table, not shown.

The encoding section 2135 further has an entropy encoding circuit 2146 for obtaining an encoded digital image signal Vcd by performing entropy encoding, for example, Huffman encoding on the coefficient data of each block quantized by the quantization circuit 2145 and an output terminal 2147 for outputting the encoded digital image signal Vcd obtained by this entropy encoding circuit 2146.

The following will describe operations of the encoding section 2135 shown in FIG. 29. At the receiving terminal 2141, a digital image signal Vdg1 is received. This image signal Vdg1 is supplied to the blocking circuit 2142. This blocking circuit 2142 divides the image signal Vdg1 on the effective screen into two-dimensional blocks, each of which has a size of, for example, 4×4 pixels.

Pixel data of each block obtained by this blocking circuit 2142 is further supplied to the shuffling circuit 2143 to be shuffled there. Thus, blocking is performed so as to reduce a correlation between the items of pixel data of the adjacent positions contained in each of the blocks.

That is, as shown in FIG. 31, in the shuffling circuit 2143, 16 (=4×4) blocks BL is configured as a macro block MB so that by taking out one item of pixel data from each of the 16 blocks of this macro block MB, one block is reconfigured, thereby resultantly reconfiguring new 16 blocks BL1 to BL16 from the macro block MB.

Pixel data of each of the blocks obtained by the shuffling circuit 2143 is supplied to the DCT circuit 2144. For each of the blocks, this DCT circuit 2144 performs DCT on the pixel data of each block, to calculate coefficient data as a conversion coefficient. This coefficient data is supplied to the quantization circuit 2145.

The quantization circuit 2145 quantizes the coefficient data of the blocks by using the quantization table to sequentially obtain quantized coefficient data of the blocks. The quantized coefficient data of the blocks is supplied to the entropy encoding circuit 2146. This encoding circuit 2146 performs, for example, Huffman encoding on the quantized coefficient data of the blocks. Thus, an encoded digital image signal Vcd is obtained from the encoding circuit 2146 and output to the output terminal 2147.

Figure 32:
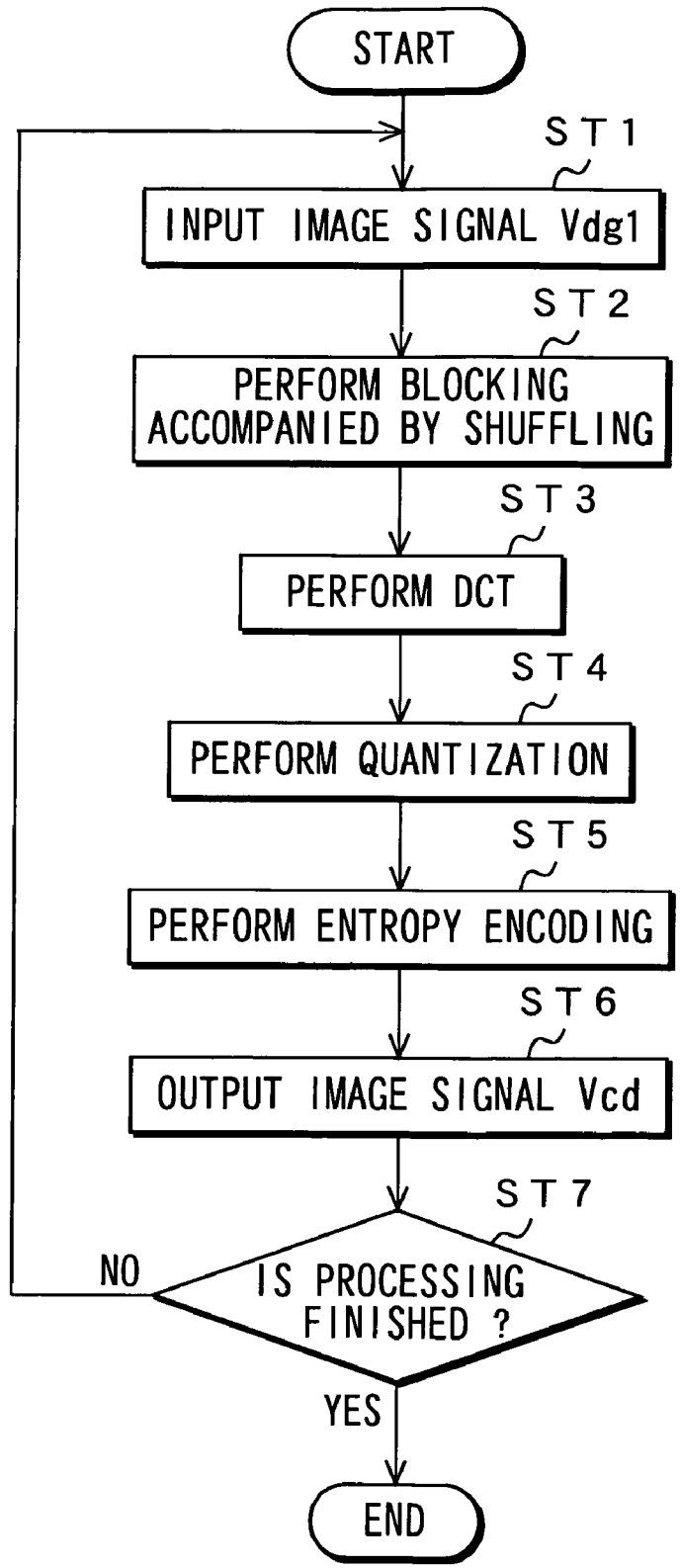
FIG. 32 is a flowchart for showing a procedure for encoding processing.

The above-described processing of the encoding section 2135 can also be performed by software. A flowchart of FIG. 32 gives a procedure for performing encoding processing in this case.

First, at step ST1, an image signal Vdg1 is received by, for example, as much as one frame. At step ST2, the process performs blocking accompanied by shuffling on the image signal Vdg1. That is, the process divides the image signal Vdg1 into two-dimensional blocks BL, each of which has a size of, for example, 4×4 pixels and shuffles the pixel data in the 16 blocks BL constituting the macro block MB, to reconfigure 16 blocks BL1 to BL16 (see FIG. 31).

Next, at step ST3, the process performs, for each block, DCT on the pixel data of each block to calculate coefficient data as a conversion coefficient. At step ST4, the process quantizes the coefficient data of each of the blocks by using the quantization table, to sequentially obtain quantized coefficient data of each of the blocks.

Next, at step ST5, the process performs, for example, Huffman encoding on the quantized coefficient data of each block to generate an encoded digital image signal Vcd. At step ST6, the process outputs the generated image signal Vcd by as much as one frame.

Next, at step ST7, the process decides whether frames to be processed are all finished. If such is not the case, the process returns to step ST1 to receive the next mage signal Vdg1 by as much as one frame and perform the same encoding processing as described above. If the frames to be processed are all finished, the process ends the encoding processing.

Referring back to FIG. 28, the encoding apparatus 2130 further has a recording section 2136 for recording the encoded digital image signal Vcd output from the encoding section 2135 on the recording medium such as an optical disc. In this case, the recording section 2136 performs copy in accordance with the analog image signal Van1.

The encoding apparatus 2130 further has a decoding section 2137 for decoding the encoded digital image signal Vcd output from the encoding section 2135, a D/A converter 2138 for converting a decoded digital image signal Vdg2 obtained by decoding by this decoding section 2137 into an analog signal, and a display 2139 for displaying an image due to the analog image signal Van2 output from this D/A converter 2138. The display 2139 may be, for example, a CRT display or an LCD.

Figure 33:
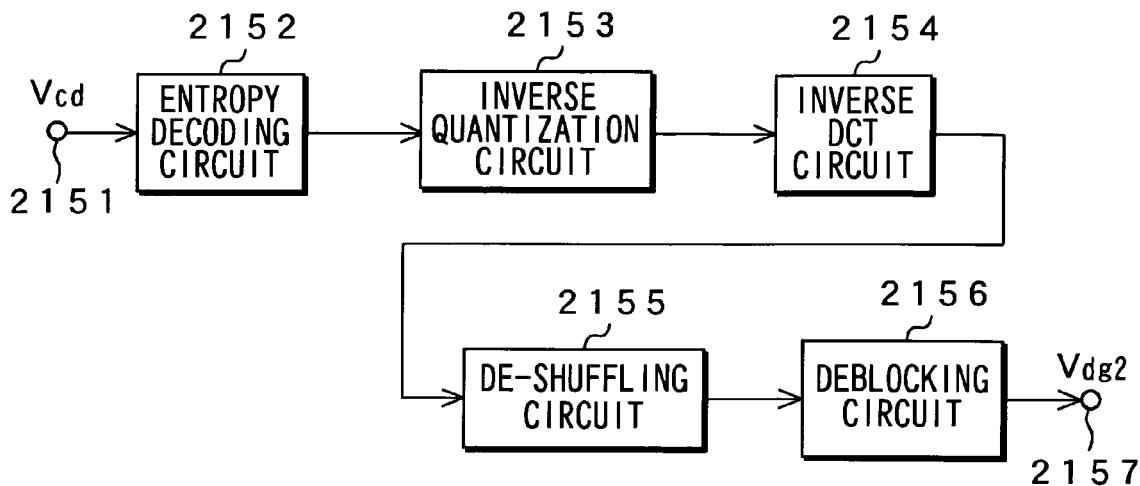
FIG. 33 is a block diagram for showing a configuration of a decoding section.

FIG. 33 shows a configuration of the decoding section 2137. This decoding section 2137 has a receiving terminal 2151 for receiving an encoded digital image signal Vcd and an entropy decoding circuit 2152 that serves as variable-length decoding means for decoding the image signal Vcd (entropy-encoded signal, for example, Huffman-encoded signal) received at this receiving terminal 2151.

The decoding section 2137 further has an inverse quantization circuit 2153 for performing inverse quantization on quantized coefficient data of each block output from the decoding circuit 2152 to obtain coefficient data of each block and an inverse DCT circuit 2154 for performing, for each block, inverse DCT on the coefficient data of each block obtained by this inverse quantization circuit 2153 to obtain pixel data.

The decoding section 2137 further has a de-shuffling circuit 2155 for de-shuffling pixel data of each block obtained by the inverse DCT circuit 2154, a deblocking circuit 2156 for bringing back the pixel data of each block obtained by the de-shuffling circuit 2155 to a pre-blocking position thereof to obtain a decoded digital image signal vdg2, and an output terminal 2157 for outputting the image signal Vdg2 provided from this deblocking circuit 2156. Herein, the de-shuffling circuit 2155 and the deblocking circuit 2156 constitute inverse-blocking means.

The de-shuffling circuit 2155 performs processing opposite to that performed by the above-described shuffling circuit 2143 in the encoding section 2135. That is, the de-shuffling circuit 2155 brings back pixel data of the 16 blocks BL1 to BL16 to the corresponding positions of the original 16 blocks BL (see FIG. 31). Further, the deblocking circuit 2156 performs processing opposite to that performed by the above-described blocking circuit 2142 in the encoding section 2135. That is, the deblocking circuit 2156 brings back the data order to its raster scan order.

The following will describe operations of the decoding section 2137 shown in FIG. 33. An encoded digital image signal Vcd is received at the receiving terminal 2151. This image signal Vcd is supplied to the entropy decoding circuit 2152. This image signal Vcd is an entropy-encoded signal, for example, a Huffman-encoded signal. The image signal Vcd is decoded by the decoding circuit 2152 to provide quantized coefficient data of each block. This quantized coefficient data of each block is supplied to the inverse quantization circuit 2153.

The inverse quantization circuit 2153 performs inverse quantization on the quantization coefficient data of each block to obtain coefficient data of each block. The coefficient data of each block is supplied to the inverse DCT circuit 2154. The inverse DCT circuit 2154 performs, for each block, inverse DCT on the coefficient data of each block to obtain pixel data of each block.

The pixel data of each block thus obtained by the inverse DCT circuit 2154 is supplied to the de-shuffling circuit 2155. This de-shuffling circuit 2155 brings back pixel data of the 16 blocks BL1 to BL16 to the corresponding positions of the original 16 blocks BL.

The pixel data of each block BL obtained by this de-shuffling circuit 2155 is supplied to the deblocking circuit 2156. This deblocking circuit 2156 brings back order of the pixel data to its raster scan order. Thus, a decoded digital image data Vdg2 is obtained from the deblocking circuit 2156 and output to the output terminal 2157.

Figure 34:
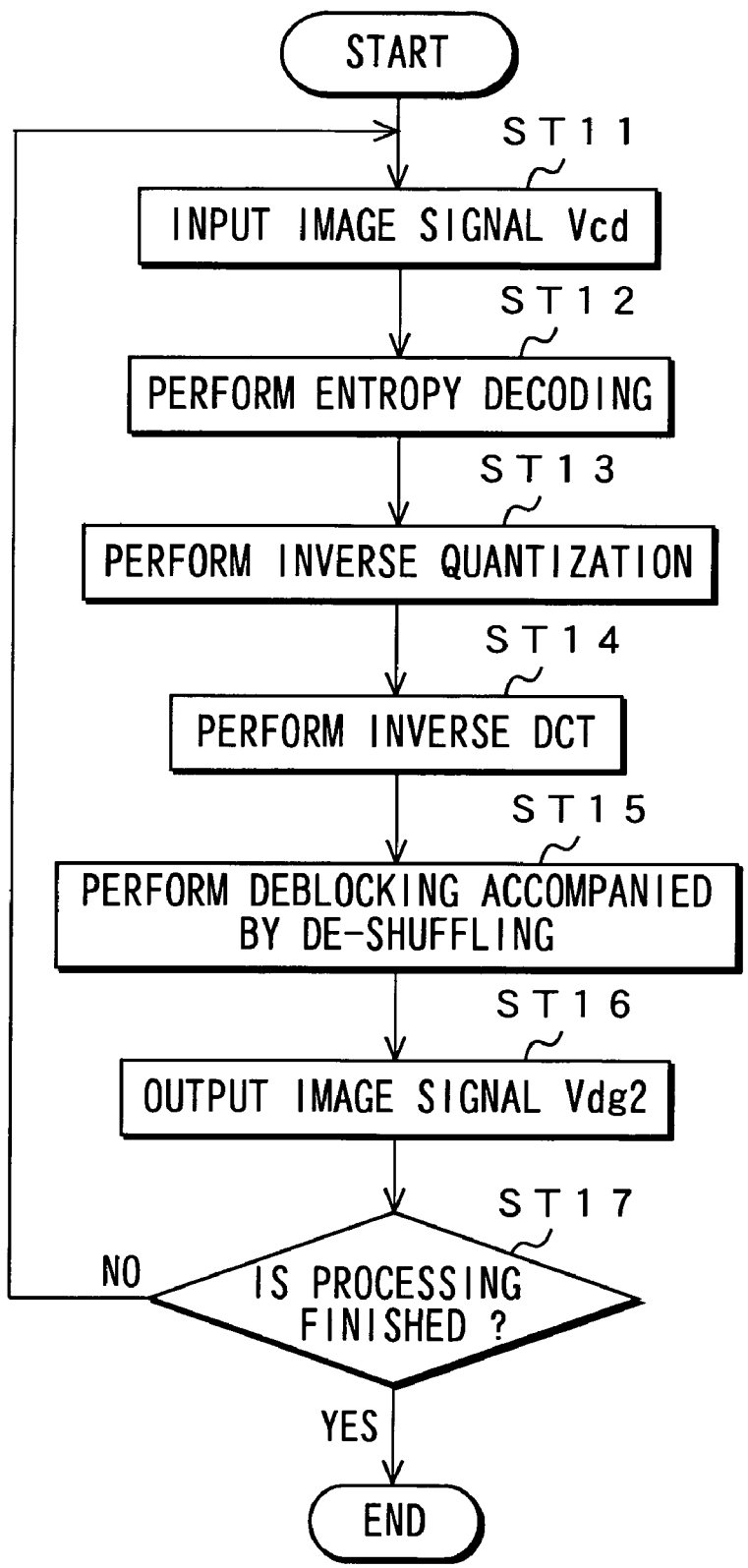
FIG. 34 is a flowchart for showing a procedure for decoding processing.

The above-described processing of the decoding section 2137 can also be performed by software. A flowchart of FIG. 34 gives a procedure for performing encoding processing in this case.

First, at step ST11, an image signal Vcd is received by, for example, as much as one frame. At step ST12, the process performs entropy decoding on the image signal Vcd to obtain quantized coefficient data of each block.

Next, at step ST13, the process performs inverse quantization on the quantized coefficient data of each block to obtain coefficient data of each block. At step ST14, the process performs, for each block, inverse DCT on the coefficient data of each block to obtain pixel data of each block.

Next, at step ST15, the process performs deblocking accompanied by de-shuffling. That is, the process brings back pixel data of the 16 blocks BL1 to BL16 to the corresponding positions of the 16 blocks BL (see FIG. 31) and, further, brings back order of the pixel data to its raster scan order, to generate a decoded digital image signal Vdg2. At step ST16, the process outputs the generated image signal Vdg2 by as much as one frame.

Next, at step ST17, the process decides whether frames to be processed are all finished. If such is not the case, the process returns to step ST11 to receive the next image signal Vcd by as much as one frame and performs the same decoding processing as described above. If the frames to be processed are all finished, the process ends the decoding processing.

The following will describe operations of the encoding apparatus 2130 shown in FIG. 28. An analog image signal Van1 having analog distortion, which is output from the reproducer 2110, is supplied to the A/D converter 2134 where it is converted into a digital signal. A digital image signal Vdg1 output from this A/D converter 2134 is supplied to the encoding section 2135. This encoding section 2135 encodes the image signal Vdg1 to obtain an encoded digital image signal Vcd.

As described above, this encoding section 2135 performs, on the image signal Vdg1, blocking accompanied by shuffling in such a predetermined pattern as to reduce a correlation between items of data of adjacent positions contained in each block, to perform DCT as orthogonal transformation on pixel data of each block, quantization on coefficient data of each block, and entropy encoding on quantized coefficient data of each block, thereby obtaining the encoded digital image signal Vcd.

The encoded digital image signal Vcd output from this encoding section 2135 is supplied to the recording section 2136. The recording section 2136 records this image signal Vcd on the recording medium such as an optical disc, to perform copy based on the analog image signal Van1.

If the analog image signal Van1 output from the reproducer 2110 has undergone the first encoding and decoding, as described above, an image signal obtained by reproducing the image signal Vcd recoded on the recoding medium and then decoding it undergoes the second encoding and decoding. In this case, since the analog image signal Van1 has analog distortion, a decoded digital image signal obtained by reproducing the image signal Vcd recorded on the recording medium and then decoding it has significant deterioration as compared with the decoded digital image signal Vdg0 output from the decoding section 2111.

That is, for example, if the analog image signal Van1 has distortion generated because its original signal is shifted in phase when it is converted into the analog signal, a block position of each block obtained upon blocking by the encoding section 2135 is shifted with respect to a block position in the first encoding and decoding owing to fluctuations in sampling phase at the time of conversion into a digital signal by the A/D converter 2134.

Therefore, much more information is lost through quantization performed by the encoding section 2135, so that a decoded digital image signal obtained by reproducing the image signal Vcd recorded on the recording medium and then decoding it has significant deterioration as compared with the decoded digital image signal Vdg0 obtained by the decoding section 2111 in the reproducer 2110.

Then, as described above, the encoding section 2135 performs blocking accompanied by shuffling of such a predetermined pattern as to reduce a correlation between items of pixel data of adjacent positions contained in each of the blocks. It is thus possible to increase changes in coefficient data of each block accompanied by a shift in block position, thus much more increasing the information to be lost in quantization. That is, by performing this shuffling, an influence of analog distortion can be increased. Furthermore, if no analog distortion is contained in the image, it can be reproduced at an ordinary quality even if shuffling is performed on it.

It is to be noted that if the analog image signal Van1 output from the reproducer 2110 has undergone the second or later encoding and decoding, as described above, image data obtained by encoding the image signal by the encoding section 2135 and then decoding it undergoes the third or later encoding and decoding, thereby being much more deteriorated.

Therefore, an image quality of an image obtained by reproducing an encoded digital image signal Vcd recorded on the recording medium in the recording section 2136 is significantly deteriorated as compared with an image due to an analog image signal Van1 output from the reproducer 2110. Therefore, in this encoding apparatus 2130, it is impossible to copy an image in a condition where its good quality is maintained.

Further, the encoded digital image signal Vcd output from the encoding section 2135 is supplied to the decoding section 2137 where it is decoded. A decoded digital image signal Vdg2 obtained through decoding by this decoding section 2137 is converted into an analog image signal Van2 by the D/A converter 2138. The image signal Van2 output from the D/A converter 2138 is supplied to the display 2139. On the display 2139, an image due to this image signal Van2 is displayed.

In this case, if the analog image signal Van1 output from the reproducer 2110 has undergone the first encoding and decoding, as described above, an image signal Van2 obtained through encoding by the encoding section 2135 and decoding by the decoding section 2137 undergoes the second encoding and decoding and so has significant deterioration generated on it as described above. Therefore, an image quality of an image displayed on the display 2139 is significantly deteriorated as compared with an image (which is displayed on the display 2120) due to the analog image signal Van1 output from the reproducer 2110.

Further, in the case of the image display system 2000 shown in FIG. 28, the analog image signal Van1 output from the reproducer 2110 is not processed at all in order to cause the encoding apparatus 2130 to disable copying this image data in a condition where its good image quality is maintained, so that an image quality of an image due to this analog image data Van1 is not deteriorated.

As described above, in the present embodiment, the encoding section 2135 in the encoding apparatus 2130 performs encoding by use of block-encoding on a digital image signal Vdg1 obtained by converting an analog image signal Van1, which has analog distortion and is output from the reproducer 2110, into a digital signal. An encoded digital image signal Vcd thus obtained by this encoding section 2135 is recorded on the recording medium.

In this case, if the analog image signal Van1 output from the reproducer 2110 has undergone the first encoding and decoding, an image signal obtained by reproducing the image signal Vcd recorded on the recording medium and then decoding it undergoes the second encoding and decoding and so has significant deterioration.

Therefore, if image data is encoded again using the analog signal Van1 by the encoding apparatus 2130 and recorded on the recording medium, the image data has significant deterioration, so that it is impossible to copy the image data in a condition where its good image quality is maintained, thereby enabling illegal copy by use of the analog image signal to be well prevented.

It is to be noted that in the above third embodiment, the encoding section 2135 performs block encoding by use of DCT as orthogonal transformation. Orthogonal transformation is not limited to DCT; any other type of orthogonal transformation, for example, discrete sine transform (DST), wavelet transform, etc. may be used. Further, encoding is not limited to block encoding; any other type of encoding may be used. In short, the encoding processing only needs to increase deterioration of the encoded digital signal by utilizing an influence of analog distortion on the digital signal.

Further, block encoding is not limited to that using orthogonal transformation; any other type of block encoding may be used. For example, adaptive dynamic range coding (ADRC) type of block encoding may be employed.

Figure 35:
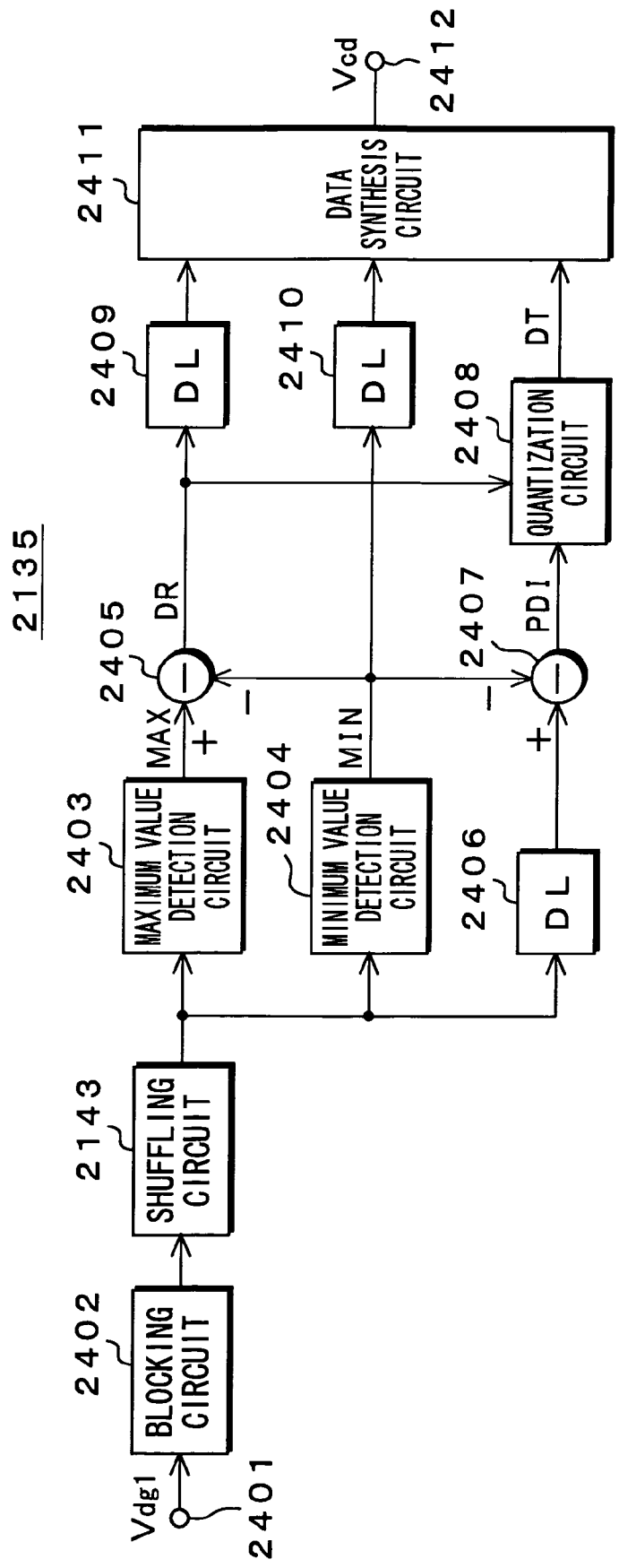
FIG. 35 is a block diagram for showing another configuration of the encoding section.

In this case, the encoding section 2135 is configured as shown in FIG. 35.

A digital image signal Vdg1 received at a receiving terminal 2401 is supplied to a blocking circuit 2402. This blocking circuit 2402 divides the image signal Vdg1 on the effective screen into blocks, each of which has a size of, for example, 4×4 pixels.

Pixel data of each of the blocks obtained by the blocking circuit 2402 is supplied to a shuffling circuit 2143. The shuffling circuit 2143 shuffles the pixel data of each block obtained by the blocking circuit 2402, to reconfigure the blocks (see FIG. 31).

The pixel data of each block obtained by the shuffling circuit 2143 is also supplied to a maximum value detection circuit 2403 and a minimum value detection circuit 2404. The maximum value detection circuit 2403 detects, for each block, a maximum value MAX of the pixel data in the block. The minimum value detection circuit 2404 detects, for each block, a minimum value MIN of the pixel data in the block. The maximum value MAX and the minimum value MIN detected by the detection circuits 2403 and 2404 respectively are supplied to a subtracter 2405. This subtracter 2405 computes a dynamic range DR=MAX-MIN.

Further, the pixel data of each block obtained by the shuffling circuit 2143 is time-adjusted by a delay circuit 2406 and then supplied to a subtracter 2407. This subtracter 2407 is also supplied with the minimum value MIN detected by the minimum value detection circuit 2404. This subtracter 2407 subtracts, for each block, from pixel data in a block the minimum value MIN of this block to obtain minimum value-removed data PDI.

The minimum value-removed data PDI of each block obtained by the subtracter 2407 is supplied to a quantization circuit 2408. This quantization circuit 2408 is supplied with a dynamic range DR obtained by the subtracter 2405. This quantization circuit 2408 quantizes the minimum value-removed data PDI by using a quantization step determined in accordance with the dynamic range DR. That is, if the number of quantization bits is n, the quantization circuit 2408 sets level ranges obtained by equally dividing a dynamic range DR between a maximum value MAX and a minimum value MIN by $2^n$ so that an n-bit code signal may be assigned in accordance with which one of the level ranges the minimum value-removed data PDI belongs to.

Figure 36:
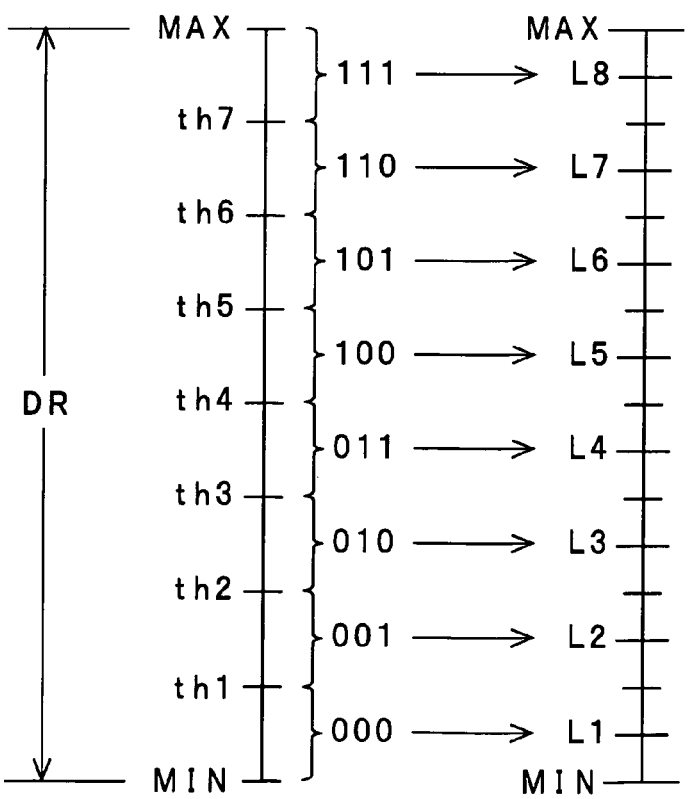
FIG. 36 is an explanatory illustration of ADRC quantization and inverse quantization.

FIG. 36 shows a case where the number of quantization bits is 3, in which a dynamic range DR between a maximum value MAX and a minimum value MIN is divided into eight equal level ranges and three-bit code signals (000) through (111) are assigned in accordance with which one of the level ranges the minimum value-removed data PDI belongs to. In FIG. 36, th1 through th7 are each a threshold value that indicates a boundary between the level ranges.

Referring back to FIG. 35, a code signal DT obtained by the quantization circuit 2408 is supplied to a data synthesis circuit 2411. This data synthesis circuit 2411 is supplied with a dynamic range DR obtained by the subtracter 2405 after it is time-adjusted by the delay circuit 2409 and also with a minimum value MIN detected by the minimum value detection circuit 2404 after it is time-adjusted by a delay circuit 2410. This data synthesis circuit 2411, for each block, synthesizes a minimum value MIN, a dynamic range DR, and a code signal DT having a length as much as the number of pixels in the block, to generate block data. The block data of each block generated by this data synthesis circuit 2411 is sequentially output to an output terminal 2412 as encoded digital image signal Vcd.

Figure 37:
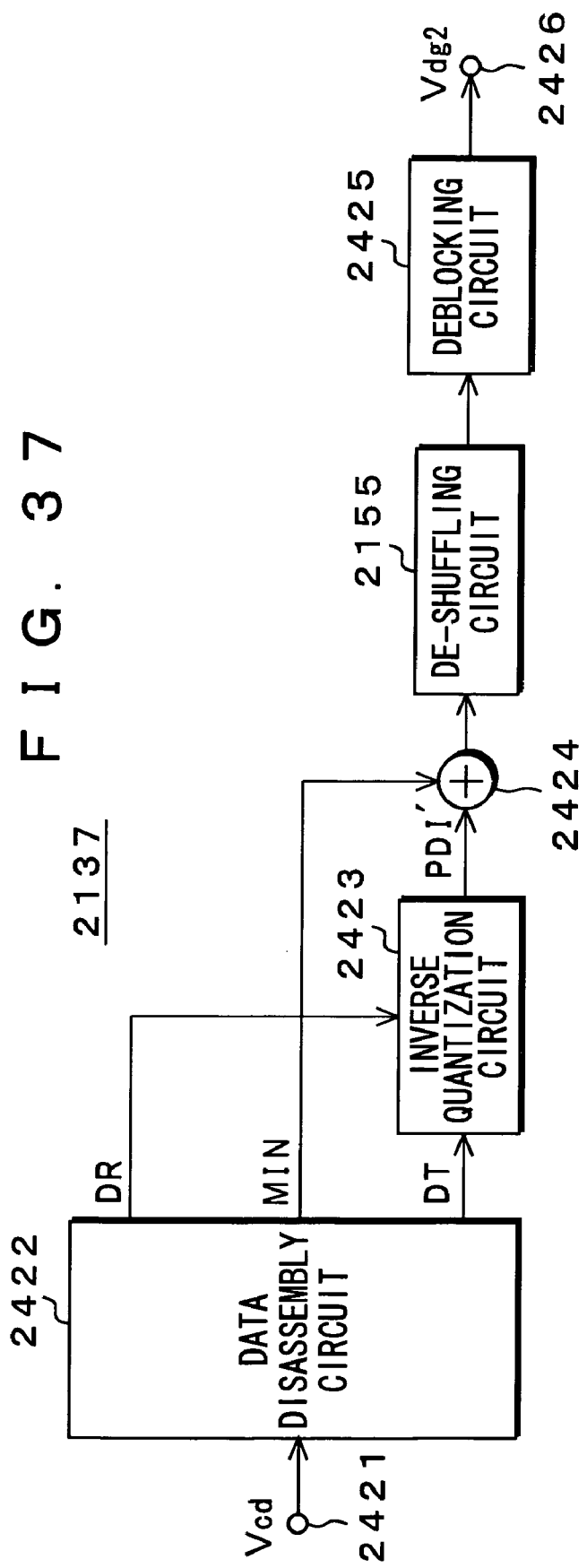
FIG. 37 is a block diagram for showing another configuration of the decoding section.

Further, the decoding section 2137 is configured as shown in FIG. 37.

The encoded digital image signal Vcd received at a receiving terminal 2421 is supplied to a data disassembly circuit 2422 where it is disassembled into a minimum value MIN, a dynamic range DR, and a code signal DT for each block.

The code signal DT of each block output from the data disassembly circuit 2422 is supplied to an inverse quantization circuit 2423. This inverse quantization circuit 2423 is also supplied with the dynamic range DR output from the data disassembly circuit 2422. The inverse quantization circuit 2423 performs inverse quantization on the code signal DT of each block based on the dynamic range DR of the corresponding block, to obtain minimum value-removed data PDI'.

In this case, as shown in FIG. 36, the dynamic range DR is equally divided by the number of quantization bits, so that mid-values L1 to L8 of the ranges are utilized as decoded values (minimum value-removed data PDI') of the code signals DT.

The minimum value-removed data PDI' of each block obtained by the inverse quantization circuit 2423 is supplied to an adder 2424. This adder 2424 is also supplied with the minimum value MIN output from the data disassembly circuit 2422. The adder 2424 adds the minimum value MIN to the minimum value-removed data PDI', to obtain pixel data of each block.

The pixel data of each block obtained by this adder 2424 is supplied to the de-shuffling circuit 2155. This de-shuffling circuit 2155 brings back the pixel data of the 16 blocks BL1 to BL16 to the corresponding positions of the 16 blocks BL (see FIG. 31).

The pixel data of each block BL obtained by this de-shuffling circuit 2155 is supplied to a deblocking circuit 2425. The deblocking circuit 2425 brings back the data order to its raster scan order. Thus, decoded digital image signal Vdg2 is obtained from the deblocking circuit 2425. This image signal Vdg2 is output to an output terminal 2426.

Figure 38A:
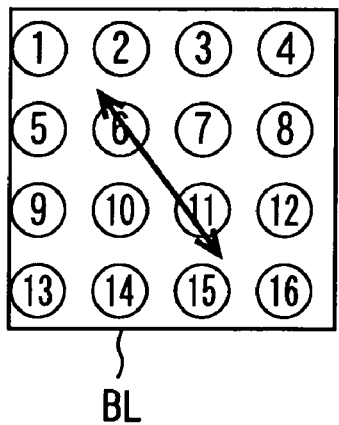
FIGS. 38A and 38B are explanatory illustrations of other examples of the shuffling patterns.
Figure 38B:
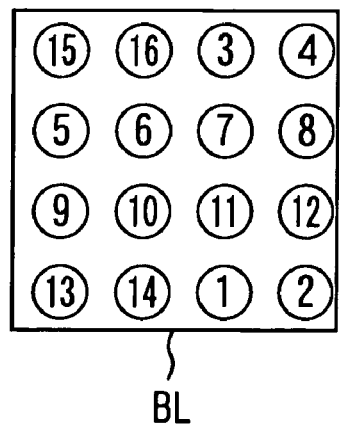

Although the above third embodiment has given an example of a shuffling pattern which is used in a macro block MB comprised of 16 blocks BL as shown in FIG. 31, the shuffling pattern is not limited to it. In short, the shuffling pattern only needs to be such that a correlation may be reduced between items of pixel data of adjacent positions contained in each block. For example, as shown in FIGS. 38A and 38B, pixel data positions may be reshuffled in the block BL. In FIGS. 38A and 38B, "o" indicates pixel data that constitutes a block, and FIG. 38A shows a condition before reshuffling and FIG. 38B shows a condition after reshuffling. This is just one example; the number of items of pixel data or suite thereof to be reshuffled and the reshuffle positions are not limited to them.

Although the above third embodiment has handled an image signal, the present invention can be applied similarly to an embodiment for handling an audio signal. In the case of handling an audio signal, a display section that serves as display means comes in a speaker that serves as audio output means.

According to the present invention, such encoding processing is performed that deterioration in an encoded digital signal is promoted utilizing an influence of analog distortion on the digital signal; therefore, in the second or later encoding and decoding, a decoded digital signal is deteriorated significantly, so that illegal copy can be well prevented which utilizes an analog signal obtained by decoding the encoded digital signal and performing digital-to-analog conversion on it.

Further, according to the present invention, which involves block encoding, blocking is performed, being accompanied by shuffling of such a predetermined pattern as to reduce a correlation between items of data of adjacent positions in a block, so that it is possible to amplify deterioration in the decoded digital signal in the second or later encoding and decoding.

The following will describe a fourth embodiment of the present invention. FIG. 39 shows a configuration of an image display system 3000 according to the fourth embodiment.

This image display system 3000 has a reproducer 3110 for outputting an analog image data Van1 and a display 3120 for displaying an image due to the analog image data Van1 output from this reproducer 3110.

In the reproducer 3110, an encoded image data reproduced from a recording medium, not shown, such as an optical disc is decoded by a decoding section 3111 and a digital image data Vdg0 obtained as a result of this decoding is converted into analog data by a D/A converter 3112, to provide an analog image data Van1. It is to be noted that the display 3120 may be, for example, a CRT display or an LCD.

This image display system 3000 further has an encoding apparatus 3130 for performing encoding processing again by utilizing the analog image data Van1 to encode the image data and recording this encoded image data on the recording medium such as an optical disc.

This encoding apparatus 3130 has an A/D converter 3134 for converting the analog image data Van1 output from the reproducer 3110 into digital data and an encoding section 3135 for encoding the digital image data Vdg1 output from this A/D converter 3134. This encoding section 3135 performs almost the same encoding as that for encoded image data obtained by being reproduced in the above-described reproducer 3110 from the recording medium such as an optical disc.

Figure 40:
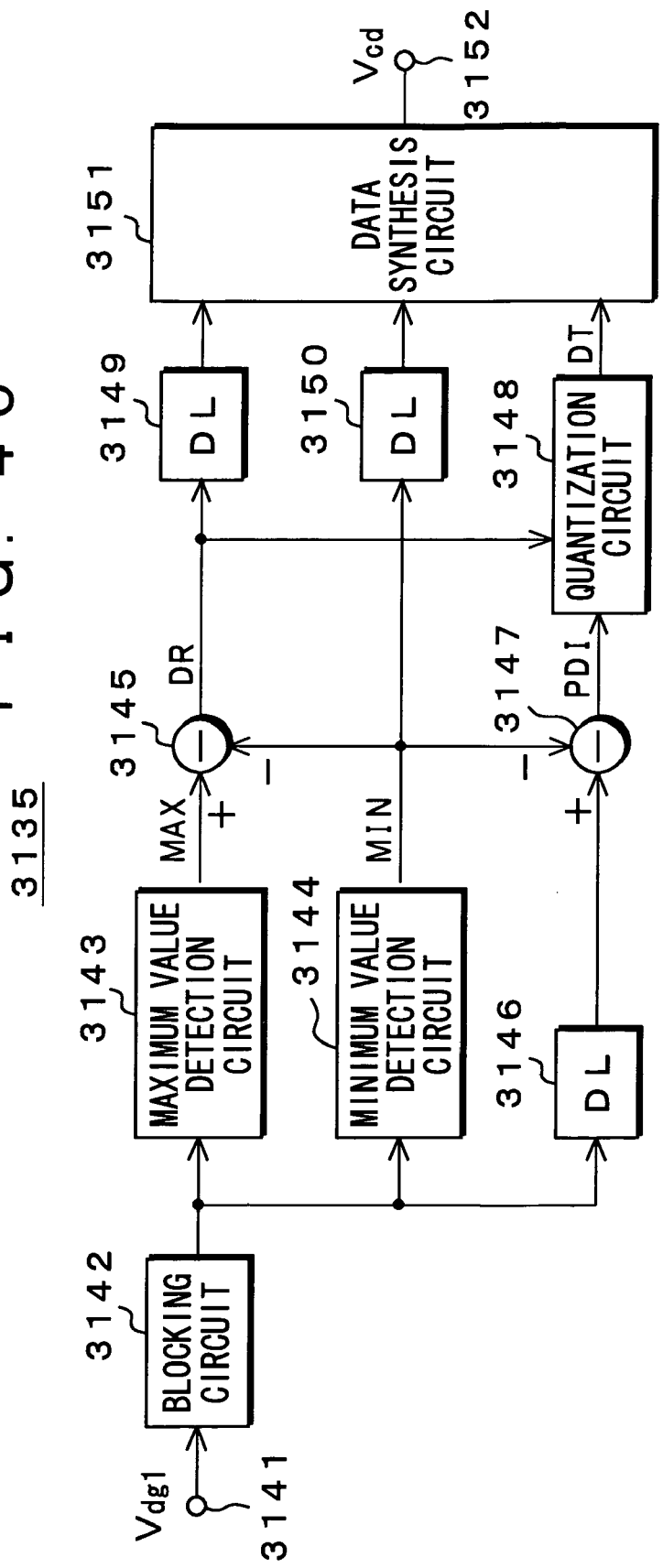
FIG. 40 is a block diagram for showing a configuration of an encoding (ADRC) section.

FIG. 40 shows a configuration of then encoding section 3135.

Figure 41:
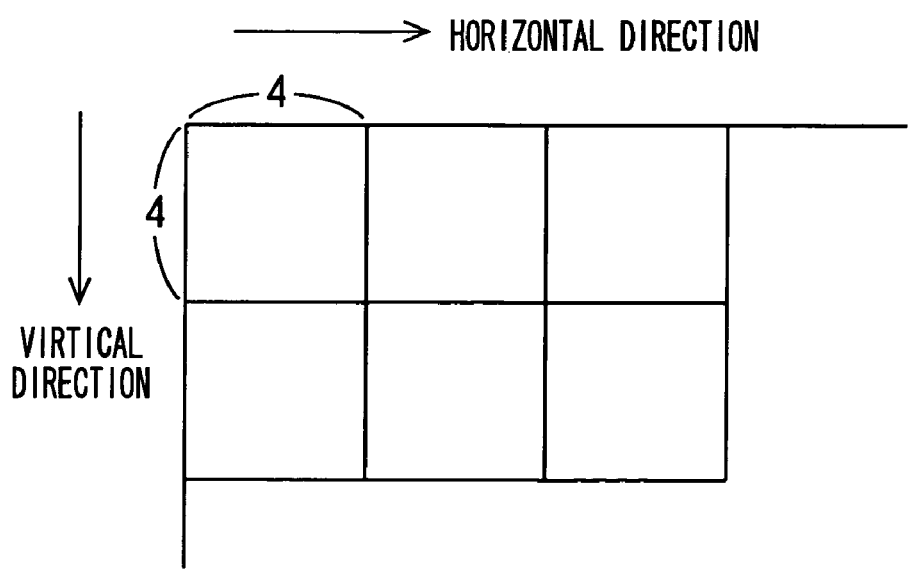
FIG. 41 is an explanatory illustration of ADRC blocking.

This encoding section 3135 has a receiving terminal 3141 for receiving digital image data Vdg1 and a blocking circuit 3142 for dividing the image data Vdg1 received at this receiving terminal 3141 into blocks (ADRC blocks). The blocking circuit 3142 divides the image data Vdg1 on an effective screen into blocks, each of which has a size of, for example, 4×4 pixels as shown in FIG. 41. This blocking circuit 3142 constitutes extraction means for extracting image data from a predetermined range of the digital image data Vdg1.

The encoding section 3135 further has a maximum value detection circuit 3143 for detecting a maximum value MAX of image data (which is comprised of 4×4 pixel data pieces) of each block output from the blocking circuit 3142 and a minimum value detection circuit 3144 for detecting a minimum value MIN from the image data of each block.

The encoding section 3135 further has a subtracter 3145 for subtracting the minimum value MIN detected by the minimum value detection circuit 3144 from the maximum value MAX detected by the maximum value detection circuit 3143 to obtain a dynamic range DR and another subtracter 3147 for subtracting from image data of each block output from the blocking circuit 3142 the minimum value MIN of the corresponding block detected by the minimum value detection circuit 3144 to obtain minimum value-removed data PDI. It is to be noted that the image data of each block is supplied to the subtracter 3147 via a delay circuit 3146 for time adjustment.

The encoding section 3135 further has a quantization circuit 3148 for quantizing the minimum value-removed data PDI obtained by the subtracter 3147 by using a quantization step determined in accordance with the dynamic range DR. In this case, the number of quantization bits is either fixed or changed in accordance with the dynamic range DR. In a case where the number of quantization bits is changed in accordance with the dynamic range DR, that number is set larger as the dynamic range DR increases. Changing the number of quantization bits in accordance with the dynamic range DR allows effective encoding to be realized.

For example, when pixel data can take on a value of 0 to 255 and if $0 \leq DR \leq 4$, the number of quantization bits is set to 0; if $5 \leq DR \leq 13$, the number of quantization bits is set to 1; if $14 \leq DR \leq 35$, the number of quantization bits is set to 2; if $36 \leq DR \leq 103$, the number of quantization bits is set to 3; and $104 \leq DR \leq 255$, the number of quantization bits is set to 4.

If the number of quantization bits is set to n, the quantization circuit 3148 divides a dynamic range DR between the maximum value MAX and the minimum value MIN into $2^n$ number of regions (level ranges) so that an n-bit code signal may be assigned in accordance with which one of the level ranges the minimum value-removed data PDI belongs to. In this case, a quantization step (width of the range) in at least one of the regions on the sides of the maximum value MAX and the minimum value MIN is set larger than the other quantization steps.

In the present embodiment, quantization steps in both regions on the sides of the maximum value MAX and the minimum value MIN are set larger than the other quantization steps. That is, in this case, assuming a quantization step in both regions of the sides of the maximum value MAX and the minimum value MIN to be QSP and the number of the quantization bits to be n, this quantization step QSP is set in such a manner so that $QSP > DR/2^n$ may be satisfied. Further, by equally dividing a range other than the regions of the thus set maximum value MAX and minimum value MIN by $(2^n-2)$, the remaining regions are set.

Figure 42:
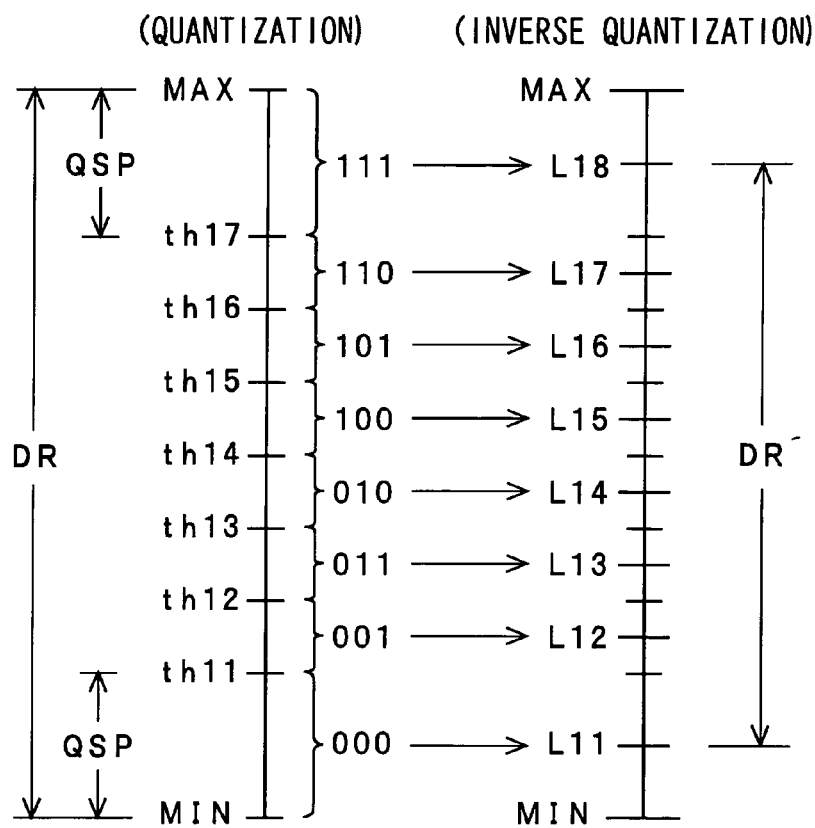
FIG. 42 is an explanatory illustration of ADRC quantization and inverse quantization.

FIG. 42 shows a case where the number of quantization bits is 3, in which the dynamic range DR between the maximum value MAX and the minimum value MIN is divided into eight regions. In this case, each of the quantization steps QSP in the regions on both sides of the maximum value MAX and the minimum value MIN is set so as to satisfy $QSP > DR/8$. Further, a range other than the regions thus set on both sides of the maximum value MAX and minimum value MIN is equally divided by 6, thereby setting the remaining regions. In this case, three-bit code signals (000) through (111) are assigned in accordance with which one of the regions the minimum value-removed data PDI belongs to. In the figure, th11 through th17 each indicates a threshold value that indicates a boundary between the regions.

Referring back to FIG. 40, the encoding section 3135 further has a data synthesis circuit 3151 for generating, for each block, block data by synthesizing the code signal DT obtained by the quantization circuit 3148, the dynamic range DR obtained by the subtracter 3145, and the minimum value MIN detected by the minimum value detection circuit 3144 and an output terminal 3152 for sequentially outputting, as encoded image data Vcd, block data of each of the blocks generated by this data synthesis circuit 3151. It is to be noted that the dynamic range DR and the minimum value MIN are supplied to the data synthesis circuit 3151 via time-adjustment delay circuits 3149 and 3150 respectively.

The following will describe operations of the encoding section 3135 shown in FIG. 40. At the receiving terminal 3141, digital image data Vdg1 is received. This image data Vdg1 is supplied to the blocking circuit 3142. This blocking circuit 3142 divides the image data Vdg1 on the effective screen into blocks, each of which has a size of, for example, 4×4 pixels.

The image data blocked by the blocking circuit 3142 is supplied to the maximum value detection circuit 3143 and the minimum value detection circuit 3144. The maximum value detection circuit 3143 detects a maximum value MAX of the image data for each block. The minimum value detection circuit 3144 detects a minimum value MIN of the image data for each block.

The maximum value MAX detected by the maximum value detection circuit 3143 and the minimum value MIN detected by the minimum value detection circuit 3144 are supplied to the subtracter 3145. This subtracter 3145 computes a dynamic range DR=MAX−MIN.

Further, image data of each of the blocks output from the blocking circuit 3142 is time-adjusted by the delay circuit 3146 and then supplied to the subtracter 3147. This subtracter 3147 is also supplied with the minimum value MIN detected by the minimum value detection circuit 3144. This subtracter 3147 subtracts from image data of each block the minimum value MIN of this block to provide minimum value-removed data PDI.

The minimum value-removed data PDI of each block obtained by the subtracter 3147 is supplied to the quantization circuit 3148. This quantization circuit 3148 is supplied with the dynamic range DR obtained by the subtracter 3145. The quantization circuit 3148 quantizes the minimum value-removed data PDI by using a quantization step determined in accordance with the dynamic range DR. In this case, as described above, quantization is performed in a condition where the quantization step in the region on at least one of the sides of the maximum value MAX and the minimum value MIN is set larger than those of other regions.

A code signal DT obtained by the quantization circuit 3148 is supplied to the data synthesis circuit 1351. This data synthesis circuit 3151 is supplied with the dynamic range DR obtained by the subtracter 3145 after being time-adjusted by the delay circuit 3149 as well as the minimum value MIN detected by the minimum value detection circuit 3144 after being time-adjusted by the delay circuit 3150. For each of the blocks, this data synthesis circuit 3151 synthesizes the minimum value MIN, the dynamic range DR, and the code signal DT as much as the number of pixels in the block, to generate block data. The block data of each block generated by this data synthesis circuit 3151 is sequentially output to the output terminal 3152 as encoded image data Vcd.

Referring back to FIG. 39, the encoding apparatus 3130 further has a recording section 3136 for recording the encoded image data Vcd output from the encoding section 3135 on the recording medium such as an optical disc. In this case, the recording section 3136 performs copy in accordance with the analog image data Van1.

The encoding apparatus 3130 further has a decoding section 3137 for decoding the encoded image data Vcd output from the encoding section 3135, a D/A converter 3138 for converting digital image data Vdg2 obtained by decoding by this decoding section 3137 into analog data, and a display 3139 for displaying an image due to the analog image data Van2 output from this D/A converter 3138. The display 3139 may be, for example, a CRT display or an LCD.

Figure 43:
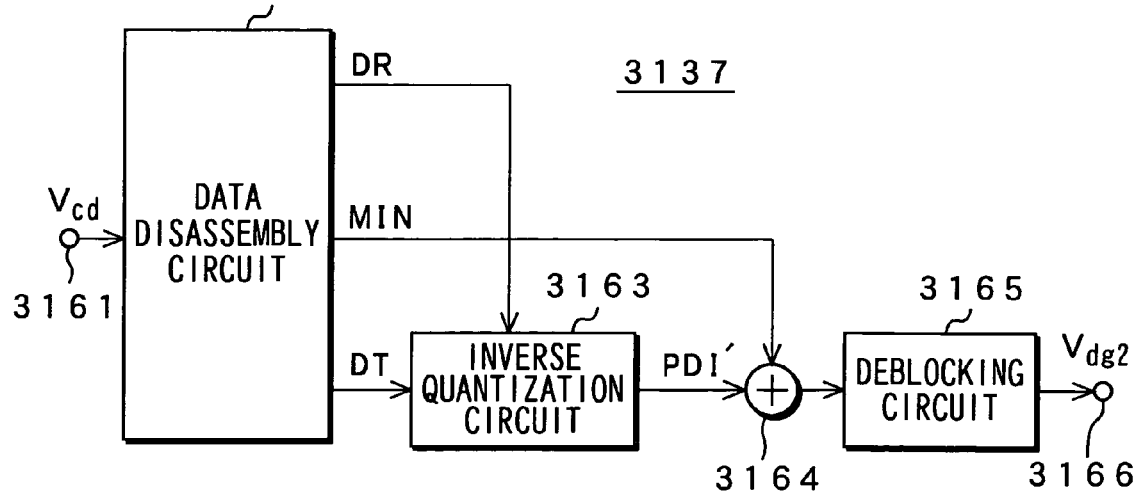
FIG. 43 is a block diagram for showing a configuration of a decoding (ADRC) section.

FIG. 43 shows a configuration of the decoding section 3137.

This decoding section 3137 has a receiving terminal 3161 for receiving encoded image data Vcd and a data disassembly circuit 3162 for disassembling, for each block, the image data Vcd (block data) received at this receiving terminal 3161 into a minimum value MIN, a dynamic range DR, and a code signal DT.

The decoding section 3137 further has an inverse quantization circuit 3163 for performing inverse quantization on the code signal DT output from the data disassembly circuit 3162 based on the dynamic range DR to obtain minimum value-removed data PDI'. As shown in FIG. 42, in this inverse quantization circuit 3163, as in the case of the above-described quantization circuit 3148 in the encoding section 3135, if the number of quantization bits is n, a dynamic range DR is divided into $2^n$ number of regions (level ranges), so that mid-values L11 to L18 of the regions are utilized as decoded values (minimum value-removed data PDI') of the code signals DT. In this case also, a quantization step (width of the range) in both regions on the sides of the maximum value MAX and the minimum value MIN is set larger than those of the other quantization steps.

The decoding section 3137 further has an adder 3164 for obtaining image data by adding the minimum value MIN to the minimum value-removed data PDI' of each block obtained by the inverse quantization circuit 3163, a deblocking circuit 3165 for obtaining decoded image data Vdg2 by bringing back the image data of each block obtained by this adder 3164 to its pre-blocking position, and an output terminal 3166 for outputting the image data Vdg2 output from this deblocking circuit 3165. The deblocking circuit 3165 brings back the data order to its raster scan order.

The following will describe operations of the decoding section 3137 shown in FIG. 43. Encoded image data Vcd is received at the receiving terminal 3161. This image data Vcd is supplied to the data disassembly circuit 3162 where it is disassembled into a minimum value MIN, a dynamic range DR, and a code signal DT of each block.

The code signal DT of each block output from the data disassembly circuit 3162 is supplied to the inverse quantization circuit 3163. This inverse quantization circuit 3163 is also supplied with the dynamic range DR output from the data disassembly circuit 3162. The inverse quantization circuit 3163 performs inverse quantization on the code signal DT of each block based on the dynamic range DR of the corresponding block, to obtain the minimum value-removed data PDI'.

The minimum value-removed data PDI' of each block obtained by the inverse quantization circuit 3163 is supplied to the adder 3164. This adder 3164 is supplied with also the minimum value MIN output from the data disassembly circuit 3162. The adder 3164 adds the minimum value MIN to the minimum value-removed data PDI' to obtain image data.

The image data of each block obtained by this adder 3164 is supplied to the deblocking circuit 3165. This deblocking circuit 3165 brings back the data order to its raster scan order. Thus, decoded image data Vdg2 is obtained from the deblocking circuit 3165 and output to the output terminal 3166.

The following will describe operations of the encoding apparatus 3130.

Analog image data Van1 output from the reproducer 3110 is supplied to the A/D converter 3134 where it is converted into digital data. Digital image data Vdg1 output from this A/D converter 3134 is supplied to the encoding section 3135. This encoding section 3135 encodes the image data Vdg1 to obtain encoded image data Vcd. This encoding section 3135 performs encoding by use of ADRC as described above, in which case, quantization is performed in a condition where a quantization step in a region on at least one of the sides of the maximum value MAX and the minimum value MIN is set larger than those of other regions.

The encoded image data Vcd output from this encoding section 3135 is supplied to the recording section 3136. The recording section 3136 records this image data Vcd on the recording medium such as an optical disc, to perform copy in accordance with the analog image data Van1. In a case where the image data Vcd thus recorded on the recording medium is decoded by almost the same decoding section as the decoding section 3137 shown in FIG. 43, a dynamic range in each block is greatly decreased because the quantization step in the region on at least one of the sides of the maximum value MAX and the minimum value MIN is set larger than those of other regions as described above.

That is, as shown in FIG. 42, a dynamic range DR' obtained after inverse quantization in decoding becomes significantly smaller than the dynamic range obtained before quantization in encoding. Therefore, an image quality of an image due to the image data Vcd when it is reproduced from this recording medium is significantly deteriorated as compared with that of an image due to the analog image signal Van1 output from the reproducer 3110. It is thus disabled in this encoding apparatus 3130 to copy data in a condition where its good quality is maintained.

Further, the encoded image data Vcd output from the encoding section 3135 is supplied to the decoding section 3137 where it is decoded. Digital image data Vdg2 obtained by decoding by this decoding section 3137 is converted by the D/A converter 3138 into analog image data Van2. The analog image data Van2 output from the D/A converter 3138 is supplied to the display 3139. On the display 3139, an image due to the image data Van2 is displayed.

In this case, the display 3139 is used for a user to monitor the image due to the encoded image data Vcd. If the data is decoded by the decoding section 3137, the dynamic range in each block is greatly decreased because the quantization step in the region on at least one of the sides of the maximum value MAX and the minimum value MIN is set larger than those of other regions as described above. An image quality of the image displayed on the display 3139 is significantly deteriorated as compared with that of an image (which is displayed on the display 3120) due to the analog image signal Van1 output from the reproducer 3110.

Further, in the case of the image display system 3000 shown in FIG. 39, the analog image data Van1 output from the reproducer 3110 is not processed at all in order to cause the encoding apparatus 3130 to disable copying this image data in a condition where its good image quality is maintained, so that an image quality of an image due to this analog image data Van1 is not deteriorated.

It is to be noted that if encoded image data reproduced from the recording medium in the reproducer 3110 has been encoded by an encoding section made up in the same manner as the encoding section 3135 and the decoding section 3111 in the reproducer 3110 is made up the same manner as the decoding section 3137, the dynamic range in each block is decreased as in the case of the above-described relationship between the encoding section 3135 and the decoding section 3137, so that the image quality of the image due to the analog image data Van1 is deteriorated as compared with that of an image due to the original image data before being encoded.

However, if the image data is encoded by the encoding section 3135 in the encoding apparatus 3130 and then decoded, the dynamic range of each block is much more decreased, so that an image due to the image data after being decoded is significantly deteriorated as described above.

Figure 44:
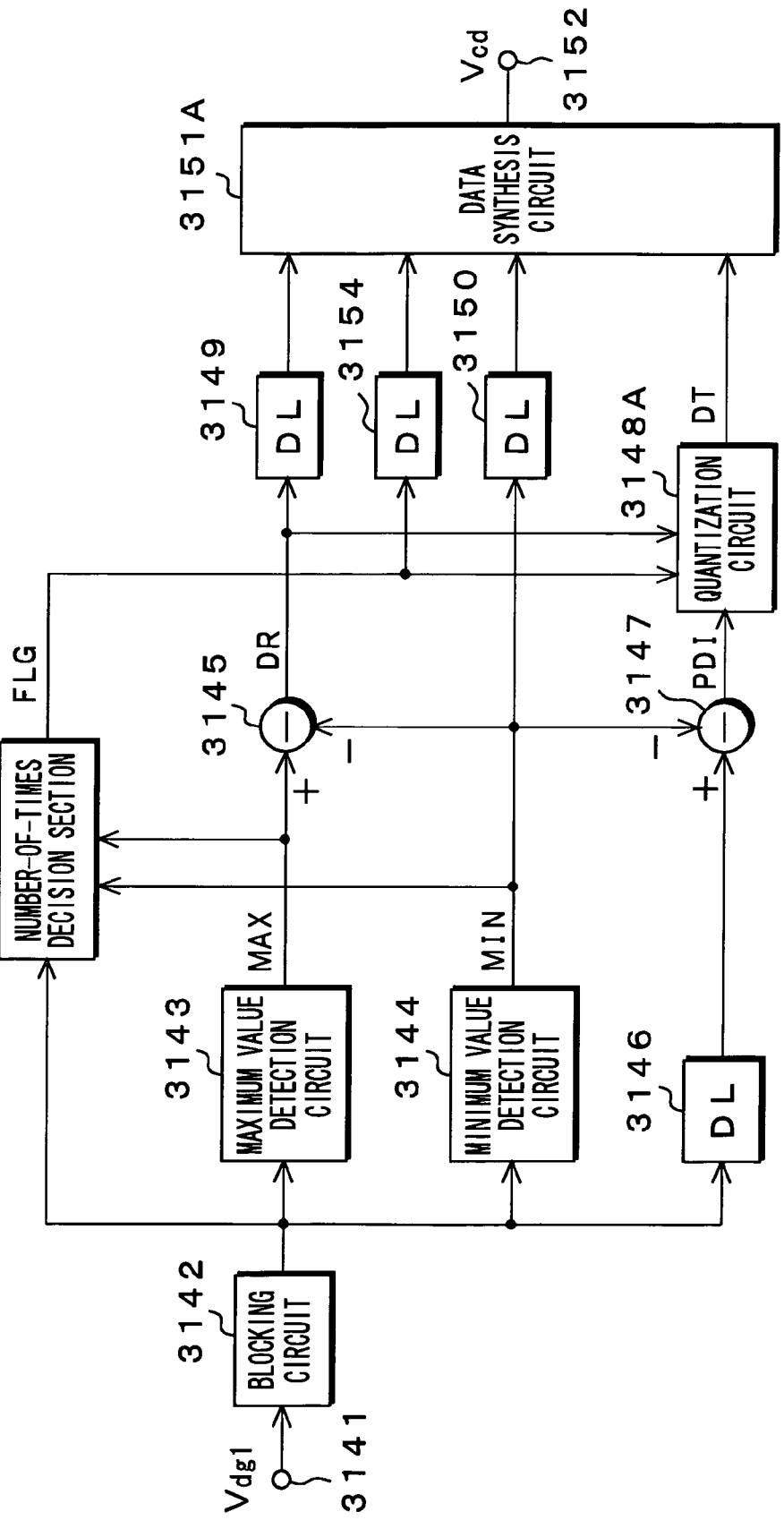
FIG. 44 is a block diagram for showing another configuration of the encoding (ADRC) section.

Referring to FIG. 44, the following will describe an encoding section 3135A having another configuration. In this FIG. 44, components that correspond to those of FIG. 40 are indicated by the same symbols and their detailed description will be omitted.

This encoding section 3135A has a number-of-times decision section 3153. This number-of-times decision section 3153 is supplied with image data, which is blocked by the blocking circuit 3142. This number-of-times decision section 3153 is also supplied with a maximum value MAX detected by the maximum value detection circuit 3143 and a minimum value MIN detected by the minimum value detection circuit 3144.

For each block, the number-of-times decision section 3153 detects, based on image data (which is comprised of 4×4 items of pixel data) supplied from the blocking circuit 3142, number of times Nmax of the maximum value side, which indicates the number of items of the pixel data contained in a predetermined range on the side of a maximum value MAX, for example, a 10% range (MAX-DCR/10 through MAX), and number of times Nmin of the minimum value side, which indicates the number of items of data contained in a predetermined range on the side of a minimum value MIN, for example, a 10% range (MIN through MIN+DR/10).

Figure 45:
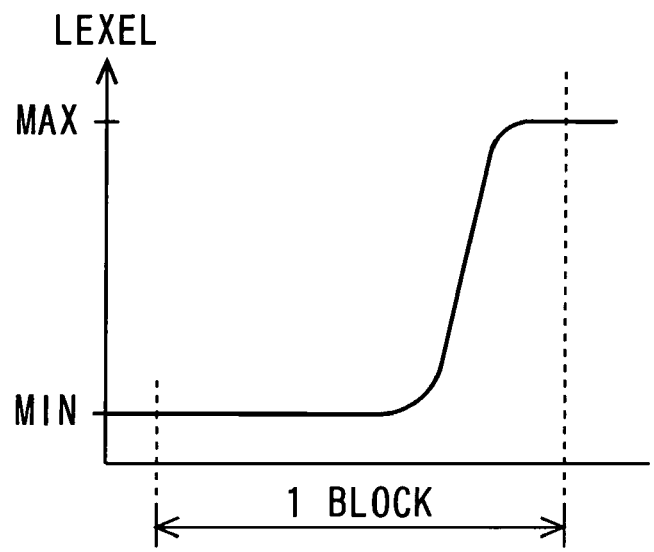
FIG. 45 is a diagram for showing one example of image data.
Figure 46:
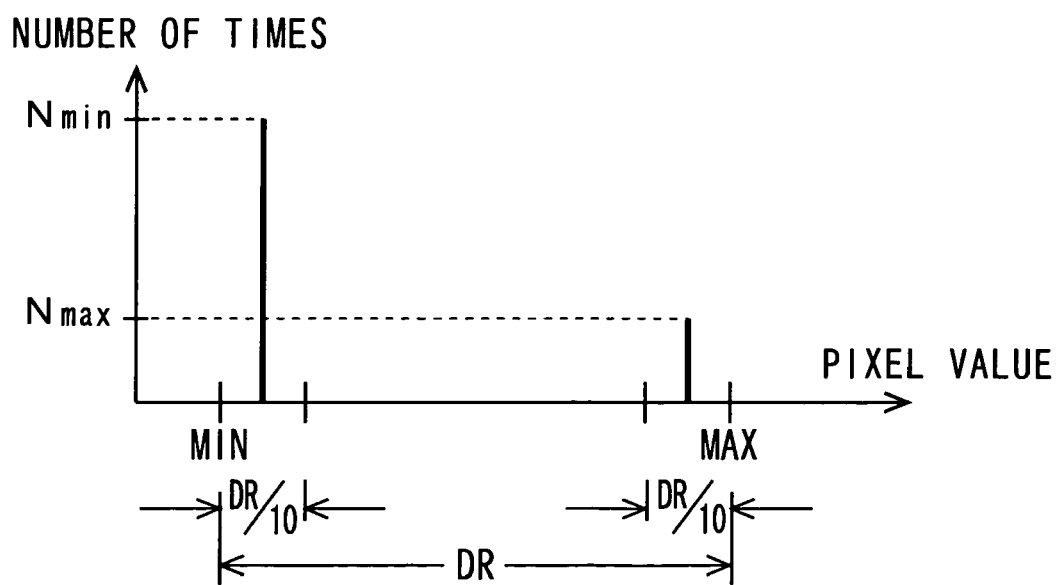
FIG. 46 is an explanatory illustration of number-of-times decision processing.

For example, FIG. 45 shows an example of image data of one block. This figure shows the case of a one-dimensional block in which pixel data is arranged only in one direction to facilitate understanding. In the case of this one-block image data, the number of times Nmax and Nmin are such as shown in FIG. 46, that is, in a relationship of Nmin>Nmax.

Further, the number-of-times decision section 3153 generates a decision flag FLG, which is set to "0" if Nmax>Nmin and to "1" if Nmax<Nmin oppositely, based on the numbers of times Nmax and Nmin detected as described above. It is to be noted that if Nmax=Nmin, the number-of-times decision flag FLG is set to either "0" or "1".

Figure 47:
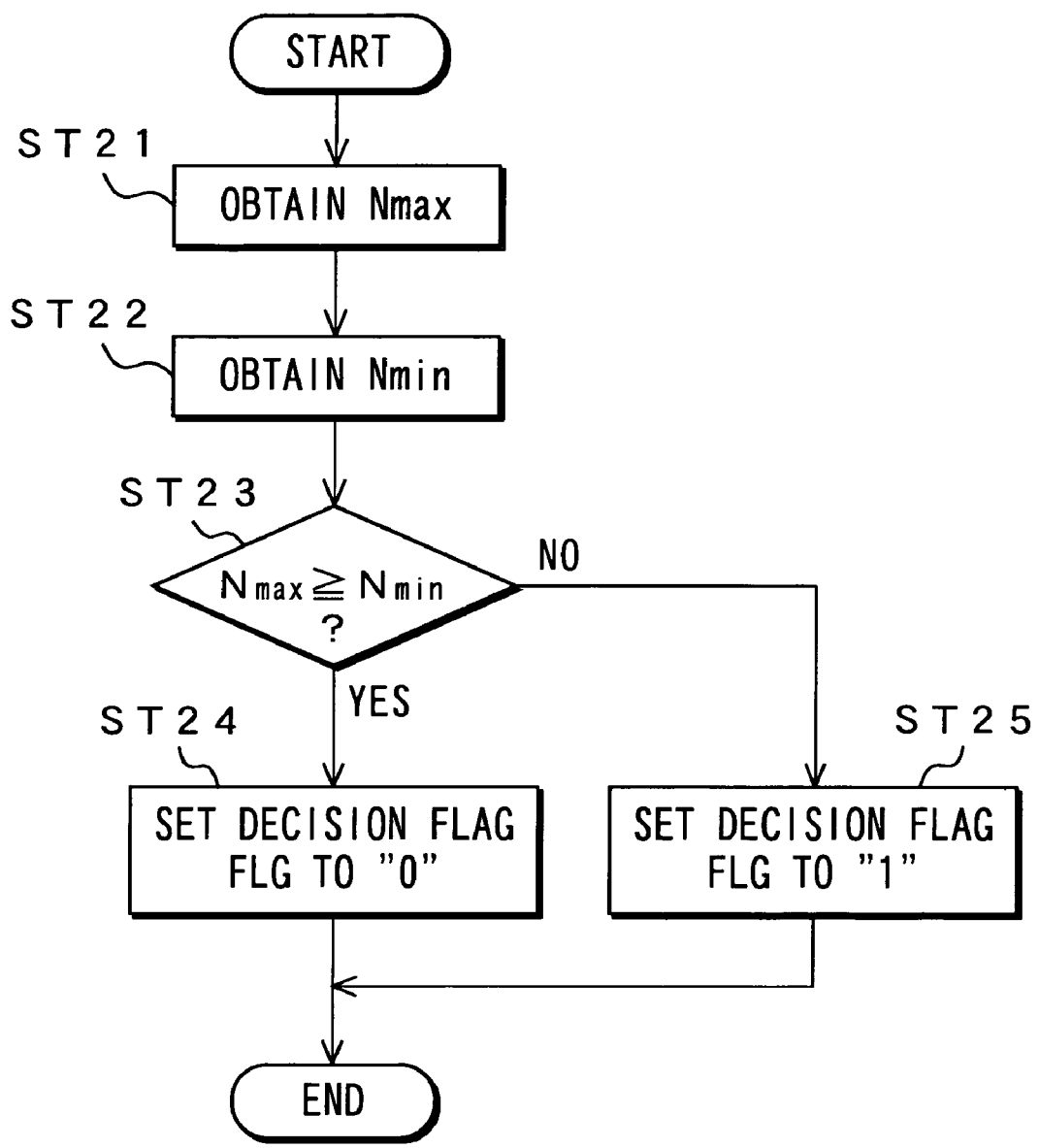
FIG. 47 is a flowchart for showing the number-of-times decision processing.

A flowchart of FIG. 47 shows one example of number-of-times processing performed by the above-described number-of-times decision section 3153.

First, at step ST21, the process obtains the number of times Nmax of the maximum value side, which is the number of items of the pixel data contained in a predetermined range on the side of the maximum value MAX (MAX-DR/10 through MAX), and at step T22, it obtains the number of times Nmin of minimum value side, which is the number of items of the data contained in a predetermined range on the side of the minimum value MIN (MIN through MIN+DR/10). At step ST23, the process decides whether Nmax≧Nmin. If Nmax≧Nmin, the process goes to step ST24 where the decision flag FLG is set to "0" and, if not Nmax≧Nmin, the process goes to step ST25 where the decision flag is set to "1".

Referring back to FIG. 44, the decision flag FLG generated by this number-of-times decision section 3153 is supplied to a quantization circuit 3148A. This quantization circuit 3148A is, as in the case of the quantization circuit 3148 in the encoding section 3135 shown in FIG. 40, also supplied with minimum value-removed data PDI of each block obtained by the subtracter 3147 and a dynamic range DR of each block obtained by the subtracter 3145.

The quantization circuit 3148A quantizes, for each block, the minimum value-removed data PDI by using a quantization step determined in accordance with the dynamic range DR. In this case, if the decision flag FLG is set to "0", quantization is performed in a condition where a quantization step in a region on the side of the minimum value MIN is made larger than those of other regions. If the decision flag FLG is set to "1", on the other hand, quantization is performed in a condition where a quantization step in a region on the side of the maximum value MAX is made larger than those of other regions.

Figure 48:
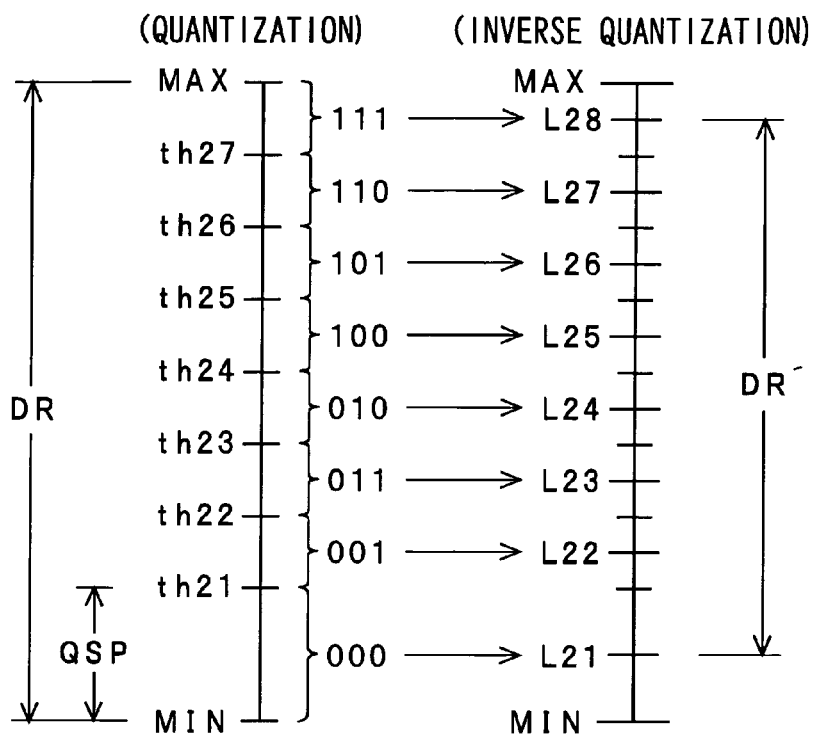
FIG. 48 is an explanatory illustration of ADRC quantization and inverse quantization.

FIG. 48 shows a case where the decision flag FLG is set to "0" and the number of quantization bits is 3, in which a dynamic range DR between a maximum value MAX and a minimum value MIN is divided into eight regions. In this case, quantization step QSP in the region on the side of the minimum value MIN is set so as to satisfy a relationship of QSP>DR/8.

Further, a range other than the set region on the side of the thus set minimum value MIN is equally divided by 7, thereby setting the remaining regions. In this case, three-bit code signals (000) through (111) are assigned thereto in accordance with which one of the regions the minimum value-removed data PDI belongs to. In the figure, th21 through th27 each indicates a threshold value that indicates a boundary between the regions.

It is to be noted that although not shown, in a case where the decision flag FLG is set to "1" and the number of quantization bits is 3, a quantization step QSP in a region on the side of the maximum value MAX is set so as to satisfy a relationship of QSP>DR/8 and a remaining range other than this region on the side of the minimum value MIN is equally divided by seven, to set the remaining regions.

The decision flag FLG generated by the number-of-times decision section 3153 is supplied to a data synthesis circuit 3151A via a delay circuit 3154 for adjustment of time. As in the case of the data synthesis circuit 3151 in the encoding section 3135 shown in FIG. 40, this data synthesis circuit 3151A is supplied with a code signal DT obtained by the quantization circuit 3148A and a dynamic range DR obtained by the subtracter 3145 after being time-adjusted by the delay circuit 3149 as well as a minimum value MIN detected by the minimum value detection circuit 3144 after being time-adjusted by the delay circuit 3150.

For each block, the data synthesis circuit 3151A synthesizes a decision flag FIG, a minimum value MIN, a dynamic range DR, and a code signal DT as much as the number of pixels in the block, to generate block data. This block data of each block generated by this data synthesis circuit 3151 is sequentially output to the output terminal 3152 as encoded image data Vcd. The other components and operations are the same as those of the encoding section 3135 shown in FIG. 40.

Figure 49:
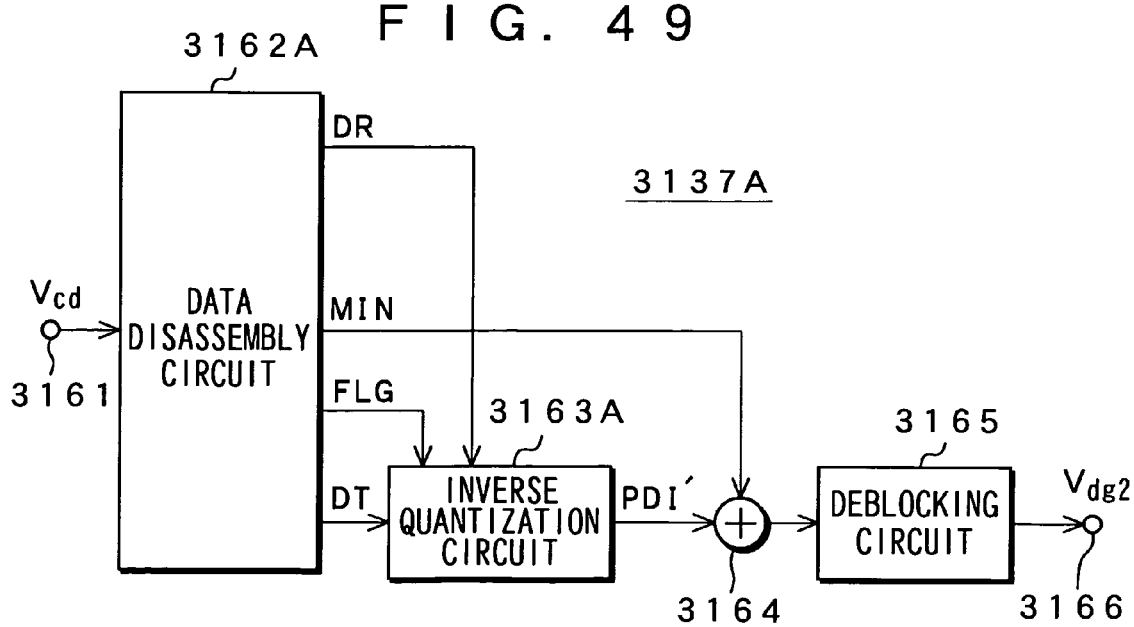
FIG. 49 is a block diagram for showing another configuration of the decoding (ADRC) section.

FIG. 49 shows a configuration of the decoding section 3137A, which is a counterpart of the encoding section 3135A shown in FIG. 44. In this FIG. 49, components that correspond to those of FIG. 43 are indicated by the same symbols and their detailed explanation will be omitted.

Encoded image data Vcd is received at the receiving terminal 3161. This image data Vcd is supplied to a data disassembly circuit 3162A where it is disassembled into a decision flag FLG, a minimum value MIN, a dynamic range DR, and a code signal DT for each block. The code signal DT of each block output from the data disassembly circuit 3162A is supplied to an inverse quantization circuit 3163A.

This inverse quantization circuit 3163A is also supplied with the dynamic range DR and the decision flag FLG output from the data disassembly circuit 3162A. The inverse quantization circuit 3163A performs inverse quantization on the code signal DT of each block based on the dynamic range DR of the corresponding block, to obtain minimum value-removed data PDI'.

As shown in FIG. 48, in this inverse quantization circuit 3163A, as in the case of the above-described quantization circuit 3148A in the encoding section 3135A, if the number of quantization bits is n, a dynamic range DR is divided into $2^n$ number of regions (level ranges), so that mid-values L21 to L28 of the regions are utilized as decoded values (minimum value-removed data PDI') of the code signals DT. In this case also, a quantization step (width of the range) in a region on the side of the maximum value MAX or the minimum value MIN is set larger than the other quantization steps. It is to be noted that in the case of FIG. 48, as described above, the decision flag FLG is set to "0" and the quantization step (width of region) in the region on the side of the minimum value MIN is set larger than the other quantization steps.

The minimum value-removed data PDI' of each block obtained by the inverse quantization circuit 3163A is supplied to the adder 3164. This adder 3164 adds the minimum value MIN output from the data disassembly circuit 3162 to it to obtain image data. The other components and operations are the same as those of the decoding section 3137 shown in FIG. 43.

In the quantization circuit 3148A in the encoding section 3135A shown in FIG. 44, if number of times Nmin of the minimum value side is smaller than the number of times Nmax of the maximum value side, the quantization is performed in a condition where a quantization step in a region on the side of the minimum value MIN is made larger than those of other regions as well as if the number of times Nmax of the maximum value side is smaller than the number of times Nmin of the minimum value side, the quantization is performed in a condition where a quantization step in a region on the side of the maximum value MAX is made larger than those of other regions.

Therefore, the dynamic range decreases significantly as image data undergoes encoding and decoding; however, in the first encoding and decoding, even if the dynamic range decreases greatly, a small number of items of data changing greatly in value is present, so that a quality thereof deteriorates less as a whole. In the second or later encoding and decoding, on the other hand, as the dynamic range decreases, a number of items of data changing in value is increased, thus resulting in more deterioration.

It is to be noted that if encoded image data reproduced from the recording medium in the reproducer 3110 has been encoded by an encoding section made up in the same manner as the encoding section 3135A and the decoding section 3111 in the reproducer 3110 is made up in the same manner as the decoding section 3137A, the dynamic range is decreased greatly as image data undergoes this encoding and decoding; however, in the first encoding and decoding, even if the dynamic range greatly decreases, a small number of items of data changing in value is present, so that a quality thereof deteriorates less as a whole. That is, an image quality of an image due to the analog image data Van1 output from the reproducer 3110 does not deteriorate so much.

However, if this image data Van1 is once encoded by the encoding section 3135A and recorded on the recording medium and then reproduced from it and decoded by the decoding section 3137A, this is the second encoding and decoding, so that as the dynamic range decreases, a number of items of data changing in value is increased, thus resulting in more deterioration. This disables the image data to be copied in a condition where its good quality is maintained without deteriorating a quality of an output due to the data before being copied.

Although in the above fourth embodiment, the encoding apparatus 3130 has the recording section 3136 and the display 3139, either one or both of these may be mounted externally to the encoding apparatus 3130.

Although the above fourth embodiment has handled image data as data, the present invention can be applied similarly to an embodiment for handling audio data. In the case of handling audio data, a display section that serves as display means comes in a speaker that serves as audio output means.

Although in the above fourth embodiment, the encoding section 3135 in the encoding apparatus 3130 has generated, for each block, block data using, as an added signal, the dynamic range DR and the minimum value MIN as well as an in-block code signal DT, it is of course possible to use, as the added signal, a minimum value MIN and a maximum value MAX or a dynamic range DR and a maximum value MAX. In short, it is necessary only to obtain information of the dynamic range DR and the minimum value MIN in decoding.

According to a apparatus for encoding data etc. related to the present invention, in ADRC-type encoding, quantization is performed in a condition where a quantization step in a region on at least one of the sides of a maximum value and a minimum value is made larger than those of other regions, so that a dynamic range of a block decreases significantly as data undergoes encoding and decoding, thereby disabling the data to be copied in a condition where its good quality of maintained without deteriorating a quality of an output owing to the data before being copied.

Figure 50:
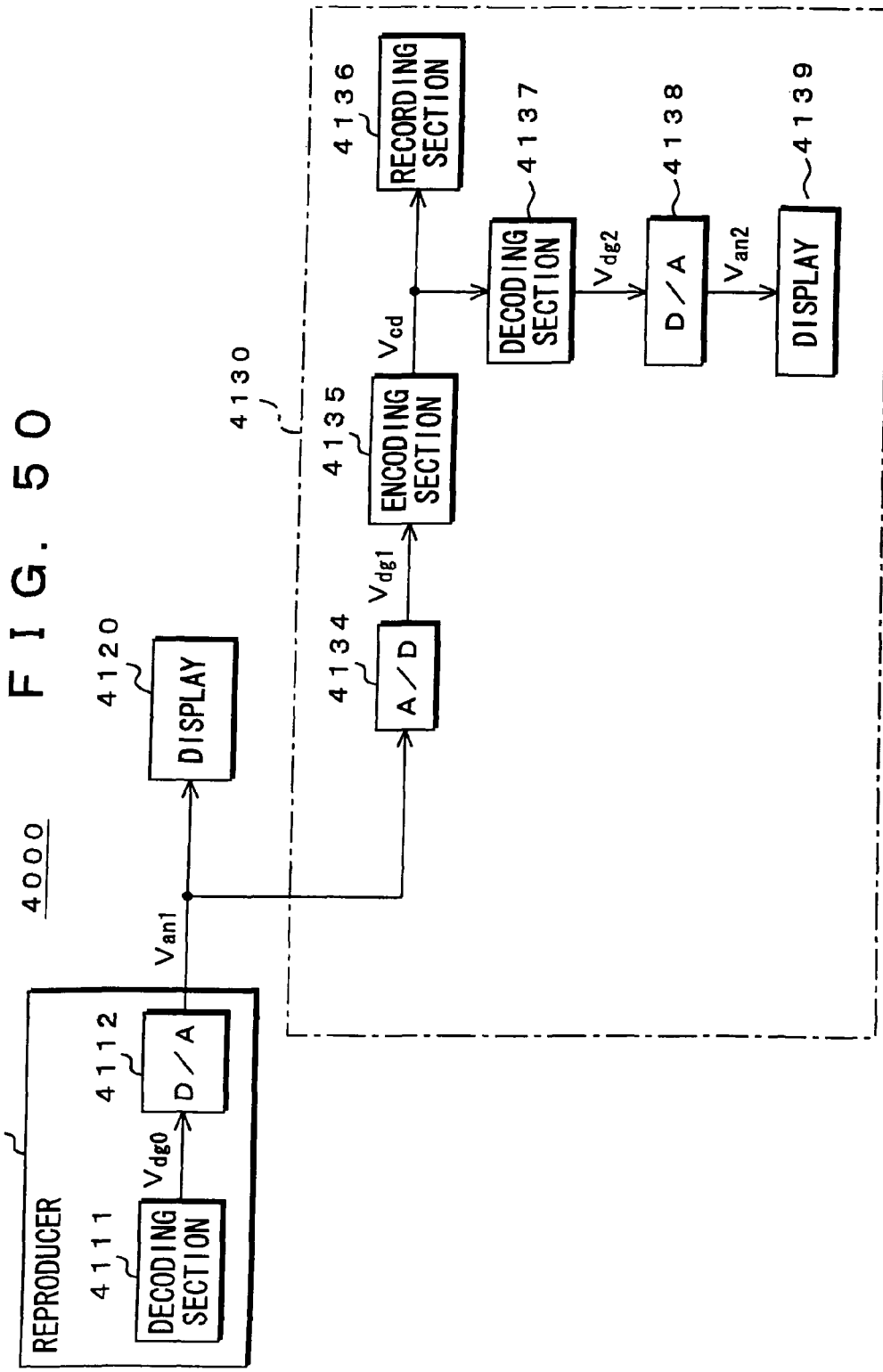
FIG. 50 is a block diagram for showing a configuration of an image display system according to a fifth embodiment of the present invention.

The following will describe a fifth embodiment of the present invention. FIG. 50 shows a configuration of an image display system 4000 according to the embodiment.

This image display system 4000 has a reproducer 4110 for outputting analog image data Van1 and a display 4120 for displaying an image due to the image data Van1 output from this reproducer 4110.

In the reproducer 4110, encoded image data reproduced from a recording medium, not shown, such as an optical disc is decoded by a decoding section 4111, and the decoded digital image data Vdg0 thus obtained is in turn converted by a D/A converter 4112 into analog data, so that analog image data Van1 is provided. It is to be noted that the display 4120 may be, for example, a CRT display or an LCD.

This image display system 4000 further has an encoding apparatus 4130 for performing encoding again by utilizing the analog image data Van1 and recording encoded image data on the recording medium such as an optical disc.

This encoding apparatus 4130 has an A/D converter 4134 for converting the analog image data Van1 output from the reproducer 4110 into digital data and an encoding section 4135 for encoding digital image data Vdg1 output from this A/D converter 4134. This encoding section 4135 performs the same encoding as that for encoded image data obtained by being reproduced from the recording medium such as an optical disc in the above-described reproducer 4110.

Figure 51:
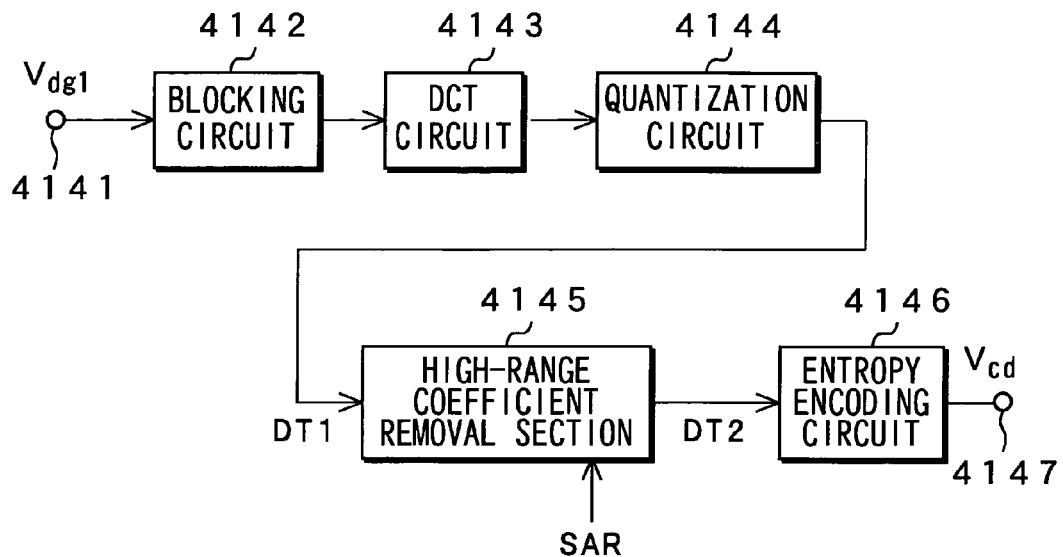
FIG. 51 is a block diagram for showing a configuration of an encoding section.
Figure 52:
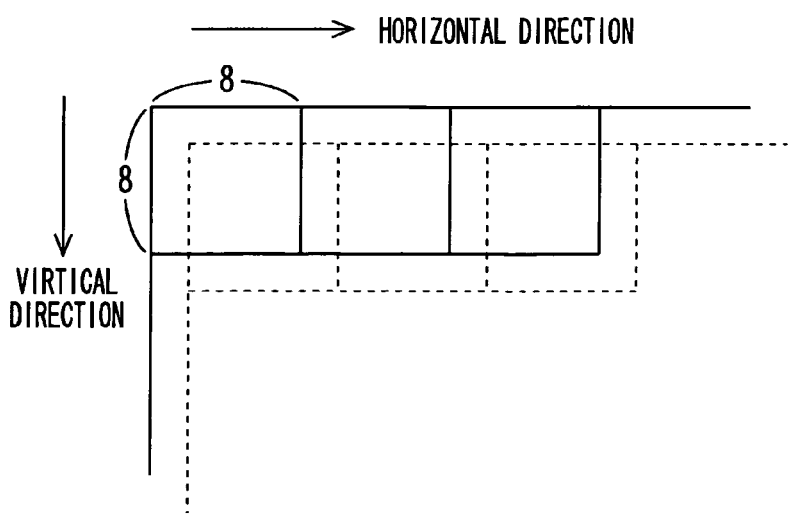
FIG. 52 is an explanatory illustration of DCT blocking.

FIG. 51 shows a configuration of the encoding section 4135. This encoding section 4135 has a receiving terminal 4141 for receiving digital image data Vdg1 and a blocking circuit 4142 for dividing the image data Vdg1 received at the receiving terminal 4141 into blocks (DCT blocks). The blocking circuit 4142 divides the image data Vdg1 on an effective screen into two-dimensional blocks, each of which has a size of, for example, 8×8 pixels as indicated by a solid line in FIG. 52.

The encoding section 4135 further has a DCT circuit 4143 for performing, for each block, DCT as orthogonal transformation on image data blocked by the blocking circuit 4142 to calculate coefficient data as a conversion coefficient and a quantization circuit 4144 for performing quantization on the coefficient data of each block supplied from this DCT circuit 4143 by using a quantization table, not shown.

The encoding section 4135 further has a high-range coefficient removal section 4145 for removing coefficient data in a high-range frequency domain of a predetermined block from coefficient data DT1 of each block quantized by the quantization circuit 4144. In this case, blocks whose high-range frequency domain coefficient data is to be removed are selected alternately in at least one of, for example, horizontal and vertical directions. Further, in this case, a range of the high-range frequency domain whose coefficient data is to be removed can be varied.

Figure 53:
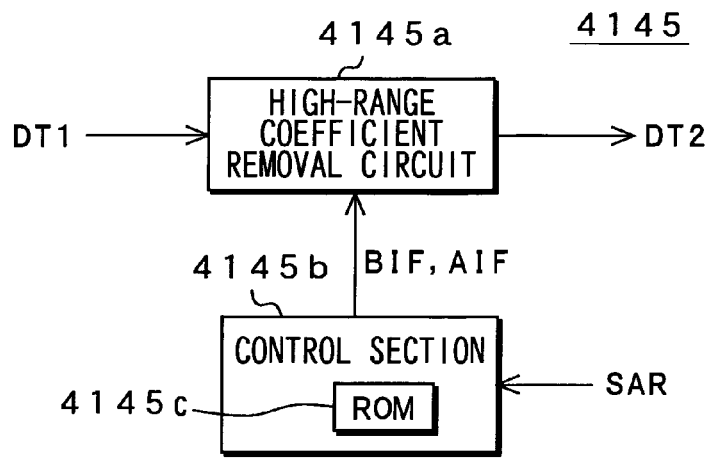
FIG. 53 is a block diagram for showing a configuration of a high-range coefficient removal section.

FIG. 53 shows a specific configuration of the high-range coefficient removal section 4145. This high-range coefficient removal section 4145 has a high-range coefficient removal circuit 4145a and a control section 4145b. Coefficient data DT1 of each block supplied from the quantization circuit 4144 is supplied to the high-range coefficient removal circuit 4145a.

The control section 4145b has a built-in ROM 4145c in which information is stored of blocks whose high-range frequency domain coefficient data is to be removed. The control section 4145b generates, based on the block information stored in the ROM 4145c, block information BIF indicative of blocks whose high-range frequency coefficient data is to be removed and supplies this block information BIF to the high-range coefficient removal circuit 4145a.

The control section 4145b is also supplied externally with a setting signal SAR for setting a range of a high-range frequency domain whose coefficient data is to be removed. In this case, by changing the setting signal SAR, the range of the high-range frequency domain whose coefficient data is to be removed is varied. The control section 4145b generates, in accordance with the setting signal SAR, range information AIF indicative of a range of a high-range frequency domain whose coefficient data is to be removed and supplies this range information AIF to the high-range coefficient removal circuit 4145a.

The high-range coefficient removal circuit 4145a removes a high-range coefficient from coefficient data DT1 of each block from the quantization circuit 4144 on a block (predetermined block) indicated by the block information BIF, to provide output coefficient data DT2 as a result of this removal processing. In this case, such coefficient data is removed as to be in the range of the high-range frequency domain indicated by the range information AIF. In this case, it is to be noted that the range information AIF is added to the coefficient data DT2 of this block. This is done so in order to enable to be identified a range of a high-range frequency domain in which coefficient data is to be interpolated in the later-described decoding processing.

Further, the high-range coefficient removal circuit 4145a does not perform high-range coefficient removal processing on blocks (those other than the predetermined block) not indicated by the block information BIF of the coefficient data DT1 of each block from the quantization circuit 4144, to provide it as it is as output coefficient data DT2. The coefficient data DT2 of each block thus output from the high-range coefficient removal circuit 4145a provides an output of the high-range coefficient removal section 4145.

Referring back to FIG. 51, the encoding section 4135 has an entropy encoding circuit 4146 that serves as variable-length encoding means for performing entropy encoding, for example, Huffman encoding on the coefficient data of each block from the high-range coefficient removal section 4145 to obtain encoded image data Vcd and an output terminal 4147 for outputting the encoded image data Vcd obtained by this entropy encoding circuit 4146.

The following will describe operations of the encoding section 4135 shown in FIG. 51. The receiving terminal 4141 is supplied with digital image data Vdg1. This image data Vdg1 is supplied to the blocking circuit 4142. This blocking circuit 4142 divides the image data Vdg1 on the effective screen into two-dimensional blocks, each of which has a size of, for example, 8×8 pixels.

The image data blocked by the blocking circuit 4142 is supplied to the DCT circuit 4143. This DCT circuit 4143 performs, for each block, DCT on the blocked image data to calculate coefficient data as a conversion coefficient. This coefficient data is supplied to the quantization circuit 4144.

The coefficient data of each block is quantized by the quantization circuit 4144 by using the quantization table, to sequentially provide quantized coefficient data of each block. This quantized coefficient data DT1 of each block is supplied to the high-range coefficient removal section 4145.

This high-range coefficient removal section 4145 performs high-range coefficient removal processing on a predetermined block (alternating blocks in at least one of, for example, horizontal and vertical directions) of the coefficient data DT1 of each block quantized by the quantization circuit 4144, to obtain output coefficient data DT2. In this case, a range of a high-range frequency domain whose coefficient data is to be removed is supposed to be in accordance with the setting signal SAR input from an outside. In this case, further, range information AIF is added to the coefficient data DT2 of this block.

Further, this high-range coefficient removal section 4145 does not perform high-range coefficient removal processing on the blocks other than the above-described predetermined block of the coefficient data DT1 of each block quantized by the quantization circuit 4144, to output it as it is as the output coefficient data DT2.

Figure 54:
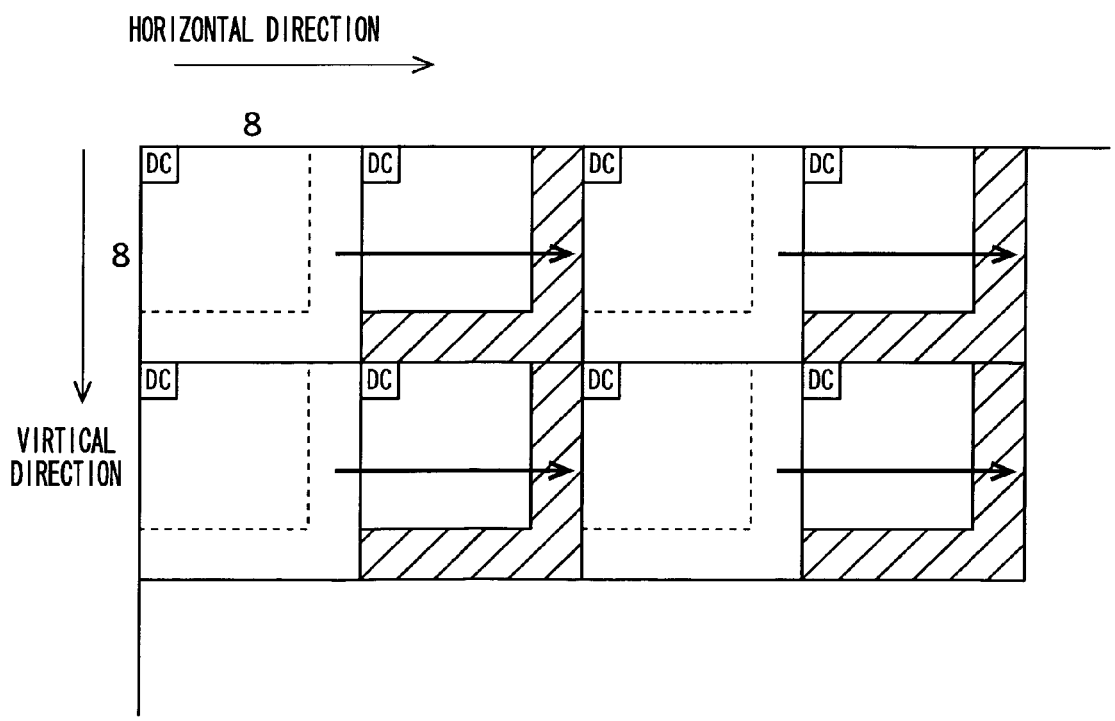
FIG. 54 is an explanatory illustration of one example of high-range coefficient removal and interpolation.

FIG. 54 shows a case where the predetermined blocks alternate horizontally, in which a hatched portion indicates a range removed high-range frequency domain. Further, "DC" indicates a DC coefficient of each block.

The coefficient data DT2 output from the high-range coefficient removal section 4145 is supplied to the entropy encoding circuit 4146. This encoding circuit 4146 performs, for example, Huffman encoding on quantized coefficient data of each block. Thus, encoded image data Vcd is obtained from the encoding circuit 4146 and output to the output terminal 4147.

Referring back to FIG. 50, the encoding apparatus 4130 further has a recording section 4136 for recording encoded image data Vcd output from the encoding section 4135, on the recording medium such as an optical disc. In this case, in the recording section 4136, copy is performed in accordance with the analog image data Van1.

The encoding apparatus 4130 further has a decoding section 4137 for decoding the encoded image data Vcd output from the encoding section 4135, a D/A converter 4138 for converting digital image data Vdg2 obtained by decoding by this decoding section 4137 into analog data, and a display 4139 for displaying an image due to analog image data Van2 output from this D/A converter 4138. The display 4139 may be, for example, a CRT display or an LCD.

Figure 55:
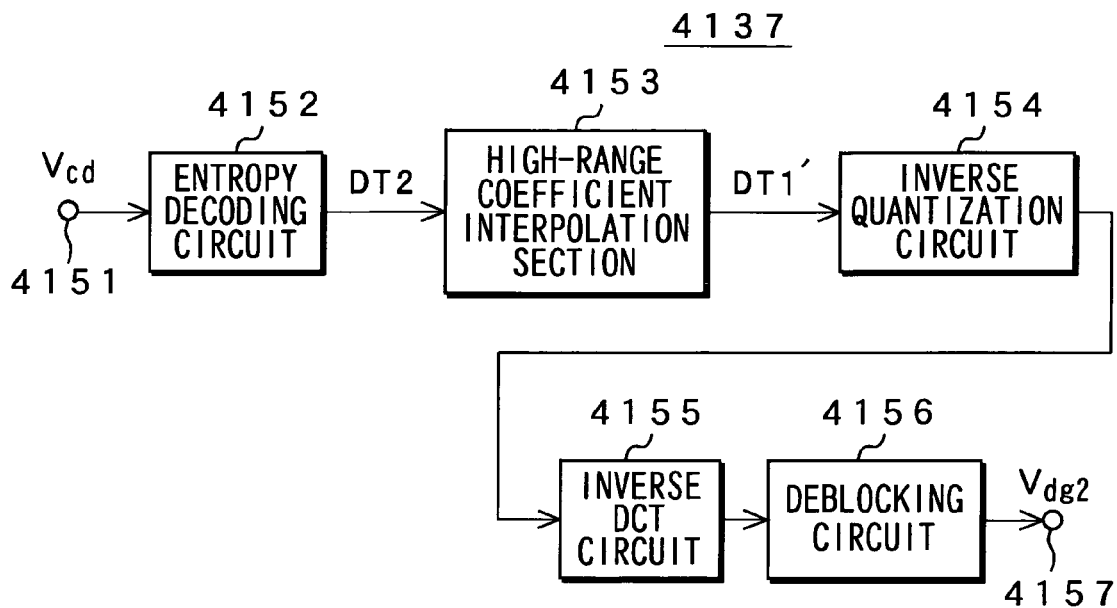
FIG. 55 is a block diagram for showing a configuration of a decoding section.

FIG. 55 shows a configuration of the decoding section 4137. This decoding section 4137 has a receiving terminal 4151 for receiving encoded image data Vcd and an entropy decoding circuit 4152 that serves as variable-length decoding means for decoding the image data Vcd (entropy encoded data, for example, Huffman-encoded data) received at this receiving terminal 4151.

The decoding section 4137 further has a high-range coefficient interpolation section 4153 for interpolating coefficient data in a high-range frequency domain on a block from which the coefficient data in this high-range frequency domain has been removed, as described above, in encoding from the quantized coefficient data DT2 of each block output from the decoding circuit 4152.

Figure 56:
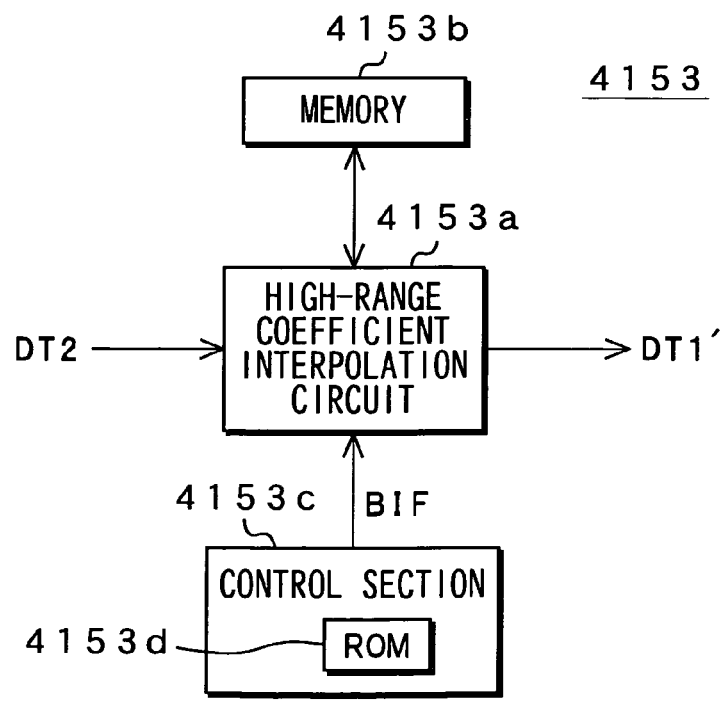
FIG. 56 is a block diagram for showing a configuration of a high-range coefficient interpolation section.

FIG. 56 shows a specific configuration of the high-range coefficient interpolation section 4153. This high-range coefficient interpolation section 4153 is comprised of a high-range coefficient interpolation circuit 4153*a*, a memory 4153*b*, and a control section 4153*c*. Quantized coefficient data DT2 of each block supplied from the entropy decoding circuit 4152 is supplied to the high-range coefficient interpolation circuit 4153*a*.

The control section 4153*c* has a built-in ROM 4153*d* in which information is stored of blocks whose high-range frequency domain coefficient data is removed. The block information stored in this ROM 4153*d* is the same as that stored in the ROM 4145*c* built in the above-described control section 4145*b* in the high-range coefficient removal section 4145. The control section 4153*c* generates block information BIF indicative of such blocks that coefficient data in a high-range frequency domain is removed, based on the block information stored in the ROM 4153*d*, and supplies this block information BIF to the high-range coefficient interpolation circuit 4153*a*.

The high-range coefficient interpolation circuit 4153*a* does not perform high-range coefficient interpolation processing on those blocks not indicated by the block information BIF of the quantized coefficient data DT2 of each block from the decoding circuit 4152, to output it as it is as the output coefficient data DT1'. In this case, the coefficient data DT2 of this block is stored in the memory 4153*b* so that it can be used in the later-described interpolation processing.

On those blocks indicated by the block information BIF of the quantized coefficient data DT2 of each block from the decoding circuit 4152, on the other hand, the high-range coefficient interpolation circuit 4153*a* performs high-range coefficient interpolation processing, to provide output coefficient data DT1'. In this case, the high-range coefficient interpolation circuit 4153*a* interpolates coefficient data in a high-range frequency domain indicated by the range information AIF added to the coefficient data DT2 of the block by using coefficient data of a high-range frequency domain of one or a plurality of blocks that is located in the vicinity of this block and is other than the block indicated by the block information BIF.

For example, in a case where coefficient data of a high-range frequency domain of a plurality of blocks is used, it is possible to use the data by simply averaging them or performing weighted averaging on the data by which a larger weight is assigned to coefficient data of such blocks as to be closer to this block. It is to be noted that the coefficient data of the high-range frequency domain of one or a plurality of blocks to be used in the interpolation processing in such a manner is stored beforehand in the memory 4153*b* as described above.

It is to be noted that when coefficient data of a high-range frequency domain of blocks to be received at the high-range coefficient interpolation section 4153 after this block is done so is used in order to interpolate the coefficient data of the high-range frequency domain of this block, this high-range coefficient interpolation section 4153 needs to perform time adjustment by use of a delay circuit. Coefficient data DT1' of each block thus output from the high-range coefficient interpolation circuit 4153*a* provides an output of the high-range coefficient interpolation section 4153.

Referring back to FIG. 55, the decoding section 4137 has an inverse quantization circuit 4154 for obtaining coefficient data by performing inverse quantization on the quantized coefficient data DT1' output from the high-range coefficient interpolation section 4153 and an inverse DCT circuit 4155 for obtaining image data by performing, for each block, inverse DCT on the coefficient data of each block obtained through inverse quantization by this inverse quantization circuit 4154.

The decoding section 4137 further has a deblocking circuit 4156 for bringing back the image data of each block obtained by the inverse DCT circuit 4155 to its pre-blocking position to obtain decoded image data Vdg2 and an output terminal 4157 for outputting the image data Vdg2 output from this deblocking circuit 4156. The deblocking circuit 4156 brings back the data order to its raster scan order.

The following will describe operations of the decoding section 4137 shown in FIG. 55. Encoded image data Vcd is received at the receiving terminal 4151. This image data Vcd is supplied to the entropy decoding circuit 4152. This image data Vcd is entropy-encoded data, for example, Huffman-encoded data. The decoding circuit 4152 decodes the image data Vcd, to obtain quantized coefficient data DT2 of each block. This quantized coefficient data of each block is supplied to the high-range coefficient interpolation section 4153.

This high-range coefficient interpolation section 4153 does not perform the high-range coefficient interpolation processing on blocks other than a predetermined block, that is, such a block (high-range coefficient-removed block) that high-range frequency domain coefficient data is removed of the quantized coefficient data DT2 of each block from the decoding circuit 4152, to output it as it is as the output coefficient data DT1'. Further, the coefficient data DT2 of this block is supplied to the memory 4153b so that it may serve as coefficient data for interpolation processing.

On a high-range coefficient-removed block of the quantized coefficient data DT2 of each block from the decoding circuit 4152, on the other hand, this high-range coefficient interpolation section 4153 performs the high-range coefficient interpolation processing, to obtain output coefficient data DT1'. In this case, the high-range coefficient interpolation circuit 4153a interpolates the coefficient data in a high-range frequency domain indicated by the range information AIF added to the coefficient data DT2 of this block by using coefficient data (which is stored in the memory 4153b) of a high-range frequency domain of one or a plurality of blocks that is located in the vicinity of this block and is other than the high-range coefficient-removed block.

For example, if the high-range coefficient-removed blocks alternate horizontally as shown in FIG. 54, the coefficient data of a high-range frequency domain of this high-range coefficient-removed block is interpolated by using, as it is, coefficient data of the high-range frequency domain of one adjacent block on the left side of this block as shown by an arrow.

The quantized coefficient data DT1' output from the high-range coefficient interpolation section 4153 is supplied to the inverse quantization circuit 4154. The inverse quantization circuit 4154 performs inverse quantization on the quantized coefficient data DT1' of each block, to obtain coefficient data of each block. This coefficient data of each block is supplied to the inverse DCT circuit 4155. The inverse DCT circuit 4155 performs, for each block, inverse DCT on the coefficient data of each block to obtain image data of each block.

The image data of each block thus obtained by the inverse DCT circuit 4155 is supplied to the deblocking circuit 4156. This deblocking circuit 4156 brings back the data order to its raster scan order. Thus, decoded image data Vdg2 is obtained from the deblocking circuit 4156 and output to the output terminal 4157.

The following will describe operations of the encoding apparatus 4130. Analog image data Van1 output from the reproducer 4110 is supplied to the A/D converter 4134 where it is converted into digital data. Digital image data Vdg1 output from this A/D converter 4134 is supplied to the encoding section 4135. This encoding section 4135 encodes the image data Vdg1 to obtain encoded image data Vcd. This encoding section 4135 performs encoding by use of DCT as orthogonal transformation as described above, in which case, coefficient data in a high-range frequency domain of a predetermined block is removed.

The encoded image data Vcd output from this encoding section 4135 is supplied to the recording section 4136. The recording section 4136 records this image data Vcd on the recording medium such as an optical disc, to perform copy in accordance with the analog image data Van1. In a case where the image data Vcd thus recorded on the recording medium is decoded by almost the same decoding section as the decoding section 4137 shown in FIG. 55, interpolation is performed on a block (high-range coefficient-removed block) whose coefficient data in the high-range frequency domain is removed by the encoding section 4135, by using coefficient data in a high-range frequency domain of blocks that are located in the vicinity of this block and is other than the high-range coefficient-removed block.

In this case, if the analog image data Van1 output from the reproducer 4110 has undergone the first encoding and decoding, image data obtained through encoding by the encoding section 4135 and the subsequent decoding as described above undergoes the second encoding and decoding.

In this case, since the encoded data is decoded using coefficient data of a high-range frequency domain free from deterioration in the block located nearby, an image quality is improved in the first encoding and decoding as compared with a case where the encoded data with no coefficient data of the high-range frequency domain is decoded as it is by using any other ordinary decoding apparatus, because its edge portion is improved.

However, in the second or later encoding and decoding, owing to fluctuations in sampling phase that occur in analog data-to-digital data conversion by the A/D converter 4134, a block position (see a broken-line position in FIG. 52) is shifted from that (see a solid-line position in FIG. 52) in the first encoding and decoding.

Therefore, the coefficient data of the high-range frequency domain in the above-described block located nearby is deteriorated in the first encoding and decoding, so that if the coefficient data of the high-range frequency domain in the high-range coefficient-removed block is interpolated using coefficient data of the high-range frequency domain in the block located nearby, image data encounters significant deterioration.

It is to be noted that if the analog image data Van1 output from the reproducer 4110 has undergone the second or later encoding and decoding, the image data obtained through encoding by the encoding section 4135 and the subsequent decoding as described above undergoes the third or later encoding and decoding and so is deteriorated further.

Therefore, an image quality of an image obtained by reproducing the image data Vcd recorded by the recording section 4136 on the recoding medium is greatly deteriorated as compared with that of an image due to the analog image signal Van1 output from the reproducer 4110. Therefore, this encoding apparatus 4130 disables an image to be copied in a condition where its good image quality is maintained.

Further, the encoded image data Vcd output from the encoding section 4135 is supplied to the decoding section 4137 where it is decoded. Digital image data Vdg2 obtained as decoded by this decoding section 4137 is converted into analog image data Van2 by the D/A converter 4138. The analog image data Van2 output from the D/A converter 4138 is supplied to the display 4139. On the display 4139, an image due to the image data Van2 is displayed.

In this case, if the analog image data Van1 output from the reproducer 4110 has undergone the first encoding and decoding, image data Van2 obtained through encoding by the encoding section 4135 and subsequently decoding by the decoding section 4137 as described above undergoes the second encoding and decoding and so has significant deterioration as described above. Therefore, an image quality of an image displayed on the display 4139 is significantly deteriorated as compared with an image (which is displayed on the display 120) due to the analog image signal Van1 output from the reproducer 4110.

Further, in the case of the image display system 4000 shown in FIG. 50, the analog image data Van1 output from the reproducer 4110 is not processed at all in order to disable the image data to be copied in the encoding apparatus 4130 in a condition where its good image quality is maintained, so that an image quality of an image due to this analog image data Van1 is not deteriorated.

As described above, in the present embodiment, of the coefficient data (conversion coefficients) in each of the blocks obtained by orthogonal transformation in encoding, coefficient data of a high-range frequency domain in a predetermined block is removed and, in decoding, the coefficient data of the high-range frequency domain in this predetermined block is interpolated using coefficient data of high-range frequency domains in a block located nearby, so that the image data is deteriorated significantly through the second or later encoding and decoding. Therefore, if the analog signal Van1 is utilized and encoded again by the encoding apparatus 4130 to be recorded on the recording medium, the image data encounters significant deterioration, so that it is impossible to copy the image data in a condition where its good image quality is maintained.

Further, coefficient data of the high-range frequency domain in a predetermined block is removed by the encoding section 4135 in the encoding apparatus 4130, thus enabling improving a data compression rate.

Further, in the present embodiment, the control section 4145b (see FIG. 53) in the encoding section 4135 is supplied externally with the setting signal SAR that sets a range of a high-range frequency domain whose coefficient data is to be removed, so that by changing this setting signal SAR, this range of the high-range frequency domain can be varied. An intensity of deterioration of the image data owing to encoding and decoding is related to this range of the high-range frequency domain. Therefore, in the present embodiment, the intensity of the deterioration of the image data owing to encoding and decoding can be set to a desired value.

Although the above fifth embodiment has been described that the range of a high-range frequency domain whose coefficient data is to be removed can be varied, the range may be fixed. In this case, it is unnecessary to add the range information AIF to the coefficient data DT2 of a block from which the coefficient data of the high-range frequency domain has been removed.

In the above-described fifth embodiment, the control section 4153c in the high-range coefficient interpolation section 4153 has the built-in ROM 4153d so that the information of high-range coefficient-removed blocks may be obtained from stored contents in this ROM 4153d and supplied as the block information BIF to the high-range coefficient interpolation circuit 4153a (see FIG. 56). However, such a configuration may be employed that the encoding section 4135 adds, to the coefficient data DT2 of a block from which the coefficient data of high-range frequency domains is removed, identification information indicating that this block is a high-range coefficient-removed block so that the high-range coefficient interpolation circuit 4153a in the decoding section 4137 can recognize the high-range coefficient-removed block from the identification information.

Although, in the above fifth embodiment, a block whose coefficient data of a high-range frequency domain is to be removed has been fixed, this block may be varied. In this case, for example, a plurality of kinds of block selection patterns may be prepared in the ROM 4145c (see FIG. 53) built in the control section 4145b in the high-range coefficient removal section 4145 so that any one of them can be selected.

Although, in the above fifth embodiment, the high-range coefficient removal section 4145 in the encoding section 4135 has been inserted on the side of an output of the quantization circuit 4144, it may be inserted on the side of an input of the quantization circuit 4144. Further, similarly, the high-range coefficient interpolation section 4153 in the decoding section 4137 may be inserted not on the side of an input of the inverse quantization circuit 4154 but on the side of an output thereof.

It is to be noted that in the above fifth embodiment, the high-range coefficient removal section 4145 has been provided in the encoding section 4135 so that this high-range coefficient removal section 4145 may remove coefficient data of a high-range frequency domain in a predetermined block. That is, in the above fifth embodiment, the decoding section 4137 is supplied with encoded data (image data) Vcd to which a signal-deteriorating factor is added.

However, the encoding section 4135 can obtain the same effects without providing with this high-range coefficient removal section 4145. In this case, the inverse quantization circuit 4154 in the decoding section 4137 can be provided, on its input or output side, with a high-range coefficient acquisition section for acquiring a conversion coefficient of a high-range frequency domain in a predetermined block in accordance with a conversion coefficient of a high-range frequency domain in a block located in the vicinity of this predetermined block in such a configuration that the thus acquired conversion coefficient of the high-range frequency domain in this predetermined block may be used as the high-range coefficient in this predetermined block. In this case, a signal-deteriorating factor is generated in the encoded data in the decoding section 4137.

Although the above fifth embodiment has employed encoding by use of DCT as orthogonal transformation, the present invention is not limited to it. The present invention can be applied similarly also to encoding by use of any other orthogonal transformation, for example, wavelet transform or discrete sine transform.

Although in the above fifth embodiment, the encoding apparatus 4130 has had the recording section 4136 and the display 4139, it may be thought of that either one or both of them are provided to the encoding apparatus 4130 externally.

According to the present invention, a conversion coefficient of a high-range frequency domain in a predetermined block is removed from among conversion coefficients in each block obtained through orthogonal transformation in encoding and, in decoding, the conversion coefficient of the high-range frequency domain in this predetermined block is interpolated using conversion coefficients of a high-range frequency domain in a block located nearby, so that image data can be deteriorated significantly through the second or later encoding and decoding, thereby well preventing illegal copy such that analog image data obtained by decoding encoded data is used and encoded again to be digitally recorded on a recording medium.

INDUSTRIAL APPLICABILITY

As described above, an apparatus for encoding data related to the present invention disables data to be copied in a condition where its good quality is maintained without deteriorating a quality of an output owing to the data before being copied, so that it is well applicable to a use of, for example, preventing illegal copy by use of analog image data.

The invention claimed is:

1. An apparatus for encoding data, the apparatus comprising:
    a receiving section that receives the data;
    a signal-deteriorating factor generation section configured to generate a signal-deteriorating factor in the received data based on the received data and including a phase-shifting section configured to shift a phase of the received data; and
    a data-encoding section configured to obtain encoded data by performing encoding processing on the data in which the signal-deteriorating factor is generated so that signal deterioration may be promoted in accordance with the signal- deteriorating factor, the data-encoding section including an encoding section configured to encode, by use of sub-sampling, the data whose phase is shifted by the phase-shifting section.

2. The apparatus for encoding the data according to claim 1, wherein
    the receiving section is configured to receive analog data,
    the signal-deteriorating factor generation section includes an analog-to-digital conversion section configured to convert the analog data received at the receiving section into digital data,
    the phase-shifting section is configured to shift a phase of digital data output from the analog-to-digital conversion section, and
    the encoding section of the data-encoding section is configured to encode the digital data whose phase is shifted by the phase-shifting section.

3. The apparatus for encoding the data according to claim 2, wherein the analog-to-digital conversion section includes the phase-shifting section, to shift a phase of the digital data when the analog-to-digital conversion section converts the analog data into the digital data.

4. The apparatus for encoding the data according to claim 2, the apparatus further comprising:
    a decoding section configured to decode encoded data output from the encoding section; and
    a digital-to-analog conversion section configured to convert the digital data output from the decoding section into analog data.

5. The apparatus for encoding the data according to claim 2, the apparatus further including a recording section configured to record encoded data output from the encoding section on a recording medium.

6. The apparatus for encoding the data according to claim 4, wherein
    the digital data is image data, and
    the apparatus further comprises an image display section configured to display an image due to analog data output from the digital-to-analog conversion section.

7. The apparatus for encoding the data according to claim 4, wherein
    the digital data is audio data, and
    the apparatus further comprises an audio output section configured to output an audio due to analog data output from the digital-to-analog conversion section.

8. The apparatus for encoding the data according to claim 2, wherein the phase-shifting section is configured to fix a shift width of a phase of the digital data.

9. The apparatus for encoding the data according to claim 2, wherein the phase-shifting section is configured to randomize a shift width of a phase of the digital data.

10. The apparatus for encoding the data according to claim 2, wherein the encoding section is configured to perform encoding by use of sub-sampling on the digital data whose phase is shifted by the phase-shifting section.

11. The apparatus for encoding the data according to claim 2, wherein the encoding section is configured to perform conversion encoding on the digital data.

12. The apparatus for encoding the data according to claim 2, wherein the encoding section includes:
    an extraction section configured to extract digital data from a predetermined range of the digital data whose phase is shifted by the phase-shifting section;
    a maximum value detection section configured to detect a maximum value of the digital data extracted by the extraction section;
    a minimum value detection section configured to detect a minimum value of the digital data extracted by the extraction section;
    a dynamic range detection section configured to detect a dynamic range of the digital data extracted by the extraction section, based on the maximum value detected by the maximum value detection section and the minimum value detected by the minimum value detection section;
    a generation section configured to generate minimum value-removed data by subtracting the minimum value detected by the minimum value detection section from the digital data extracted by the extraction section; and
    a quantization section configured to quantize the minimum value-removed data generated by the generation section, by using a quantization step determined in accordance with the dynamic range detected by the dynamic range detection section.

13. The apparatus for encoding the data according to claim 12, wherein the quantization section is configured to change a number of quantization bits in accordance with the dynamic range.

14. The apparatus for encoding the data according to claim 2, wherein the encoding section is configured to perform data compression encoding on the digital data.

15. The apparatus for encoding the data according to claim 1, wherein
    digital data is received at the receiving section,
    the phase-shifting section is configured to shift a phase of the digital data which is received at the receiving section, and
    the encoding section is configured to encode the digital data whose phase is shifted by the phase-shifting section.

16. The apparatus for encoding the data according to claim 15, further comprising:
    a decoding section configured to decode encoded data output from the encoding section; and
    a digital-to-analog conversion section configured to convert digital data output from the decoding section into analog data.

17. The apparatus for encoding the data according to claim 1, wherein
the receiving section is configured to receive digital data,
the data-encoding section includes the signal-deteriorating factor generation section,
the data-encoding section includes:
- a first encoding section configured to encode the digital data which is received at the receiving section;
- a second encoding section configured to further encode the digital data encoded by the first encoding section; and
- a third encoding section configured to further encode the digital data encoded by the second encoding section, and output data of the first encoding section, the second encoding section, and the third encoding section is deteriorated because the digital data which is received at the receiving section is shifted in phase.

18. The apparatus for encoding the data according to claim 17, wherein
the first encoding section is configured to perform encoding by use of sub-sampling on the digital data, and
the second encoding section includes:
- an extraction section configured to extract digital data from a predetermined range of the digital data encoded by the first encoding section;
- a maximum value detection section configured to detect a maximum value of the digital data extracted by the extraction section;
- a minimum value detection section configured to detect a minimum value of the digital data extracted by the extraction section;
- a dynamic range detection section configured to detect a dynamic range of the digital data extracted by the extraction section, based on the maximum value detected by the maximum value detection section and the minimum value detected by the minimum value detection section;
- a generation section configured to generate minimum value-removed data by subtracting the minimum value detected by the minimum value detection section from the digital data extracted by the extraction section; and
- a quantization section configured to quantize minimum value-removed data generated by the generation section, by using a quantization step determined in accordance with the dynamic range detected by the dynamic range detection section.

19. The apparatus for encoding the data according to claim 18, wherein the third encoding section is configured to perform conversion encoding on the digital data.

20. The apparatus for encoding the data according to claim 1, wherein
the receiving section is configured to receive digital data;
the signal-deteriorating factor generation section includes
a first encoding section configured to perform encoding by use of sub-sampling on the digital data which is received at the receiving section, and
the data-encoding section includes a second encoding section configured to perform conversion encoding on the digital data encoded by the first encoding section.

21. The apparatus for encoding the data according to claim 20, wherein
the digital data is image data, and
the first encoding section is configured to perform line offset sub-sampling and to alternately arrange, for each two consecutive lines, pixel data constituting digital data that corresponds to the two lines, to create new digital data.

22. The apparatus for encoding the data according to claim 1, wherein
the receiving section is configured to receive digital data,
the signal-deteriorating factor generation section includes
a first encoding section configured to perform encoding by use of sub-sampling on the digital data which is received at the receiving section,
the data-encoding section includes a second encoding section configured to further encode the digital data encoded by the first encoding section, and
the second encoding section includes:
- an extraction section configured to extract digital data from a predetermined range of the digital data encoded by the first encoding section;
- a maximum value detection section configured to detect a maximum value of the digital data extracted by the extraction section;
- a minimum value detection section configured to detect a minimum value of the digital data extracted by the extraction section;
- a dynamic range detection section configured to detect a dynamic range of the digital data extracted by the extraction section, based on the maximum value detected by the maximum value detection section and the minimum value detected by the minimum value detection section;
- a generation section configured to generate minimum value-removed data by subtracting the minimum value detected by the minimum value detection section from the digital data extracted by the extraction section; and
- a quantization section configured quantize the minimum value-removed data generated by the generation section, by using a quantization step determined in accordance with the dynamic range detected by the dynamic range detection section.

23. The apparatus for encoding the data according to claim 22, wherein
the digital data is image data, and
the first encoding section is configured to perform line offset sub-sampling and to alternately arrange, for each two consecutive lines, pixel data constituting digital data that corresponds to the two lines, to create new digital data.

24. The apparatus for encoding the data according to claim 1, wherein the receiving section is configured to receive a digital signal,
the signal-deteriorating factor generation section includes
a blocking section configured to perform blocking on the received digital signal accompanied by shuffling in such a predetermined pattern as to reduce a correlation between adjacent items of data, and
the data-encoding section includes a block-encoding section configured to obtain an encoded digital signal by performing block encoding on data of each of the blocks obtained by the blocking section.

25. The apparatus for encoding the data according to claim 24, wherein the block-encoding section includes:
- an orthogonal transformation section configured to obtain a conversion coefficient by performing orthogonal transformation on the data of each of the blocks obtained by the blocking section; and a quantization section configured to quantize the conversion coefficient of each of the blocks from the orthogonal transformation section.

26. The apparatus for encoding the data according to claim 24, wherein the block-encoding section includes:
   a maximum value/minimum value detection section configured to detect a maximum value and a minimum value of data in a block;
   a dynamic range detection section configured to detect a dynamic range of the data in the block according to the maximum value and the minimum value detected by the maximum value/minimum value detection section;
   a generation section configured to generate minimum value-removed data by subtracting the minimum value detected by the maximum value/minimum value detection section from the data in the block; and
   a quantization section configured to obtain an encoded digital signal by quantizing the minimum value-removed data generated by the generation section, by using a quantization step determined in accordance with the dynamic range detected by the dynamic range detection section.

27. The apparatus for encoding the data according to claim 1, further comprising
   an extraction section configured to extract data from a predetermined range of the data received at the receiving section, wherein
   the data-encoding section includes:
      a maximum value/minimum value detection section configured to detect a maximum value and a minimum value of the data extracted by the extraction section;
      a dynamic range detection section configured to detect a dynamic range of the data extracted by the extraction section, according to the maximum value and the minimum value detected by the maximum value/minimum value detection section;
      a generation section configured to generate minimum value-removed data by subtracting the minimum value detected by the maximum value/minimum value detection section from the data extracted by the extraction section; and
      an encoding section configured to obtain encoded data by quantizing the minimum value-removed data generated by the generation section, by using a quantization step determined in accordance with the dynamic range detected by the dynamic range detection section, and
   the encoding section includes the signal-deteriorating factor generation section configured to perform quantization in a condition where a quantization step in at least one of a region on the side of the maximum value and a region on the side of the minimum value is made larger than quantization steps in other regions.

28. The apparatus for encoding the data according to claim 27, wherein the encoding section is configured to change a number of quantization bits according to the dynamic range.

29. The apparatus for encoding the data according to claim 27, further including a number-of-times detection section configured to detect a number of times of a maximum value side, which is the number of items of data contained in a predetermined range on the maximum value side, and a number of times of a minimum value side, which is the number of items of data contained in a predetermined range on the minimum value side, based on the data extracted by the extraction section, wherein the encoding section is configured to make a quantization step in the region on the minimum value side larger than quantization steps in other regions if the number of times of the minimum value side is smaller than the number of times of the maximum value side or makes the quantization step in the region on the maximum value side larger than quantization steps in other regions if the number of times of the maximum value side is smaller than the number of times of minimum value side.

30. The apparatus for encoding the data according to claim 27, further including a decoding section configured to decode the encoded data obtained by the encoding section, and a digital-to-analog conversion section configured to convert digital data output from the decoding section into analog data.

31. The apparatus for encoding the data according to claim 27, further including a recording section configured to record encoded data output from the encoding section on a recording medium.

32. The apparatus for encoding the data according to claim 30, wherein
   analog data output from the digital-to-analog conversion section is image data, and
   the apparatus further includes an image display section configured to display an image due to the analog data.

33. The apparatus for encoding the data according to claim 30, wherein
   analog data output from the digital-to-analog conversion section is audio data, and
   the apparatus further includes an audio output section configured to output an audio due to the analog data.

34. The apparatus for encoding the data according to claim 1, wherein
   the receiving section is configured to receive image data,
   the apparatus further includes an orthogonal transformation section configured to obtain a conversion coefficient by performing orthogonal transformation on image data of each of the blocks obtained by dividing the image data received at the receiving section into two-dimensional blocks and a quantization section configured to quantize the conversion coefficient of each of the blocks supplied from the orthogonal transformation section,
   the signal-deteriorating factor generation section includes:
      a block information generation section configured to generate block information indicative of a block whose conversion coefficient of a high-range frequency domain is to be removed; and
      a range information generation section configured to generate range information indicative of a range of the high-range frequency domain, and
   the data-encoding section includes a conversion coefficient removal section configured to remove a conversion coefficient of a high-range frequency domain indicated by the range information generated by the range information generation section, in a block indicated by the block information generated by the block information generation section, on the side of an input or an output of the quantization section.

35. The apparatus for encoding the data according to claim 34, wherein the orthogonal transformation is a discrete cosine transform.

36. The apparatus for encoding the data according to claim 34, further including a range-varying section configured to vary a range of the high-range frequency domain.

37. The apparatus for encoding the data according to claim 34, wherein the block to be removed is selected alternately in at least one of a horizontal and a vertical direction.

38. The apparatus for encoding the data according to claim 34, further including an encoding section configured to perform variable-length encoding on quantized data in each block from the quantization section.

39. An apparatus for encoding data, the apparatus comprising:
receiving means for receiving the data;
signal-deteriorating factor generation means for generating a signal-deteriorating factor in the received data based on the received data, the signal-deteriorating factor generation means including means for phase-shifting the received data; and
data-encoding means for obtaining encoded data by performing encoding processing on the data in which the signal-deteriorating factor is generated so that signal deterioration may be promoted in accordance with the signal-deteriorating factor, the data-encoding means including means for sub-sampling the data phase-shifted by the means for phase-shifting.

40. A method for encoding data, the method comprising:
a data-receiving step of receiving the data;
a signal-deteriorating factor generation step of generating a signal-deteriorating factor in the received data based on the received data; and
a data-encoding step of obtaining encoded data by performing encoding processing on the data in which the signal-deteriorating factor is generated so that signal deterioration may be promoted in accordance with the signal-deteriorating factor, wherein the signal-deteriorating factor generation step includes shifting a phase of the received data, and the data-encoding step includes sub-sampling the phase shifted data.

41. The method for encoding the data according to claim 40, wherein
analog data is received in the data-receiving step,
the method further comprises an analog-to-digital conversion step of converting the received analog data into digital data,
the signal-deteriorating factor generation step includes a phase-shifting step of shifting a phase of the converted digital data, and
the data-encoding step includes an encoding step of encoding the digital data whose phase is shifted.

42. The method for encoding the data according to claim 40, wherein
digital data is received in the data-receiving step,
the signal-deteriorating factor generation step includes a phase-shifting step of shifting a phase of the received digital data, and
the data-encoding step includes an encoding step of encoding the digital data whose phase is shifted.

43. The method for encoding the data according to claim 40, wherein
digital data is received in the data-receiving step,
the signal-deteriorating factor generation step includes a blocking step of performing blocking on the received digital signal accompanied by shuffling in such a predetermined pattern as to reduce a correlation between adjacent items of data, and
the data-encoding step includes a block-encoding step of obtaining an encoded digital signal by performing block-encoding on data of each of the blocks obtained by the blocking step.

44. The method for encoding the data according to claim 40, further comprising an extraction step of extracting data from a predetermined range of the received data, wherein the data-encoding step includes:

a first detection step of detecting a maximum value and a minimum value of the extracted data;
a second detection step of detecting a dynamic range of the extracted data based on the detected maximum value and minimum value;
a generation step of generating minimum value-removed data by subtracting the detected minimum value from the extracted data; and
an encoding step of obtaining encoded data by quantizing the generated minimum value-removed data in a quantization step determined in accordance with the detected dynamic range, and
the encoding step includes the signal-deteriorating factor generation step of performing quantization in a condition where a quantization step in at least one of regions on the maximum value side and the minimum value side is made larger than quantization steps in other regions.

45. The method for encoding the data according to claim 40, wherein
image data is received in the receiving step,
the method further comprises:
an orthogonal transformation step of obtaining a conversion coefficient by performing orthogonal transformation on the image data of each of the blocks obtained by dividing the received image data into two-dimensional blocks; and
a quantization step of quantizing the conversion coefficient of each of the blocks obtained by the orthogonal transformation step,
the signal-deteriorating factor generation step includes:
a block information generation step of generating block information indicative of a block whose conversion coefficient of a high-range frequency domain is to be removed; and
a range information generation step of generating range information indicative of a range of the high-range frequency domain, and
wherein the data-encoding step includes a conversion coefficient removal step of removing a conversion coefficient of a high-range frequency domain indicated by the range information generated by the range information generation step, in a block indicated by the block information generated by the block information generation step, before or after the quantization is performed in the quantization step.

46. An apparatus for encoding data, the apparatus comprising:
a receiving section configured to receive data into which a signal-deteriorating factor for deteriorating a signal is generated, the factor being generated by a signal-deteriorating factor generation section configured to generate the signal-deteriorating factor by phase-shifting the data; and
a data-encoding section configured to obtain encoded data by performing encoding processing on the data into which the signal-deteriorating factor is generated so that signal deterioration may be promoted in accordance with the signal-deteriorating factor, the encoding processing including sub-sampling the data.

47. The apparatus for encoding the data according to claim 46, wherein
the receiving section is configured to receive a second digital signal that is obtained by sequentially performing encoding processing, decoding processing, digital-to-analog conversion processing that generates analog distortion, and analog-to-digital conversion processing on a first digital signal, the data-encoding section includes an encoding section configured to obtain an encoded digital signal by performing encoding processing on the second digital signal which the receiving section receives, and a decoded digital signal obtained by decoding an encoded digital signal obtained by the encoding section has a larger degree of deterioration than a decoded digital signal obtained by performing encoding processing and decoding processing on the first digital signal.

48. The apparatus for encoding the data according to claim 47, wherein the encoding section includes:
a blocking section configured to block the second digital signal; and
a block-encoding section configured to obtain an encoded digital signal by performing block encoding on data of each of the blocks obtained by the blocking section.

49. The apparatus for encoding the data according to claim 48, wherein the blocking is accompanied by shuffling in such a predetermined pattern as to reduce a correlation between items of data of adjacent positions contained in each of the blocks.

50. The apparatus for encoding the data according to claim 49, wherein the blocking is performed with items of data that are separate from the second digital signal by as much as a predetermined number thereof being made one block.

51. The apparatus for encoding the data according to claim 49, wherein the blocking is accompanied by the shuffling as to reshuffle at least one suite of items of data in a block.

52. The apparatus for encoding the data according to claim 48, wherein the block-encoding section includes:
an orthogonal transformation section configured to obtain a conversion coefficient by performing orthogonal transformation on data of each of the blocks obtained by the blocking section; and
a quantization section configured to quantize the conversion coefficient of each of the blocks from the orthogonal transformation section.

53. The apparatus for encoding the data according to claim 52, wherein the orthogonal transformation is a discrete cosine transform.

54. The apparatus for encoding the data according to claim 52, wherein the orthogonal transformation is a discrete sine transform.

55. The apparatus for encoding the data according to claim 52, wherein the orthogonal transformation is a wavelet transform.

56. The apparatus for encoding the data according to claim 48, wherein the block-encoding section includes:
a maximum value/minimum value detection section configured to detect a maximum value and a minimum value of data in a block;
a dynamic range detection section configured to detect a dynamic range of the data in the block according to the maximum value and the minimum value detected by the maximum value/minimum value detection section;
a generation section configured to generate minimum value-removed data by subtracting the minimum value detected by the maximum value/minimum value detection section from the data in the block; and
an encoding section configured to obtain an encoded digital signal by quantizing the minimum value-removed data generated by the generation section, by using a quantization step determined in accordance with the dynamic range detected by the dynamic range detection section.

57. The apparatus for encoding the data according to claim 47, wherein the analog distortion occurs when a high-frequency component is removed in the digital-to-analog conversion.

58. The apparatus for encoding the data according to claim 47, wherein the analog distortion occurs when a signal is shifted in phase in the digital-to-analog conversion.

59. The apparatus for encoding the data according to claim 47, wherein the digital signal is a digital image signal.

60. The apparatus for encoding the data according to claim 47, wherein the digital signal is a digital audio signal.

61. A apparatus for encoding data, the apparatus comprising:
receiving means for receiving data into which a signal-deteriorating factor for deteriorating a signal is generated, the factor being generated by a signal-deteriorating factor generation section for generating the factor and including phase-shifting the signal; and
data-encoding means for obtaining encoded data by performing encoding processing on the data into which the signal-deteriorating factor is generated so that signal deterioration may be promoted in accordance with the signal-deteriorating factor, the encoding processing including sub-sampling the data.

62. A method for encoding data, the method comprising:
a receiving step of receiving data into which a signal-deteriorating factor for deteriorating a signal is generated, the factor being generated by a signal-deteriorating factor generation section for generating the factor and including phase-shifting the data; and
a data-encoding step of obtaining encoded data by performing encoding processing on the data into which the signal-deteriorating factor is generated so that signal deterioration may be promoted in accordance with the signal-deteriorating factor, the encoding processing including sub-sampling the phase-shifted data.

63. The method for encoding the data according to claim 62, wherein
in the receiving step, a second digital signal is received which is obtained by sequentially performing encoding processing, decoding processing, digital-to-analog conversion processing that generates analog distortion and analog-to-digital conversion processing on a first digital signal,
the data encoding step includes an encoding step of obtaining an encoded digital signal by performing encoding processing on the second digital signal which is received in the input step, and
a decoded digital signal obtained by decoding an encoded digital signal obtained by the encoding step has a larger degree of deterioration than a decoded digital signal obtained by performing encoding processing and decoding processing on the first digital signal.

64. An apparatus for outputting data, the apparatus comprising:
a data output section configured to output encoded digital data;
a data decoding section that obtains decoded data by decoding the output digital data;
a synchronization signal generation section configured to generate a synchronization signal corresponding to the decoded data;
a signal-deteriorating factor generation section configured to generate a signal-deteriorating factor promoting signal deterioration into the decoded data according to the decoded data; and a synthesis section configured to synthesize data output from the signal-deteriorating factor generation section and the synchronization signal generated by the synchronization signal generation section, wherein the signal-deteriorating factor generation section includes a phase-shifting section configured to phase shift the decoded data, and the synthesis section is configured to sub-sample the phase-shifted data.

65. The apparatus for outputting data according to claim 64, wherein the phase-shifting section is configured to shift a phase of the synchronization signal generated by the synchronization signal generation section and a phase of the digital data output from the decoding section with respect to each other, and the synthesis section is configured to synthesize the synchronization signal whose phase is shifted respectively by the phase shifting section and the digital data.

66. The apparatus for outputting data according to claim 65, wherein the data output section is configured to reproduce the digital data from a recording medium and to output it.

67. The apparatus for outputting data according to claim 65, further comprising a digital-to-analog conversion section configured to convert the digital data output from the synthesis section into analog data.

68. The apparatus for outputting data according to claim 65, wherein the phase-shifting section is configured to fix a shift width of the phase.

69. The apparatus for outputting data according to claim 65, wherein the phase-shifting section is configured to randomize a shift width of the phase.

70. The apparatus for outputting data according to claim 65, wherein the encoded digital data is digital data obtained by performing encoding by use of sub-sampling.

71. The apparatus for outputting data according to claim 65, wherein the encoded digital data is digital data obtained by performing conversion encoding.

72. The apparatus for outputting data according to claim 65, wherein the encoded digital data is digital data obtained in the encoding section by performing encoding, and the encoding section includes:

an extraction section configured to extract digital data from a predetermined range in digital data before being encoded;

a maximum value detection section configured to detect a maximum value of the digital data extracted by the extraction section;

a minimum value detection section configured to detect a minimum value of the digital data extracted by the extraction section;

a dynamic range detection section configured to detect a dynamic range of the digital data extracted by the extraction section, based on the maximum value detected by the maximum value detection section and the minimum value detected by the minimum value detection section;

a generation section configured to generate minimum value-removed data by subtracting the minimum value detected by the minimum value detection section from the digital data extracted by the extraction section; and a quantization section configured to quantize the minimum value-removed data generated by the generation section, by using a quantization step determined in accordance with the dynamic range detected by the dynamic range detection section.

73. An apparatus for outputting data, the apparatus comprising:

data output means for outputting encoded digital data;

data decoding means for obtaining decoded data by decoding the output digital data;

synchronization signal generation means for generating a synchronization signal corresponding to the decoded data;

signal-deteriorating factor generation means for generating a signal-deteriorating factor that promotes signal deterioration into the decoded data according to the decoded data; and synthesis means for synthesizing data output from the signal-deteriorating factor generation means and the synchronization signal generated by the synchronization signal generation means wherein the signal-deteriorating factor generation means includes means for phase-shifting the decoded data, and the synthesis means includes means for sub-sampling the data output from the signal-deteriorating factor generation means.

74. A method for outputting data, the method comprising:

a data output step of outputting encoded digital data;

a data decoding step of obtaining decoded data by decoding the output digital data;

a synchronization signal generation step of generating a synchronization signal corresponding to the decoded data;

a signal-deteriorating factor generation step of generating a signal-deteriorating factor that promotes signal deterioration into the decoded data according to the decoded data; and a synthesis step of synthesizing data in which the signal-deteriorating factor is generated and the synchronization signal, wherein the data output from the signal-deteriorating factor generation step includes a step of phase-shifting the decoded data, and the synthesis step includes sub-sampling the data in which the signal-deteriorating factor is generated.

75. The apparatus for outputting data according to claim 74, wherein the phase-shifting step includes shifting a phase of the generated synchronization signal and a phase of the digital data obtained by decoding with respect to each other, and the synthesis step synthesizes the synchronization signal and the digital data whose phases are shifted respectively.

76. A system for processing a signal comprising:

a receiving section configured to receive encoded data;

a data-decoding section configured to obtain decoded data by performing decoding processing on the received encoded data;

a signal-deteriorating factor generation section configured to generate a signal-deteriorating factor in the decoded data in accordance with the decoded data; and a data-encoding section configured to obtain encoded data by performing encoding processing on the data in which the signal-deteriorating factor is generated so that signal deterioration may be promoted in accordance with the signal-deteriorating factor, wherein the signal-deteriorating factor generation section includes a phase-shifting section configured to phase-shift the decoded data, and the encoding processing includes sub-sampling the phase-shifted data.

77. The system for processing the signal according to claim 76, wherein
the encoded data received at the receiving section is an encoded digital signal and the data-decoding section is configured to obtain a decoded digital signal by performing decoding processing on the encoded digital signal,
the signal-deteriorating factor generation section includes:
a digital-to-analog conversion section configured to obtain an analog signal containing analog distortion by performing digital-to-analog conversion processing on the decoded digital signal obtained by the data-decoding section; and
an analog-to-digital conversion section configured to obtain a digital signal by performing analog-to-digital conversion processing on the analog signal obtained by the digital-to-analog conversion section,
the data-encoding section includes an encoding section configured to obtain an encoded digital signal by performing encoding processing on the digital signal obtained by the analog-to-digital conversion section, and
the encoding processing performed by the encoding section promotes deterioration in the encoded digital signal owing to an influence of the analog distortion on the digital signal.

78. A system for processing a signal comprising:
receiving means for receiving encoded data;
data-decoding means for obtaining decoded data by performing decoding processing on the received encoded data;
signal-deteriorating factor generation means for generating a signal-deteriorating factor in the decoded data in accordance with the decoded data; and
data-encoding means for obtaining encoded data by performing encoding processing on the data in which the signal-deteriorating factor is generated so that signal deterioration may be promoted in accordance with the signal-deteriorating factor, wherein
the signal-deteriorating factor generation means includes means for phase-shifting the decoded data, and
the encoding processing includes sub-sampling the phase-shifted data.

79. An apparatus for processing a signal, the apparatus comprising:
a receiving section configured to receive encoded data;
a data-decoding section configured to obtain decoded data by performing decoding processing on the received encoded data;
a signal-deteriorating factor generation section configured to generate a signal-deteriorating factor in the decoded data in accordance with the decoded data; and
a data encoding section configured to obtain encoded data by performing encoding processing on the data in which the signal-deteriorating factor is generated so that signal deterioration may be promoted in accordance with the signal-deteriorating factor, wherein
the signal-deteriorating factor generation section includes a phase-shifting section configured to phase-shift the decoded data, and the encoding processing includes sub-sampling the phase-shifted data.

80. The apparatus for processing the signal according to claim 79, wherein the encoded data that is received at the receiving section is an encoded digital signal and the data-decoding section is configured to obtain a decoded digital signal by performing decoding processing on the encoded digital signal,
the signal-deteriorating factor generation section includes:
a digital-to-analog conversion section configured to obtain an analog signal containing analog distortion by performing digital-to-analog conversion processing on the decoded digital signal obtained by the data-decoding section; and
an analog-to-digital conversion section configured to obtain a digital signal by performing analog-to-digital conversion processing on the analog signal obtained by the digital-to-analog conversion section,
the data-encoding section includes an encoding section configured to obtain an encoded digital signal by performing encoding processing on the digital signal obtained by the analog-to-digital conversion section, and
the encoding processing performed by the encoding section promotes deterioration in the encoded digital signal owing to an influence of the analog distortion on the digital signal.

81. The apparatus for processing the signal according to claim 80, wherein the encoding section includes:
a blocking section configured to block the digital signal obtained by the analog-to-digital conversion section; and
a block-encoding section configured to obtain an encoded digital signal by performing block encoding on data of each of blocks obtained by the blocking section.

82. The apparatus for processing the signal according to claim 81, wherein the blocking is accompanied by shuffling in such a predetermined pattern as to reduce a correlation between items of data of adjacent positions contained in each of the blocks.

83. The apparatus for processing the signal according to claim 82, wherein the blocking is performed with items of data that are separate from the digital signal obtained by the analog-to-digital conversion section by as much as a predetermined number thereof being made one block.

84. The apparatus for processing the signal according to claim 82, wherein the blocking is accompanied by the shuffling as to reshuffle at least one suite of items of data in a block.

85. The apparatus for processing the signal according to claim 81, wherein the block-encoding section includes:
an orthogonal transformation section configured to obtain a conversion coefficient by performing orthogonal transformation on data of each of the blocks obtained by the blocking section; and
a quantization section configured to quantized the conversion coefficient of each of the blocks from the orthogonal transformation section.

86. The apparatus for processing the signal according to claim 81, wherein the block-encoding section includes:
a maximum value/minimum value detection section configured to detect a maximum value and a minimum value of data in a block;
a dynamic range detection section configured to detect a dynamic range of the data in the block according to the maximum value and the minimum value detected by the maximum value/minimum value detection section;
a generation section configured to generate minimum value-removed data by subtracting the minimum value detected by the maximum value/minimum value detection section from the data in the block; and
a quantization section configured to obtain an encoded digital signal by quantizing the minimum value-removed data generated by the generation section, by using a quantization step determined in accordance with the dynamic range detected by the dynamic range detection section.

87. The apparatus for processing the signal according to claim 80, wherein the analog distortion occurs when a high-frequency component is removed in digital-to-analog conversion.

88. The apparatus for processing the signal according to claim 80, wherein the analog distortion occurs when a signal is shifted in phase in the digital-to-analog conversion.

89. The apparatus for processing the signal according to claim 80, wherein the digital signal is a digital image signal.

90. The apparatus for processing the signal according to claim 80, wherein the digital signal is a digital audio signal.

91. An apparatus for processing a signal comprising:
receiving means for receiving encoded data;
data-decoding means for obtaining decoded data by performing decoding processing on the received encoded data;
signal-deteriorating factor generation means for generating a signal-deteriorating factor in the decoded data in accordance with the decoded data; and
data-encoding means for obtaining encoded data by performing encoding processing on data in which the signal-deteriorating factor is generated so that signal deterioration may be promoted in accordance with the signal-deteriorating factor, wherein
the signal-deteriorating factor generation means includes means for phase-shifting the decoded data, and
the encoding processing includes sub-sampling the phase-shifted data.

92. A method for processing a signal comprising:
a receiving step of receiving encoded data;
a data-decoding step of obtaining decoded data by performing decoding processing on the received encoded data;
a signal-deteriorating factor generation step of generating a signal-deteriorating factor in the decoded data in accordance with the decoded data; and
a data-encoding step of obtaining encoded data by performing encoding processing on the data in which the signal-deteriorating factor is generated so that signal deterioration may be promoted in accordance with the signal-deteriorating factor, wherein
the signal deteriorating factor generation step includes a phase-shifting step of shifting a phase of the decode data, and
the encoding processing includes sub-sampling the phase-shifted data.

93. The method for processing the signal according to claim 92, wherein
the encoded data that is received in the receiving step is encoded digital data and the data-decoding step is provided to obtain a decoded digital signal by performing decoding processing on the encoded digital signal,
the signal-deteriorating factor generation step includes:
a digital-to-analog conversion step of obtaining an analog signal containing analog distortion by performing digital-to-analog conversion processing on the decoded digital signal obtained by the data-decoding step; and
an analog-to-digital conversion step of obtaining a digital signal by performing analog-to-digital conversion processing on the analog signal obtained by the digital-to-analog conversion step,
the data-encoding step includes an encoding step of obtaining an encoded digital signal by performing encoding processing on the digital signal obtained by the analog-to-digital conversion step, and
the encoding processing performed by the encoding step promotes deterioration in the encoded digital signal owing to an influence of the analog distortion on the digital signal.

94. An apparatus for decoding data encoded by an encoding apparatus including a signal-deteriorating factor generation section that generates a factor for deteriorating a signal including a phase-shift of the signal, the encoding apparatus configured to sub-sample the phase-shifted signal, the apparatus comprising:
a receiving section configured to receive the data encoded by the encoding apparatus; and
a data-decoding section configured to obtain decoded data by performing decoding processing on the received encoded data in accordance with the generated signal-deteriorating factor so as to promote signal deterioration.

95. The apparatus for decoding data according to claim 94, the apparatus decoding an encoded digital signal in which a signal-deteriorating factor is generated and which is obtained by performing block encoding on data of each of the blocks obtained by performing blocking on a digital signal, the blocking being accompanied by shuffling in such a predetermined pattern as to reduce a correlation between adjacent items of data, wherein
the data-decoding section includes:
a block-decoding section configured to perform block-decoding processing on the encoded digital signal; and
an inverse blocking section configured to perform de-shuffling and inverse blocking on the data of each of the blocks obtained by the block-decoding section.

96. The apparatus for decoding data according to claim 94, the apparatus decoding encoded data in which a signal-deteriorating factor is generated and which is obtained by performing orthogonal transformation on image data of each of the blocks obtained by dividing the image data into two-dimensional blocks, performing quantization on a conversion coefficient of each of the blocks obtained by this orthogonal transformation, and removing the conversion coefficient of a high-range frequency domain in a predetermined block before or after this quantization, wherein
the data-decoding section includes:
an inverse quantization section configured to perform inverse quantization on the encoded data;
an inverse orthogonal transformation section configured to obtain the image data by performing inverse orthogonal transformation on the conversion coefficient of each of the blocks from the inverse quantization section; and
a conversion coefficient interpolation section configured to interpolate the conversion coefficient of the high-range frequency domain in the predetermined block by using the conversion coefficients of the high-range frequency domain of a block located in the vicinity of the predetermined block on the side of an input or an output of the inverse quantization section.

97. The apparatus for decoding data according to claim 96, wherein
the encoded data is obtained by performing variable-length encoding on quantized data of each of the blocks obtained by the quantization, and the apparatus further comprises a decoding section configured to perform variable-length decoding on the encoded data, on the side of the input of the inverse quantization section.

98. An apparatus for decoding data encoded by an encoding apparatus including a signal-deteriorating factor generation section that generates a factor for deteriorating a signal including a phase-shift of the signal, the encoding apparatus configured to sub-sample the phase-shifted signal, the apparatus comprising:
receiving means for receiving the data encoded by the encoding apparatus; and
data-decoding means for obtaining decoded data by performing decoding processing on the received encoded data in accordance with the generated signal-deteriorating factor so as to promote signal deterioration.

99. A method for decoding data encoded by an encoding method comprising a signal-deteriorating factor generation step that generates a factor for deteriorating a signal including a step of phase-shifting the signal, the encoding method including a step of sub-sampling the phase-shifted signal, the method comprising:
a receiving step of receiving the data encoded by the encoding method; and
a data-decoding step of obtaining decoded data by performing decoding processing on the received encoded data in accordance with the generated signal-deteriorating factor so as to promote signal deterioration.

100. The method for decoding the data according to claim 99, the method decoding an encoded digital signal in which a signal-deteriorating factor is generated and which is obtained by performing block encoding on data of each of the blocks obtained by performing blocking on a digital signal, the blocking being accompanied by shuffling in such a predetermined pattern as to reduce a correlation between adjacent items of data, wherein
the data-decoding step includes:
a block-decoding step of performing block-decoding processing on the encoded digital signal; and
a deblocking step of performing de-shuffling and inverse blocking on the data of each of the blocks obtained by the block-decoding step.

101. The method for decoding the data according to claim 99, the method decoding encoded data in which a signal-deteriorating factor is generated and which is obtained by performing an orthogonal transformation on image data of each of the blocks obtained by dividing the image data into two-dimensional blocks, performing quantization on a conversion coefficient of each of the blocks obtained by this orthogonal transformation, and removing the conversion coefficient of a high-range frequency domain in a predetermined block before or after this quantization, wherein
the data-decoding step includes:
an inverse quantization step of performing inverse quantization on the encoded data;
an inverse orthogonal transformation step of obtaining the image data by performing inverse orthogonal transformation on the conversion coefficient of each of the blocks obtained by performing the inverse quantization in the inverse quantization step; and
a conversion coefficient interpolation step of interpolating the conversion coefficient of the high-range frequency domain in the predetermined block by using the conversion coefficients of the high-range frequency domain of a block located in the vicinity of the predetermined block before or after performing inverse quantization in the inverse quantization step.

102. An apparatus for decoding encoded data, comprising:
a receiving section configured to receive the encoded data;
a signal-deteriorating factor generation section configured to generate a signal-deteriorating factor in the received encoded data in accordance with this encoded data; and
a data-decoding section configured to obtain decoded data by performing decoding processing on the data in which the signal-deteriorating factor is generated so as to promote signal deterioration in accordance with the signal-deteriorating factor, wherein
the signal-deteriorating factor generation section includes a phase-shifting section configured to phase-shift the encoded data, and
the decoding processing includes sub-sampling the phase-shifted data.

103. The apparatus for decoding the data according to claim 102, the apparatus decoding an encoded digital signal obtained by performing block-encoding on data of each of the blocks obtained by performing blocking on a digital signal, the blocking being accompanied by shuffling in such a predetermined pattern as to reduce a correlation between adjacent items of data, wherein
the signal-deteriorating factor generation section includes:
a block-decoding section configured to perform block-decoding processing on the encoded digital signal; and
a de-shuffling section configured to de-shuffle data of each of the blocks obtained by the block-decoding section, and
the data-decoding section includes an inverse blocking section for performing inverse blocking in accordance with the de-shuffled data.

104. The apparatus for decoding the data according to claim 102, the apparatus decoding encoded data obtained by performing an orthogonal transformation on image data of each of the blocks obtained by dividing the image data into two-dimensional blocks and quantizing a conversion coefficient of each of the blocks obtained by this orthogonal transformation, wherein
the signal-deteriorating factor generation section includes:
an inverse quantization section configured to perform inverse quantization on the encoded data;
an inverse orthogonal transformation section configured to obtain the image data by performing inverse orthogonal transformation on the conversion coefficient of each of the blocks from the inverse quantization section; and
a conversion coefficient acquisition section configured to acquire the conversion coefficient of a high-range frequency domain in the predetermined block in accordance with the conversion coefficients of the high-range frequency domain of a block located in the vicinity of the predetermined block on the side of an input or an output of the inverse quantization section, and
the data-decoding section is configured to use the conversion coefficient of the high-range frequency domain in the block located in the vicinity of the predetermined block as the conversion coefficient of the high-range frequency domain in the predetermined block.

105. An apparatus for decoding encoded data, comprising:
receiving means for receiving the encoded data;
signal-deteriorating factor generation means for generating a signal-deteriorating factor in the input encoded data in accordance with the data obtained by decoding processing; and data-decoding means for obtaining decoded data by performing decoding processing on the data in which the signal-deteriorating factor is generated so as to promote signal deterioration in accordance with the signal-deteriorating factor, wherein the signal-deteriorating factor generation means includes means for phase-shifting the encoded data, and the decoding processing includes sub-sampling the phase-shifted data.

106. A method for decoding encoded data, comprising:
a receiving step of receiving the encoded data;
a signal-deteriorating factor generation step of generating a signal-deteriorating factor in the input encoded data in accordance with this encoded data; and
a data-decoding step of obtaining decoded data by performing decoding processing on the data in which the signal-deteriorating factor is generated so as to promote signal deterioration in accordance with the signal-deteriorating factor, wherein
the signal-deteriorating factor generation step includes a step of phase-shifting the encoded data, and
the decoding processing includes sub-sampling the phase-shifted data.

107. The method for decoding the data according to claim 106, the method decoding an encoded digital signal obtained by performing block encoding on data of each of the blocks obtained by performing blocking on a digital signal, the blocking being accompanied by shuffling in such a predetermined pattern as to reduce a correlation between adjacent items of data, wherein
the signal-deteriorating factor generation step includes:
a block-decoding step of performing block-decoding processing on the encoded digital signal; and
a de-shuffling step of de-shuffling data of each of the blocks obtained by the block-decoding step, and
the data-decoding step includes an inverse blocking step of performing inverse blocking in accordance with the de-shuffled data.

108. The method for decoding the data according to claim 106, the method decoding encoded data obtained by performing orthogonal transformation on image data of each of the blocks obtained by dividing the image data into two-dimensional blocks and quantizing a conversion coefficient of each of the blocks obtained by this orthogonal transformation, wherein
the signal-deteriorating factor generation step includes:
an inverse quantization step of performing inverse quantization on the encoded data;
an inverse orthogonal transformation step of obtaining the image data by performing inverse orthogonal transformation on the conversion coefficient of each of the blocks from the inverse quantization step; and
a conversion coefficient acquisition step of acquiring the conversion coefficient of a high-range frequency domain in the predetermined block in accordance with the conversion coefficients of the high-range frequency domain of a block located in the vicinity of the predetermined block on the side of an input or an output of the inverse quantization step, and
the data-decoding step uses the acquired conversion coefficient of the high-range frequency domain in the block located in the vicinity of the predetermined block as the conversion coefficient of the high-range frequency domain in the predetermined block.

109. An apparatus for encoding data, the apparatus comprising:
a receiving section configured to receive analog data;
an analog-to-digital conversion section configured to convert the analog data received at the receiving section into digital data;
a signal-deterioration generation section configured to generate a signal-deteriorating component in the digital data based on the digital data, the signal deterioration generation section including a phase-shifting section configured to shift a phase of the digital data; and
a data-encoding section configured to obtain encoded data by performing encoding processing on the digital data in which the signal-deteriorating component is generated so that signal deterioration may be promoted in accordance with the signal-deteriorating component, the data-encoding section including:
an encoding section configured to encode the digital data whose phase is shifted by the phase-shifting section;
an extraction section configured to extract a predetermined range of the digital data whose phase is shifted by the phase-shifting section;
a maximum value detection section configured to detect a maximum value of the digital data extracted by the extraction section;
a minimum value detection section configured to detect a minimum value of the digital data extracted by the extraction section;
a dynamic range detection section configured to detect a dynamic range of the digital data extracted by the extraction section, based on the maximum value detected by the maximum value detection section and the minimum value detected by the minimum value detection section;
a generation section configured to generate minimum value-removed data by subtracting the minimum value detected by the minimum value detection section from the digital data extracted by the extraction section; and
a quantization section configured to quantizing the minimum value-removed data generated by the generation section, by using a quantization step determined in accordance with the dynamic range detected by the dynamic range detection section.

* * * * *